(12) United States Patent
Moeykens

(10) Patent No.: US 11,670,115 B2
(45) Date of Patent: Jun. 6, 2023

(54) SYSTEMS AND METHODS FOR FLEET MANAGEMENT

(71) Applicant: BETA AIR, LLC, South Burlington, VT (US)

(72) Inventor: Vincent Moeykens, Burlington, VT (US)

(73) Assignee: BETA AIR, LLC, South Burlington, VT (US)

( * ) Notice: Subject to any disclaimer, the term of this patent is extended or adjusted under 35 U.S.C. 154(b) by 0 days.

(21) Appl. No.: 17/856,000

(22) Filed: Jul. 1, 2022

(65) Prior Publication Data

US 2023/0058992 A1    Feb. 23, 2023

Related U.S. Application Data

(63) Continuation of application No. 17/406,353, filed on Aug. 19, 2021, now Pat. No. 11,417,154.

(51) Int. Cl.
| | |
|---|---|
| *G07C 5/00* | (2006.01) |
| *G06N 20/00* | (2019.01) |
| *G06F 21/31* | (2013.01) |
| *G07C 5/08* | (2006.01) |

(52) U.S. Cl.
CPC ............ *G07C 5/006* (2013.01); *G06F 21/31* (2013.01); *G06N 20/00* (2019.01); *G07C 5/008* (2013.01); *G07C 5/0808* (2013.01)

(58) Field of Classification Search
CPC ...... G07C 5/006; G07C 5/008; G07C 5/0808; G06F 21/31; G06N 20/00
See application file for complete search history.

(56) References Cited

U.S. PATENT DOCUMENTS

| | | | | |
|---|---|---|---|---|
| 7,349,825 B1* | 3/2008 | Williams | ............... | G06Q 10/06 702/182 |
| 7,457,763 B1* | 11/2008 | Garrow | ............ | G06Q 10/06311 702/81 |
| 7,761,200 B2* | 7/2010 | Avery | .................... | G06Q 10/06 702/182 |
| 7,984,146 B2* | 7/2011 | Rozak | .................. | H04L 67/125 709/225 |
| 8,740,134 B2* | 6/2014 | Suzuki | ................. | B64C 39/024 244/75.1 |

(Continued)

*Primary Examiner* — Mussa A Shaawat
(74) *Attorney, Agent, or Firm* — Caldwell Intellectual Property Law

(57) ABSTRACT

A system for electric aircraft fleet management for at least an electric aircraft is provided. the system includes a computing device communicatively connected to at least an electric aircraft, wherein the computing device is configured to receive a plurality of measured aircraft operation datum from a sensor disposed on the at least an electric aircraft, select a training set as a function of each measured aircraft operation datum of the plurality of measured aircraft operation datum and the at least an electric aircraft, wherein each measured aircraft operation datum of the plurality of measured aircraft operation datum is correlated to an element of modeled aircraft data, and generate, using a machine-learning algorithm, an aircraft performance model output based on the plurality of measured aircraft operation datum and the selected training set, wherein generating an aircraft performance model includes generating a performance alert.

20 Claims, 19 Drawing Sheets

(56) References Cited

U.S. PATENT DOCUMENTS

| | | | | |
|---|---|---|---|---|
| 9,120,271 | B2* | 9/2015 | Bell | G06Q 10/20 |
| 9,251,502 | B2* | 2/2016 | Schoonveld | G06Q 10/10 |
| 10,204,323 | B1* | 2/2019 | Miller | G07C 5/008 |
| 2004/0167907 | A1* | 8/2004 | Wakefield | G06F 16/30 |
| 2005/0065842 | A1* | 3/2005 | Summers | G06Q 10/20 |
| | | | | 705/305 |
| 2007/0124223 | A1* | 5/2007 | Avery | G06Q 10/0631 |
| | | | | 705/29 |
| 2013/0166135 | A1* | 6/2013 | Dunsdon | G07C 5/0808 |
| | | | | 701/29.3 |
| 2015/0019065 | A1* | 1/2015 | Bollapragada | G07C 5/006 |
| | | | | 701/29.1 |
| 2016/0342920 | A1* | 11/2016 | Tucker | G06Q 10/06316 |
| 2016/0342956 | A1* | 11/2016 | Tucker | G06Q 10/20 |
| 2017/0043884 | A1* | 2/2017 | Bedin | G06Q 10/20 |
| 2019/0080524 | A1* | 3/2019 | Tucker | B64F 5/60 |
| 2019/0176981 | A1* | 6/2019 | Gaillimore | B64C 3/32 |
| 2021/0224413 | A1* | 7/2021 | Gulas | G06F 16/22 |

* cited by examiner

SYSTEMS AND METHODS FOR FLEET MANAGEMENT

CROSS-REFERENCE TO RELATED APPLICATIONS

This application is a continuation of Nonprovisional application Ser. No. 17/406,353 filed on Aug. 19, 2021, and entitled "SYSTEMS AND METHODS FOR FLEET MANAGEMENT," the entirety of which is incorporated herein by reference.

FIELD OF THE INVENTION

The present invention generally relates to the field of aircraft fleet management. In particular, the present invention is directed to a system for electric aircraft fleet management.

BACKGROUND

The operation of an electric aircraft in of itself requires meticulous oversight. Operation of a fleet of electric aircraft can involve each electric aircraft to be used for various purposes such as commercial fight or cargo shipment. Management of the operation of a fleet of electric aircraft that also involves consumers can be difficult for flight managers.

SUMMARY OF THE DISCLOSURE

In an aspect, a system for electric aircraft fleet management for at least an electric aircraft is provided. The system includes a computing device communicatively connected to at least an electric aircraft. The computing device is remote to the at least an electric aircraft. The computing device configured to authenticate the at least an aircraft using a credential received from the at least an electric aircraft. The computing device is configured to receive a plurality of measured aircraft operation datum from a sensor disposed on the at least an electric aircraft. The computing device is configured to select a training set as a function of each measured aircraft operation datum of the plurality of measured aircraft operation datum and the at least an electric aircraft, where each measured aircraft operation datum of the plurality of measured aircraft operation datum is correlated to an element of modeled aircraft data. The computing device is configured to generate, using a machine-learning algorithm, an aircraft performance model output based on the plurality of measured aircraft operation datum and the selected training set, wherein generating an aircraft performance model includes generating a performance alert.

In another aspect, a method for electric aircraft fleet management for at least an electric aircraft is provided. The method includes receiving, by a computing device remote to at least electric aircraft and communicatively connected to the at least an electric aircraft, a plurality of measured aircraft operation datum from a sensor disposed on the at least an electric aircraft, selecting a training set as a function of each measured aircraft operation datum of the plurality of measured aircraft operation datum and the at least an electric aircraft, wherein each measured aircraft operation datum of the plurality of measured aircraft operation datum is correlated to an element of modeled aircraft data, and generating, using a machine-learning algorithm, an aircraft performance model output based on the plurality of measured aircraft operation datum and the selected training set, wherein generating an aircraft performance model includes generating a performance alert.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

Figure 1:
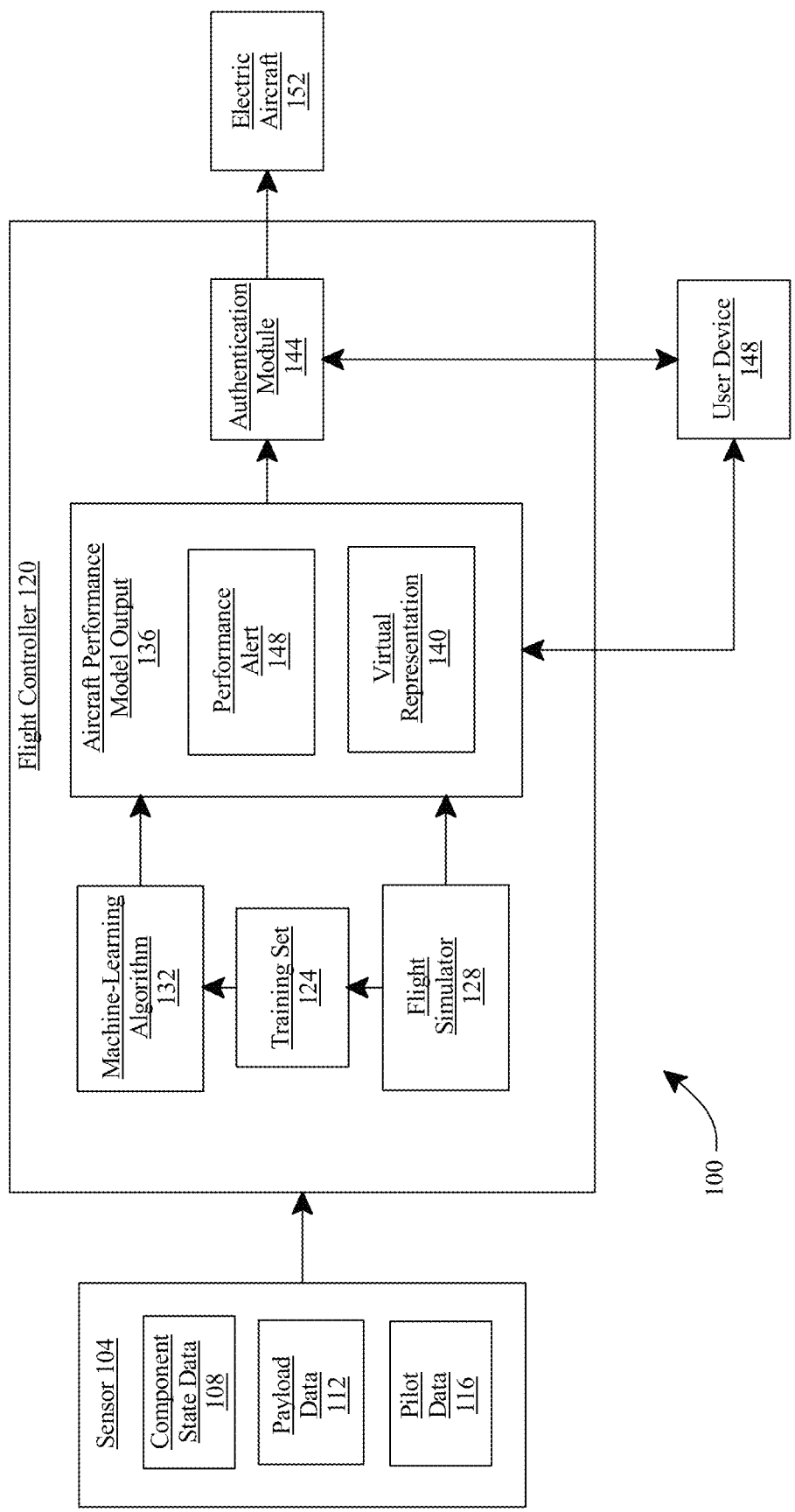
FIG. 1 is a block diagram of an exemplary embodiment of a system for a fleet management system for at least an electric aircraft.

The drawings are not necessarily to scale and may be illustrated by phantom lines, diagrammatic representations and fragmentary views. In certain instances, details that are not necessary for an understanding of the embodiments or that render other details difficult to perceive may have been omitted.

DETAILED DESCRIPTION

In the following description, for the purposes of explanation, numerous specific details are set forth in order to provide a thorough understanding of the present invention. It will be apparent, however, that the present invention may be practiced without these specific details. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

At a high level, aspects of the present disclosure are directed to systems for electric aircraft fleet management by which an aircraft fleet manager may use to view logistical information describing a fleet of electric aircraft. Aspects of the present disclosure can also be used by consumers or customers who own or use electric aircraft to view logistical information of the electric aircraft corresponding to the customer or user. Exemplary embodiments illustrating aspects of the present disclosure are described below in the context of several specific examples.

Aspects of the present disclosure can be used by both consumers and operators to view logistical information including pilot and customer inputs regarding the quality of a flight experience. The system of the present disclosure may allow for a fleet manager to resolve human errors, issues, or complaints and view a variety of visual representations of logistical information regarding the flight of an electric aircraft and the number of repairs performed on an electric aircraft.

Aspects of the present disclosure can be used to verify specific electric aircraft by any infrastructure that may allow for the landing and take-off of an electric aircraft. A recharging station may allow an electric aircraft in the air to transmit data to the recharging station before and/or after authenticating the electric aircraft before it lands on the recharging station.

Aspects of the present disclosure can be used to authenticate users and allow users who have authority over at least an electric aircraft or a fleet of electric aircraft to view a simulation of the flight paths of each electric aircraft, conduct commercial applications with the at least an electric aircraft, etc.

For purposes of this disclosure, in aviation, an "instrument approach," instrument approach plan or instrument approach procedure (IAP) is a series of predetermined maneuvers for the orderly transfer of an aircraft operating under instrument flight rules from the beginning of the initial approach to a landing or to a point from which a landing may be made visually. Instrument flight rules (IFR) is one of two sets of regulations governing all aspects of civil aviation aircraft operations; the other is visual flight rules (VFR). The U.S. Federal Aviation Administration's (FAA) Instrument Flying Handbook defines IFR as: "Rules and regulations established by the FAA to govern flight under conditions in which flight by outside visual reference is not safe. IFR flight depends upon flying by reference to instruments in the flight deck, and navigation is accomplished by reference to electronic signals." It is also a term used by pilots and controllers to indicate the type of flight plan an aircraft is flying, such as an IFR or VFR flight plan.

Aspects of the present disclosure can assist with and/or substitute for air traffic control (ATC) instrument approach for electric aircraft seeking to verify or confirm a proposed or potential flight plan. Typically, instrument flight plane pilots provide information such as type of aircraft, start and departure airport, end airport, current path they want to fly (low/high altitude airways), safety information (people on board, equipment and the like) which is filed through a central government system. Any central or local ATC receives a copy of the intended flight plan.

Referring now to FIG. 1, a block diagram of an exemplary embodiment of a system 100 for a fleet management system for at least an electric aircraft is illustrated. The system 100 includes a flight controller 120 that is communicatively connected to a sensor 104 which is disposed on the at least an electric aircraft. Sensor 104 may be disposed on at least a flight component of an electric aircraft. In a non-limiting embodiment, a sensor 104 may be coupled to an electric aircraft such as the nose of the electric aircraft to capture a wider area of the outside environment. In a non-limiting embodiment, sensor 104 may be coupled to a plurality of flight components such as a landing gear, a propulsor, an energy source, a motor, and the like. "Communicatively connected," for the purposes of this disclosure, refers to two or more components electrically, or otherwise connected and configured to transmit and receive signals from one another. Signals may include electrical, electromagnetic, visual, audio, radio waves, or another undisclosed signal type alone or in combination. Flight controller 120 is configured to receive a plurality of measured aircraft operation datum from the sensor 104. A "measured aircraft operation datum," for the purpose of this disclosure, is an element of data describing the components that factor into the operation of an aircraft. In a non-limiting embodiment, measured aircraft operation datum may include a plurality of histories, records, projections, and the like thereof, regarding the operation of an aircraft. The plurality of measured aircraft operation datum may include a plurality of records, reports, logs, and the like thereof, describing the performance history of the at least an electric aircraft. plurality of measured aircraft operation datum may include information describing, but not limited to, electric aircraft personnel, electric aircraft capabilities, and the like thereof. Any datum or signal herein may include an electrical signal. Electrical signals may include analog signals, digital signals, periodic or aperiodic signal, step signals, unit impulse signal, unit ramp signal, unit parabolic signal, signum function, exponential signal, rectangular signal, triangular signal, sinusoidal signal, sinc function, or pulse width modulated signal. Sensor 104 may include circuitry, computing devices, electronic components or a combination thereof that translates a plurality of datum into at least an electronic signal configured to be transmitted to another electronic component. Plurality of measured aircraft operation datum may include information describing the maintenance, repair, and overhaul of an electric aircraft or an electric aircraft's flight components. plurality of measured aircraft operation datum may include a record of maintenance activities and their results including a plurality of tests, measurements, replacements, adjustments, repairs, and the like, which may be intended to retain and/or restore a functional unit of an electric aircraft. plurality of measured aircraft operation datum may include a record of data of, but not limited to, functional checks, servicing, repairing or replacing of necessary devices, equipment, machinery, and the like, pertaining to an electric aircraft. In a non-limiting embodiment, the plurality of measured aircraft operation datum may include a unique identification number denoting a part of an electric aircraft that was installed, repaired, or replaced as a function of an aircraft maintenance. In a non-limiting embodiment, the plurality of measured aircraft operation datum may include a record of maintenance and/or repair schedules corresponding to an electric aircraft. The plurality of measured aircraft operation datum may include a record of potential maintenance and repair schedules corresponding to an electric aircraft. A "maintenance schedule," for the purposes of this disclosure, refer to an appointment reserved for an aircraft for a maintenance or repair to be conducted upon. A person of ordinary skill in the art, after viewing the entirety of this disclosure, would appreciate the various elements of data pertaining to a record of data in the context of maintenance and repair.

With continued reference to FIG. 1, "sensor," for the purposes of this disclosure, refer to a computing device configured to detect, capture, measure, or combination thereof, a plurality of external and electric vehicle component quantities. Sensor 104 may be integrated and/or connected to at least an actuator, a portion thereof, or any subcomponent thereof. Sensor 104 may include circuitry or electronic components configured to digitize, transform, or otherwise manipulate electrical signals. Electrical signals may include analog signals, digital signals, periodic or aperiodic signal, step signals, unit impulse signal, unit ramp signal, unit parabolic signal, signum function, exponential signal, rectangular signal, triangular signal, sinusoidal signal, sinc function, or pulse width modulated signal. The plurality of datum captured by sensor 104 may include circuitry, computing devices, electronic components or a combination thereof that translates into at least an electronic signal configured to be transmitted to another electronic component.

With continued reference to FIG. 1, sensor 104 may include a plurality of sensors in the form of individual sensors or a sensor suite working in tandem or individually. A sensor suite may include a plurality of independent sensors, as described herein, where any number of the described sensors may be used to detect any number of physical or electrical quantities associated with an aircraft power system or an electrical energy storage system. Independent sensors may include separate sensors measuring physical or electrical quantities that may be powered by and/or in communication with circuits independently, where each may signal sensor output to a control circuit such as a user graphical interface. In an embodiment, use of a plurality of independent sensors may result in redundancy configured to employ more than one sensor that measures the same phenomenon, those sensors being of the same type, a combination of, or another type of sensor not disclosed, so that in the event one sensor fails, the ability to detect phenomenon is maintained and in a non-limiting example, a user alter aircraft usage pursuant to sensor readings. Sensor may be configured to detect pilot input from at least pilot control. At least pilot control may include a throttle lever, inceptor stick, collective pitch control, steering wheel, brake pedals, pedal controls, toggles, joystick. One of ordinary skill in the art, upon reading the entirety of this disclosure would appreciate the variety of. Collective pitch control may be consistent with disclosure of collective pitch control in U.S. patent application Ser. No. 16/929,206 and titled "HOVER AND THRUST CONTROL ASSEMBLY FOR DUAL-MODE AIRCRAFT", which is incorporated herein by reference in its entirety.

With continued reference to FIG. 1, sensor 104 may include a motion sensor. A "motion sensor," for the purposes of this disclosure is a device or component configured to detect physical movement of an object or grouping of objects. One of ordinary skill in the art would appreciate, after reviewing the entirety of this disclosure, that motion may include a plurality of types including but not limited to: spinning, rotating, oscillating, gyrating, jumping, sliding, reciprocating, or the like. Sensor 104 may include, but not limited to, torque sensor, gyroscope, accelerometer, magnetometer, inertial measurement unit (IMU), pressure sensor, force sensor, proximity sensor, displacement sensor, vibration sensor, LIDAR sensor, and the like. In a non-limiting embodiment sensor 104 ranges may include a technique for the measuring of distances or slant range from an observer including sensor 104 to a target which may include a plurality of outside parameters. "Outside parameter," for the purposes of this disclosure, refer to environmental factors or physical electric vehicle factors including health status that may be further be captured by a sensor 104. Outside parameter may include, but not limited to air density, air speed, true airspeed, relative airspeed, temperature, humidity level, and weather conditions, among others. Outside parameter may include velocity and/or speed in a plurality of ranges and direction such as vertical speed, horizontal speed, changes in angle or rates of change in angles like pitch rate, roll rate, yaw rate, or a combination thereof, among others. Outside parameter may further include physical factors of the components of the electric aircraft itself including, but not limited to, remaining fuel or battery. Outside parameter may include at least an environmental parameter. Environmental parameter may be any environmentally based performance parameter as disclosed herein. Environment parameter may include, without limitation, time, pressure, temperature, air density, altitude, gravity, humidity level, airspeed, angle of attack, and debris, among others. Environmental parameters may be stored in any suitable datastore consistent with this disclosure. Environmental parameters may include latitude and longitude, as well as any other environmental condition that may affect the landing of an electric aircraft. Technique may include the use of active range finding methods which may include, but not limited to, light detection and ranging (LIDAR), radar, sonar, ultrasonic range finding, and the like. In a non-limiting embodiment, sensor 104 may include at least a LIDAR system to measure ranges including variable distances from the sensor 104 to a potential landing zone or flight path. LIDAR systems may include, but not limited to, a laser, at least a phased array, at least a microelectromechanical machine, at least a scanner and/or optic, a photodetector, a specialized GPS receiver, and the like. In a non-limiting embodiment, sensor 104 including a LIDAR system may targe an object with a laser and measure the time for at least a reflected light to return to the LIDAR system. LIDAR may also be used to make digital 4-D representations of areas on the earth's surface and ocean bottom, due to differences in laser return times, and by varying laser wavelengths. In a non-limiting embodiment the LIDAR system may include a topographic LIDAR and a bathymetric LIDAR, wherein the topographic LIDAR that may use near-infrared laser to map a plot of a land or surface representing a potential landing zone or potential flight path while the bathymetric LIDAR may use water-penetrating green light to measure seafloor and various water level elevations within and/or surrounding the potential landing zone. In a non-limiting embodiment, electric aircraft may use at least a LIDAR system as a means of obstacle detection and avoidance to navigate safely through environments to reach a potential landing zone. Sensor 104 may include a sensor suite which may include a plurality of sensors that may detect similar or unique phenomena. For example, in a non-limiting embodiment, sensor suite may include a plurality of accelerometers, a mixture of accelerometers and gyroscopes, or a mixture of an accelerometer, gyroscope, and torque sensor.

With continued reference to FIG. 1, sensor 104 is configured to detect a plurality of measured aircraft operation datum including aircraft component state data 108, a payload data 112, and a pilot data 116. A "component state data," for the purposes of this disclosure, refer to any datum that represents the status or health status of a flight component or any component of an electric aircraft. The component state data 108 of a plurality of flight components. "Flight components," for the purposes of this disclosure, includes components related to, and mechanically connected to an aircraft that manipulates a fluid medium in order to propel and maneuver the aircraft through the fluid medium. The operation of the aircraft through the fluid medium will be discussed at greater length hereinbelow. Aircraft component state data 108 may include a plurality of state information of a plurality of aircraft components of the electric aircraft. A state information of the plurality of state information of the plurality of aircraft components may include an aircraft flight duration, a distance of the aircraft flight, a plurality of distances of an aircraft from the surface, and the like. The component state data 108 may denote a location of the aircraft, status of the aircraft such as health and/or functionality, aircraft flight time, aircraft on frame time, and the like thereof. Component state data 108 may include aircraft logistics of an electric aircraft of a plurality of electrical aircraft. An "aircraft logistics," for the purposes of this disclosure, refer to a collection of datum representing any detailed organization and implementation of an operation of an electric aircraft. In a non-limiting embodiment, aircraft logistics may include unique identification numbers assigned to each electric aircraft. In a non-limiting embodiment, aircraft logistics may include a historical record of locations corresponding to an electric aircraft that may represent the aircraft's destination or potential destination. Aircraft logistics may include time an electric aircraft was in the air and a historical record of the different rate of velocity the aircraft may have commanded. Aircraft component state data 108 may include a history of health information of an electric aircraft. In a non-limiting embodiment, a history of an electric aircraft's health may be measured with the ability to be presented in a visual format to a user. Component state data 108 may include potential health data or potential data of electric aircraft and/or electric aircraft parts that may be incorporated on to an electric aircraft. A person of ordinary skill in the art, after viewing the entirety of this disclosure, would appreciate the type of data measured in the context of aircraft logistics.

With continued reference to FIG. 1, sensor 104 is configured to detect a plurality of measured aircraft operation datum including a payload data 112. A "payload data," for the purposes of this disclosure, refer to any datum that describes the cargo of an electric aircraft. payload data 112 may include information describing the logistics or aircraft logistics of a commercial application of the at least an electric aircraft. In a non-limiting embodiment, payload data 112 may include information about, but not limited to, the delivery location, the pickup location, the type of package and/or cargo, the priority or the package, and the like thereof. A person of ordinary skill in the art, after viewing the entirety of this disclosure, would appreciate the multitude of information for a payload data.

With continued reference to FIG. 1, sensor 104 is configured to detect a plurality of measured aircraft operation datum including a pilot data 116. A "pilot data," for the purposes of this disclosure, refer to any datum that represent a state of information of a pilot of an electric aircraft. Pilot data 116 may include any datum that refers to at least an element of data identifying and/or a pilot input or command. At least pilot control may be communicatively connected to any other component presented in system, the communicative connection may include redundant connections configured to safeguard against single-point failure. Pilot input may indicate a pilot's desire to change the heading or trim of an electric aircraft. Pilot input may indicate a pilot's desire to change an aircraft's pitch, roll, yaw, or throttle. Aircraft trajectory is manipulated by one or more control surfaces and propulsors working alone or in tandem consistent with the entirety of this disclosure, hereinbelow. Pitch, roll, and yaw may be used to describe an aircraft's attitude and/or heading, as they correspond to three separate and distinct axes about which the aircraft may rotate with an applied moment, torque, and/or other force applied to at least a portion of an aircraft. Pilot data 116 may include any information describing the movement and actions of the pilot during a flight. In a non-limiting embodiment, pilot data 116 may record any buttons or electrical component that the pilot may have completed an action upon. The record of the actions may be used by the flight controller 120 to map a flight simulation which may include a general simulation of the pilot's actions and movements. A person of ordinary skill in the art, after viewing the entirety of this disclosure, would appreciate the monitoring and mapping of a pilot's movements and actions in the context of simulation.

With continued reference to FIG. 1, the pilot data 116 may include a pilot input and/or pilot control that may include an electrical. Any pilot input as described herein may be consistent with any pilot input as described in U.S. patent application Ser. No. 17/218,387 filed on Mar. 31, 2021, and titled, "METHOD AND SYSTEM FOR FLY-BY-WIRE FLIGHT CONTROL CONFIGURED FOR USE IN ELECTRIC AIRCRAFT," which is incorporated herein in its entirety by reference. Pilot input may include a pilot control which may include a throttle wherein the throttle may be any throttle as described herein, and in non-limiting examples, may include pedals, sticks, levers, buttons, dials, touch screens, one or more computing devices, and the like. Additionally, a right-hand floor-mounted lift lever may be used to control the amount of thrust provided by the lift fans or other propulsors. The rotation of a thumb wheel pusher throttle may be mounted on the end of this lever and may control the amount of torque provided by the pusher motor, or one or more other propulsors, alone or in combination. Any throttle as described herein may be consistent with any throttle described in U.S. patent application Ser. No. 16/929,206 filed on Jul. 15, 2020, and titled, "A HOVER AND THRUST CONTROL ASSEMBLY FOR DUAL-MODE AIRCRAFT", which is incorporated herein in its entirety by reference. Sensor 104 may be mechanically and communicatively connected to an inceptor stick. The pilot input may include a left-hand strain-gauge style STICK for the control of roll, pitch and yaw in both forward and assisted lift flight. A 4-way hat switch on top of the left-hand stick enables the pilot to set roll and pitch trim. Any inceptor stick described herein may be consistent with any inceptor or directional control as described in U.S. patent application Ser. No. 17/001,845 filed on Aug. 25, 2020, and titled, "A HOVER AND THRUST CONTROL ASSEMBLY FOR DUAL-MODE AIRCRAFT", which is incorporated herein in its entirety by reference.

With continued reference to FIG. 1, pilot data 116 may include a plurality of pilot tracking elements. A "pilot tracking element," for the purposes of this disclosure, refer to any datum that represents a piece of data describing a pilot of an aircraft. In a non-limiting embodiment, a pilot tracking element may include a health status of the pilot, alert status of the pilot, experience level, and the like thereof. Pilot tracking element may include age of the pilot, a customer rating of the pilot, and the like thereof. In a non-limiting embodiment, a customer or passenger may use the fleet management system 100 to retrieve information regarding the pilot of an electric aircraft the customer may be a passenger of or be the owner of A person of ordinary skill in the art, after viewing the entirety of this disclosure, would appreciate the plurality of information concerning the pilot in the context of a fleet management system.

With continued reference to FIG. 1, the flight controller 120 is configured to receive the plurality of measured aircraft operation datum from the sensor 104. Flight controller 120 may include a computing device, wherein the computing device is described in further detail below. Flight controller 120 further may include a consumer tool which is configured to be used for commercial applications. A "consumer tool," for the purposes of this disclosure, refer to a computer program that is used to facilitate commercial applications. Commercial applications may include, but not limited to, delivery of cargo, transportation of passengers, and the like thereof. Consumer tool may include a load calculation, optimization of package deliveries, and the like thereof. Consumer tool is further configured, in part, to generate an aircraft performance model output 136. The system 100 may configure the flight controller 120 to integrate a plurality of consumer tools into the system and at least a user device 148. In a non-limiting embodiment, consumer tool may be used to store, retrieve, and view a plurality of information regarding the logistics of commercial applications. In a non-limiting embodiment, a customer may use the consumer tool to optimize the delivery of packages and/or cargo. For example, the consumer tool may perform various optimization algorithms and calculations to complete a delivery or flight request. A person of ordinary skill in the art, after viewing the entirety of this disclosure, would appreciate the purpose of a consumer tool in the context of commercial applications. The flight controller 120 may include at least a hooking procedure configured to integrate additional functionalities with existing subsystems of the flight controller 120 including a consumer tool. A "hooking procedure," for the purposes of this disclosure, refer to a plurality of techniques used to alter the behavior of operating systems, applications, and other software components. In a non-limiting embodiment, the flight controller 120 may be configured to perform debugging and extending functionality of a subsystem including a consumer tool. In a non-limiting embodiment, the flight controller 120 may intercept user input such as a keyboard or mouse event from the consumer tool before the consumer tool may be used to impact the generating of an aircraft performance model output 136 and/or a machine-learning algorithm 132. In a non-limiting embodiment, flight controller 120 may perform benchmarking programs to measure quantifiable information of existing systems such as the consumer tool. A person of ordinary skill in the art, after viewing the entirety of this disclosure, would appreciate the range of techniques used to augment existing applications into the overall system in the context of management.

With continued reference to FIG. 1, flight controller 120 is configured to select a training set 124 as a function of the plurality of measured aircraft operation datum. The training set includes the plurality of measured aircraft operation datum correlated to an element of modeled aircraft data. An "element of modeled aircraft data," for the purpose of this disclosure, is a virtual representation of an aircraft event or phenomenon. Element of modeled aircraft data may include a virtual representation. In a non-limiting embodiment, element of modeled aircraft data may include a visualization of a history and/or records of the plurality of measured aircraft operation datum. The element of modeled aircraft data may include a simulation of a flight. Selecting the training data may be performed utilizing any means of selection as described in the entirety of this disclosure. In a non-limiting embodiment, selecting a training set 124 may include correlating the plurality of measured aircraft operation datum to an aircraft performance model output 136 which may include a health projection for at least a flight component associated. A "health projection," for the purpose of this disclosure, is a predictive model of the health status of at least a flight component of a plurality of flight components of an electric aircraft. In a non-limiting embodiment, selecting training set 124 may include correlating the plurality of measured aircraft operation datum to a health history for at least a flight component. A "health history," for the purpose of this disclosure, is a record and/or model depicting a history of the health status of the at least a flight component of a plurality of flight components. In a non-limiting embodiment, the health history may include the health of at least a flight component since an authentication of an electric aircraft by the system 190. In a non-limiting embodiment, health history may be inputted by a user.

With continued reference to FIG. 1, flight controller 120 may be configured to operate a flight simulator 128. A "flight simulator" is a program or set of operations that simulate flight. In some cases, a flight simulator may simulate flight within an environment, for example an environmental atmosphere in which aircraft fly, airports at which aircraft take-off and land, and/or mountains and other hazards aircraft attempt to avoid crashing into. In some cases, an environment may include geographical, atmospheric, and/or biological features. For instance and without limitation, flight simulator may be consistent with disclosure of flight simulator in U.S. patent application Ser. No. 17/348,916 and titled "METHODS AND SYSTEMS FOR SIMULATED OPERATION OF AN ELECTRIC VERTICAL TAKE-OFF AND LANDING (EVTOL) AIRCRAFT," which is incorporated herein by reference in its entirety. In some cases, a flight simulator 128 may model an artificial and/or virtual aircraft in flight as well as an environment in which the artificial and/or virtual aircraft flies. In some cases, a flight simulator 128 may include one or more physics models, which represent analytically or through data-based, such as without limitation machine-learning processes, physical phenomenon. Physical phenomenon may be associated with an aircraft and/or an environment. For example, some versions of a flight simulator 128 may include thermal models representing aircraft components by way of thermal modeling. Thermal modeling techniques may, in some cases, include analytical representation of one or more of convective hear transfer (for example by way of Newton's Law of Cooling), conductive heat transfer (for example by way of Fourier conduction), radiative heat transfer, and/or advective heat transfer. In some cases, flight simulator 128 may include models representing fluid dynamics. For example, in some embodiments, flight simulator may include a representation of turbulence, wind shear, air density, cloud, precipitation, and the like. In some embodiments, flight simulator 128 may include at least a model representing optical phenomenon. For example, flight simulator may include optical models representative of transmission, reflectance, occlusion, absorption, attenuation, and scatter. Flight simulator 128 may include non-analytical modeling methods; for example, the flight simulator may include, without limitation, a Monte Carlo model for simulating optical scatter within a turbid medium, for example clouds. In some embodiments, a flight simulator 128 may represent Newtonian physics, for example motion, pressures, forces, moments, and the like. A person of ordinary skill in the art, after viewing the entirety of this disclosure, would appreciate the embodiment that may result from a flight simulation in the context of fleet management.

With continued reference to FIG. 1, flight simulator 128 With continued reference to FIG. 1, flight controller 120 may be configured to simulate at least a virtual representation 140. Flight similar 128 may generate at least a virtual representation 140 and transmit it to an aircraft performance model output 136. Aircraft performance model output 136 may receive a virtual representation 140 instead as a function of a machine-learning algorithm 132 trained by training set 124. As described in this disclosure, a "virtual representation" includes any model or simulation accessible by computing device which is representative of a physical phenomenon, for example without limitation at least an aircraft component. For instance and without limitation, virtual representation may be consistent with virtual representation in U.S. patent application Ser. No. 17/348,916 title "METHODS AND SYSTEMS FOR SIMULATED OPERATION OF AN ELECTRIC VERTICAL TAKE-OFF AND LANDING (EVTOL) AIRCRAFT," which is incorporated by reference in its entirety. In some cases, virtual representation may be interactive with flight simulator 128. For example, in some cases, data may originate from virtual representation and be input into flight simulator 128. Alternatively or additionally, in some cases, virtual representation 140 may modify or transform data already available to flight simulator 128. Virtual representation 140 may include an aircraft digital twin 140 of at least an aircraft component 116. Aircraft digital twin 140 may include any digital twin as described in this disclosure, for example below. In some cases, at least an aircraft component includes an electric vertical take-off and landing (eVTOL) aircraft, for example a functional flight-worthy e aircraft; and aircraft digital twin 140 is a digital twin of the eVTOL aircraft. In some cases, at least a virtual representation 140 may include a virtual controller area network. For instance and without limitation, virtual controller area network may be consistent with disclosure of virtual controller area network in U.S. patent application Ser. No. 17/218,342 titled "METHOD AND SYSTEM FOR VIRTUALIZING A PLURALITY OF CONTROLLER AREA NETWORK BUS UNITS COMMUNICATIVELY CONNECTED TO AN AIRCRAFT," which is incorporated by reference in its entirety.

With continued reference to FIG. 1, flight controller 120 is configured to generate an aircraft performance model output 136 as a function of the plurality of measured aircraft operation datum from the sensor and a machine-learning algorithm 132. An "aircraft performance model output," for the purpose of this disclosure, is an analytical and/or interactive visualization regarding aircraft operation and/or performance capabilities. In a non-limiting embodiment, aircraft performance model output 136 may include dashboards and reports configured to be manipulated by a user. The aircraft performance model output 136 may be generated as a function of at least a consumer tool. The aircraft performance model output 136 is described in further detail in FIG. 3. In a non-limiting embodiment, the aircraft performance model output 136 may be identified as a function of a consumer tool wherein the tool may include load calculations, optimization of package deliveries, a platform for communication of user inputs including complaints, and the like thereof. The aircraft performance model output 136 may be configured to allow for user interaction. The aircraft performance model output 136 may include a plurality of visual information that may be configured to be viewed and/or modified by a user via user device such as a user device 148 as a function of a flight management control 148 program.

With continued reference to FIG. 1, aircraft performance model output 136 may be configured to generate and/or include a virtual representation 140. Virtual representation may include any virtual representation as described herein. In a non-limiting embodiment, virtual representation 140 may include a flight simulation of a plurality of flight simulations of a history of past flights of an electric aircraft. Aircraft performance model output 136 may include a virtual representation of an action of a plurality of commercial applications. For instance, virtual representation may include a three-dimensional and/or two-dimensional video simulation of the process of a commercial application performed by an electric aircraft, which may be viewed, modified, configured, or combination thereof, by a user device 148. Aircraft performance model output may include a virtual representation of passenger and/or personnel related complains, issues, and the like. For instance, the virtual representation may depict a moment or issue that occurred by humans in an electric aircraft during a flight. In a non-limiting embodiment, a user may use a user device 148 to audit complaints, noise complaints for low altitude, pilot complaints and/or issues, and the like. In a non-limiting embodiment, aircraft performance model output 136 may include a plurality of histories, records, and schedules regarding the health status, maintenance, quality, and the like thereof, of the components of an electric aircraft. Aircraft performance model output 136 may further be configured to include a health projection for the at least a flight component associated with each measured aircraft operation datum of the plurality of measured aircraft operation datum. Aircraft performance model output 136 may be further configured to include a health history for the at least a flight component associated with each measured aircraft operation datum of the plurality of measured aircraft operation datum. A person of ordinary skill in the art, after viewing the entirety of this disclosure, would appreciate the multitude of aircraft information content of the aircraft performance model output.

With continued reference to FIG. 1, aircraft performance model output 136 includes a performance alert 148. A "performance alert," for the purpose of this disclosure, is a predictive warning sign indicating an issue. Performance alert 148 may include a warning sign indicating increment weather, unusually high turbulence, a flight highway with considerable traffic, and the like thereof. In a non-limiting embodiment, performance alert 148 may be depicted in a graphical format. Performance alert 148 may include a plurality of colors, sizes, and associated sounds configured to attract the attention of a user, pilot, and the like thereof. Performance alert 148 may include a warning sign for any instance of an issue. For example, a new and/or unexpected issue may occur during a flight regarding a flight component, an electric aircraft personnel, pilot, passenger, cargo, authentication, and the like thereof. In a non-limiting embodiment, flight controller 120 may be configured to record a plurality of data during an occurrence of an issue or during an occurrence of a predictive issue that may occur. In a non-limiting embodiment, performance alert 146 may include a plurality of performance alerts for each major flight component. For instance, a performance alert 146 may flash and alert a user during an occurrence of a failure or degradation of a flight component during flight, before takeoff, after landing, and the like thereof. In a non-limiting embodiment, performance alert 146 may be triggered when an obstructive outside parameter is detected. A person of ordinary skill in the art, after viewing the entirety of this disclosure, would appreciate the function of an alert in the context of detecting, avoiding, and analyzing unexpected and potentially hazardous obstacles and/or issues.

With continued reference to FIG. flight controller 120 is configured to generate an aircraft performance model 136 as a function of a machine-learning algorithm 132 based on the plurality of measured aircraft operation datum and the selected training set 124. Machine-learning algorithm, without limitation, a linear discriminant analysis. Machine-learning algorithm may include quadratic discriminate analysis. Machine-learning algorithms may include kernel ridge regression. Machine-learning algorithms may include support vector machines, including without limitation support vector classification-based regression processes. Machine-learning algorithms may include stochastic gradient descent algorithms, including classification and regression algorithms based on stochastic gradient descent. Machine-learning algorithms may include nearest neighbors algorithms. Machine-learning algorithms may include Gaussian processes such as Gaussian Process Regression. Machine-learning algorithms may include cross-decomposition algorithms, including partial least squares and/or canonical correlation analysis. Machine-learning algorithms may include naïve Bayes methods. Machine-learning algorithms may include algorithms based on decision trees, such as decision tree classification or regression algorithms. Machine-learning algorithms may include ensemble methods such as bagging meta-estimator, forest of randomized tress, AdaBoost, gradient tree boosting, and/or voting classifier methods. Machine-learning algorithms may include neural net algorithms, including convolutional neural net processes.

With continued reference to FIG. 1, flight controller 120 may configured generate an aircraft performance model output 136 as a function of the plurality of measured aircraft operation datum and a machine-learning algorithm 132. Machine-learning model may include an aircraft performance model output machine-learning model. Aircraft performance model output 136 may be generated as a function of a user. Generating the aircraft performance model output 136 may include generating a aircraft performance model output 136 training data using the plurality of measured data detected by the sensor 104 wherein the plurality of measured aircraft operation datum includes the aircraft component state data 108, the payload data 112, and the pilot data 116, and training an aircraft performance model output machine-learning model with the aircraft performance model output 136 training data that includes a plurality of data entries wherein each entry correlates the plurality of measured data to a plurality of aircraft performance model outputs 136 which may be retrieved from a schedule database, and generating the aircraft performance model output 136 as a function of the aircraft performance model output machine-learning model and the plurality of measured aircraft operation datum. Aircraft performance model output machine-learning model may generate aircraft performance model output 136 using alternatively or additional artificial intelligence methods, including without limitation by creating an artificial neural network, such as a convolutional neural network comprising an input layer of nodes, one or more intermediate layers, and an output layer of nodes. Connections between nodes may be created via the process of "training" the network. in which elements from a training dataset are applied to the input nodes. a suitable training algorithm (such as Levenberg-Marquardt. conjugate gradient, simulated annealing, or other algorithms) is then used to adjust the connections and weights between nodes in adjacent layers of the neural network to produce the desired values at the output nodes. This process is sometimes referred to as deep learning.

Continuing in reference to FIG. 1, aircraft performance model output training data may include any aircraft component state data 108, the payload data 112, and the pilot data 116 data, as described above, organized into training data, as described herein. Such training data may include a plurality of data entries of schedules and/or flight plans and any data describing the schedules and/or flight plans. Training data may originate as analysis from previous flights and/or flight plans of the electric aircraft, previous flights and/or flight plans of different electric aircraft distinct from one another, and the like, from one or more electric aircraft. Training data may originate as analysis from previous schedules of maintenance and/or repair, schedules of flight plans including passenger flight and/or deliveries, and the like thereof. Aircraft performance model output training data may originate from one or more electric aircraft pilots, air traffic control (ATC) operators, customer and/or consumers, electric aircraft owners, and the like thereof, via a user interface such as a user device 148 and at least a consumer tool communicatively connected with a flight controller to provide flight history, schedule history, pilot history, air traffic history, weather condition information, and the like thereof. In a non-limiting embodiment, Flight controller 120 may receive training data for training aircraft performance model output machine-learning model. It is important to note that training data for machine-learning processes, algorithms, and/or models used herein may originate from any source described for aircraft performance model output 136 training data.

Continuing in reference to FIG. 1, an aircraft performance model output machine-learning model may include any machine-learning algorithm such as K-nearest neighbors algorithm, a lazy naïve Bayes algorithm, and the like, machine-learning process such as supervised machine-learning, unsupervised machine-learning, or method such as neural nets, deep learning, and the like, as described in further detail below. Aircraft performance model output machine-learning model may be trained to derive an algorithm, function, series of equations, or any mathematical operation, relationship, or heuristic, which can automatedly accept an input of plurality of measured aircraft operation datum and generate an output of an aircraft performance model output 136. Aircraft performance model output 136 machine-learning algorithm 132 may derive individual functions describing unique relationships observed from the aircraft performance model output 136 training data for each aircraft component state data 108, payload data 112, and pilot data 116, wherein different relationships may emerge between different pilots, electric aircraft, type of cargo and/or number of passengers in an electric aircraft, flight priority of an electric aircraft, and the like. aircraft performance model output machine-learning model may derive relationships from the training data which indicate patterns in estimated flight duration of different flight plans or proposed flight plans according to where an electric aircraft is departing from and/or arriving to, and the like. Aircraft performance model output 136 may include any number of parameters, numerical values, strings, functions, mathematical expressions, text, and the like. Aircraft performance model output 136 and at least a schedule database 200 may become increasingly more complete, and more robust, with larger sets of plurality of measured aircraft operation datum.

With continued reference to FIG. 1, flight controller 120 may include an authentication module 144. Authentication module 144 may include any suitable software and/or hardware as described in the entirety of this disclosure. In an embodiment, authentication module 144 and/or computing device 104 is configured to authenticate at least an electric aircraft 152 and/or user device 148. Authentication module 144 may include a login portal for users to submit credentials. Authentication module 144 and/or computing device 104 may be configured to receive a credential associated with a user and/or electric aircraft 152 from at least an electric aircraft 152 and/or user device 148, compare the credential from at least an electric aircraft 152 and/or user device 148 to an authorized credential stored within an authentication database, and bypass authentication for at least an electric aircraft 152 and/or user device 148 based on the comparison of the credential from at least an electric aircraft 152 and/or user device 148 to the authorized credential stored within the authentication database. A "credential" as described in the entirety of this disclosure, is a datum representing an identity, attribute, code, and/or characteristic specific to a user and/or user device. For example, and without limitation, the credential may include a username and password unique to the user and/or user device. The username and password may include any alpha-numeric character, letter case, and/or special character. As a further example and without limitation, the credential may include a digital certificate, such as a PKI certificate. At least an electric aircraft 152 and/or user device 148 may include an additional computing device, such as a mobile device, laptop, desktop computer, or the like; as a non-limiting example, the at least an electric aircraft 152 and/or user device 148 may be a computer and/or smart phone operated by a pilot-in-training at an airport hangar. At least an electric aircraft 152 and/or user device 148 may include, without limitation, a display in communication with computing device 104; the display may include any display as described in the entirety of this disclosure such as a light emitting diode (LED) screen, liquid crystal display (LCD), organic LED, cathode ray tube (CRT), touch screen, or any combination thereof. Output data from computing device 104 may be configured to be displayed on at least an electric aircraft 152 and/or user device 148 using an output graphical user interface. An output graphical user interface may display any output as described in the entirety of this disclosure. Further, authentication module 144 and/or computing device 104 may be configured to receive a credential from instructor device 116. Instructor device 116 may include any additional computing device as described above, wherein the additional computing device is utilized by and/or associated with a certified flight instructor. As a further embodiment, authentication module 144 and/or computing device 104 may be configured to receive a credential from admin device 120. Admin device 120 may include any additional computing device as described above in further detail, wherein the additional computing device is utilized by/associated with an employee of an administrative body, such as an employee of the federal aviation administration.

With continued reference to FIG. in a non-limiting embodiment, the credential may include a username and password unique to an electric aircraft. For instance, a recharging pad may attempt to authenticate an electric aircraft to confirm it is an electric aircraft and that it is compatible to charge the electric aircraft. In a non-limiting embodiment, authentication module 144 may transmit an aircraft performance model output 136 to a user device when the credentials of a user and/or electric aircraft have been verified. In a non-limiting embodiment, authentication module 144 may manipulate the aircraft performance model output 136 to be displayed to a user with varying authority. Authentication module 144 may incorporate priority classifiers used to classify low, average, and high classification of authorized users and/or electric aircraft. For instance, a user with a lower priority classification may be a passenger or an electric aircraft, a mechanic operating maintenance on the electric aircraft, and the like thereof. Users with lower priority classifications detected by authentication module 144 may allow a limited amount of aircraft information to be displayed to a user device 148 for viewing by the users with lower priority classification. Limited amount of aircraft information may include a limited aircraft performance model output 136. In another example, user with a high priority classification may be a fleet manager, a captain or lead pilot of an electric aircraft, an owner of at least an electric aircraft, and the like thereof. In a non-limiting embodiment, authentication module 144 may detect users with high priority classifications and transmit a robust aircraft performance model output 136 that may include, but not limited to, three-dimensional flight simulation including predictive pilot and cargo movement, history and/or record of pilot information, schedule information, and the like thereof, a robust performance alert 148, or a combination of the like thereof a person of ordinary skill in the art, after viewing the entirety of this disclosure, would appreciate the various amount of information allowed to be viewed for different levels of authority.

With continued reference to FIG. 1, in a non-limiting embodiment, authentication module 144 may be used by an electric aircraft infrastructure. Electric aircraft infrastructure may include any infrastructure that may support an electric aircraft. electric aircraft infrastructure may include at least a computing device. electric aircraft infrastructure may include, but not limited to, recharging pad, docking terminal, electric aircraft hangar, fleet hangar, and the like thereof. Electric aircraft infrastructure may include its own authentication module. In a non-limiting embodiment, an electric aircraft infrastructure may authenticate an electric aircraft in the air and allow the electric aircraft to land on the electric aircraft infrastructure. In a non-limiting embodiment, an electric aircraft infrastructure may deny or unauthorize an electric aircraft from landing on the infrastructure. For instance, the authentication module of an electric aircraft may include identifying information that the electric aircraft is supposed to be flying, is supposed to arrive at a location and/or electric aircraft infrastructure, is a valid electric aircraft that is not stolen, and the like thereof. In a non-limiting embodiment, authentication module is used to verify users and/or electric aircraft. In a non-limiting embodiment, authentication module is used as a security measure for physical and electronic applications. A person of ordinary skill in the art, after viewing the entirety of this disclosure, would appreciate the function of an authentication module in the context of secure data exchange.

With continued reference to FIG. 1, the flight controller 120 is configured to send the aircraft performance model output 136 to a user device 148 wherein the user device is configured to receive the aircraft performance model output 136 and display the aircraft performance model output 136 by a graphical user interface (GUI). User device 148 may receive the performance alert and display it by a GUI. A "user device," for the purposes of this disclosure, refer to any user device or computing device that a user may interact with to view and control a plurality of information. User device 148 may include a user device. User device may include any computing device, wearable computer, mobile device, remote device, and the like. User device 148 may include an input device. Input device may include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, an inceptor stick, and any combinations thereof. Output device 148 may receive input from user through standard I/O interface such as ISA (Industry Standard Architecture), PCI (Peripheral Component Interconnect) Bus, and the like. User device 148 may receive input from user through standard I/O operation. In a non-limiting embodiment, user device 148 may further receive input from user through optical tracking of motion. In a non-limiting embodiment, user device 148 may further receive input from user through voice-commands. User device 148 may further use event-driven programming, where event listeners are used to detect input from user and trigger actions based on the input.

With continued reference to FIG. 1, the user device 148 may include a display which may include a graphical user interface (GUI) 148. GUI 148 may be configured to display the aircraft performance model output 136. As described herein, a GUI 148 is a form of user interface that allows users to interact with the controller through graphical icons and/or visual indicators. The user may, without limitation, interact with GUI 148 through direct manipulation of the graphical elements. GUI 148 may be configured to display at least an element of a flight plan, as described in detail below. As an example, and without limitation, GUI 148 may be displayed on any electronic device, as described herein, such as, without limitation, a computer, tablet, remote device, and/or any other visual display device. User device 148 may be configured to present, to a user, information related to the flight plan, flight plan schedule, a maintenance and/or repair schedule, a flight simulation, pilot information, customer experience information, and the like. User device 148 may include a multi-function display (MFD), primary display, gauges, graphs, audio cues, visual cues, information on a heads-up display (HUD) or a combination thereof. User device 148 may include a display disposed in one or more areas of an electric aircraft, on a user device remotely located, one or more computing devices, or a combination thereof. Display may be disposed in a projection, hologram, or screen within a user's helmet, eyeglasses, contact lens, or a combination thereof. GUI 104 may display a flight simulation in graphical form. Graphical form may include a two-dimensional plot of two variables that represent data received by the controller, such as past maneuvers and predicted future maneuvers. In one embodiment, GUI 104 may also display the user's input in real-time. in a non-limiting embodiment, user device 148 may be used to schedule, modify, and/or cancel a maintenance/repair schedule for an electric aircraft. In a non-limiting embodiment, a flight manager may log in to a flight management control 148 via the user device 148 and/or GUI 148 to schedule, modify, and/or cancel a plurality of schedules from the aircraft performance model output 136. For example, the flight manager may manage a fleet of electric aircraft and be informed of various operations the fleet of electric aircraft is or may be assigned. The flight management control 148 may include a consumer tool 148 that may be configured to resolve a plurality of consumer related incidents. For example, a consumer, a user, a pilot, a passenger, and the like thereof, may input in issue which may include a complaint, incident, failure, experience, and the like, in which the flight manager may view and resolve each issue through the flight management control 148. This may be done remotely via a remote device and/or remote user device 148. In a non-limiting embodiment, a user who may include an owner of an electric aircraft, may use the user device 148 to log into the flight management control 148 program to view a historical record of schedules related to the user's aircraft and a historical record describing various information of the pilot of the aircraft. For example, the user may schedule maintenance, flights, and the like thereof for the user's own aircraft. A person of ordinary skill in the art, after viewing the entirety of this disclosure, would appreciate the various functionalities the user device 148.

With continued reference to FIG. 1, the flight management control 148 may be configured to resolve a plurality of complaints including a pilot complaint, a customer complaint, an electric aircraft staff complaint, and the like thereof. The flight management control 148 may include a flight manager that may be an automated operator configured to automatically audit and/or resolve the plurality of complaints. In a non-limiting embodiment, a human operator may be the flight manager and resolve/audit the plurality of complaints by logging into the user device 148 and manually resolving/auditing the plurality of complaints.

With continued reference to FIG. 1, an embodiment of the flight management control 148 may include distinct flight management controls based on the user logging into the flight management control 148. For instance, the flight management control 148 may provide different levels of access and information depending on the user that may be logging into the flight management control 148. For instance, a flight manager who may have a higher authority in the management and operation of a fleet of aircraft may have access and power to more information, schedules, simulations, issues, and the like, whereas a user who may include a passenger or owner of an electric may have access and power to a limited amount of information and actions. In a non-limiting embodiment, a flight manager may use the flight management control 148 to schedule and/or conduct various commercial applications regarding an electric aircraft. In a non-limiting embodiment, a passenger of an electric aircraft may use a fleet management control 148 and log into the flight management control as a passenger and may only have the authority to view logistical data of within the aircraft performance model output 136 such as pilot information and flight plan schedules. In a non-limiting embodiment, an owner of an electric aircraft may have access to more information including, but not limited to, historical record of maintenance schedules, maintenances performed on the owner's electric aircraft, a consumer tool that the owner of the electric may use to conduct commercial applications, and the like thereof.

Figure 2:
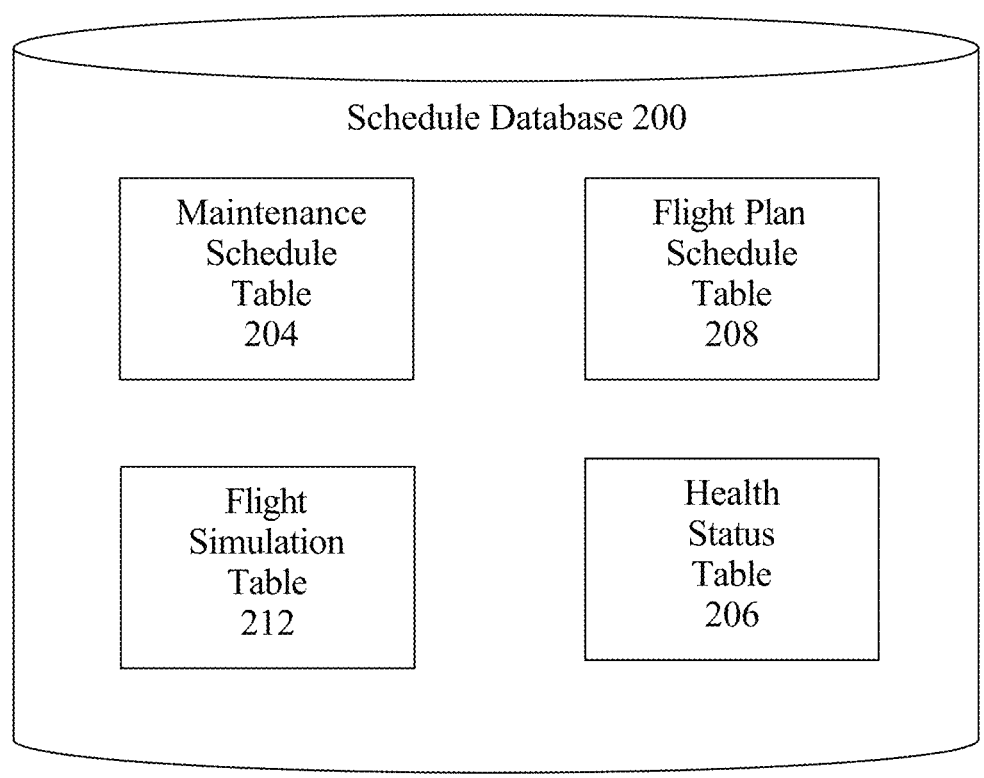
FIG. 2 is a block diagram of an exemplary embodiment of a schedule database.

Now referring to FIG. 2, a block diagram of an exemplary embodiment of a schedule database 200 is illustrated. The flight controller 120 is further configured to generate the aircraft performance model output 136 as a function of at least a schedule database 200. A plurality of aircraft performance model outputs 136 may be stored and/or retrieved in schedule database 200. The plurality of measured aircraft operation datum, which may be used for generating a training data, may also be stored and/or retrieved from schedule database 200. Flight controller 120 may receive, store, and/or retrieve the training data, the plurality of aircraft performance model outputs 136, and the like, from schedule database 200. Flight controller 120 may store and/or retrieve machine-learning models, classifiers, among other determinations, I/O data, heuristics, algorithms, and the like, from schedule database 200. Schedule database 200 may be implemented, without limitation, as a relational database, a key-value retrieval database such as a NOSQL database, or any other format or structure for use as a database that a person skilled in the art would recognize as suitable upon review of the entirety of this disclosure. Schedule database 200 may alternatively or additionally be implemented using a distributed data storage protocol and/or data structure, such as a distributed hash table and the like. Schedule database 200 may include a plurality of data entries and/or records, as described above. Data entries in schedule database 200 may be flagged with or linked to one or more additional elements of information, which may be reflected in data entry cells and/or in linked tables such as tables related by one or more indices in a relational database. Persons skilled in the art, upon reviewing the entirety of this disclosure, will be aware of various ways in which data entries in a database may store, retrieve, organize, and/or reflect data and/or records as used herein, as well as categories and/or populations of data consistent with this disclosure.

With continued reference to FIG. 2, schedule database 200 may include, without limitation, maintenance schedule table 204, flight plan schedule table 208, flight simulation table 212, and/or health status table 206. Schedule database 200 may include a heuristic table. Determinations by a machine-learning process, machine-learning model, ranking function, and/or classifier, may also be stored and/or retrieved from the schedule database 200. As a non-limiting example, schedule database 200 may organize data according to one or more instruction tables. One or more schedule database 200 tables may be linked to one another by, for instance in a non-limiting example, common column values. For instance, a common column between two tables of schedule database 200 may include an identifier of a submission, such as a form entry, textual submission, accessory device tokens, local access addresses, metrics, and the like, for instance as defined herein; as a result, a search by a flight controller 120 may be able to retrieve all rows from any table pertaining to a given submission or set thereof. Other columns may include any other category usable for organization or subdivision of data, including types of data, names and/or identifiers of individuals submitting the data, times of submission, and the like; persons skilled in the art, upon reviewing the entirety of this disclosure, will be aware of various ways in which data from one or more tables may be linked and/or related to data in one or more other tables.

Continuing in reference to FIG. 2, in a non-limiting embodiment, one or more tables of schedule database 200 may include, as a non-limiting example, maintenance schedule table 204, which may include categorized identifying data, as described above, including a plurality of aircraft performance model outputs 136 including a plurality of previous maintenance schedules corresponding to an electric aircraft of a plurality of electric aircraft, potential maintenance schedules an electric aircraft may be assigned, and the like. Maintenance schedule table 204 may include payload data 112 categories including, but not limited to, tests, measurements, replacements, adjustments, repairs, specific aircraft replacement parts, identification numbers denoting individual maintenance that was performed, and the like, categories, and may include linked tables to mathematical expressions that may describe the result and process of each maintenance or maintenance schedule. One or more tables may include, without limitation, a heuristic table, which may organize rankings, scores, models, outcomes, functions, numerical values, scales, arrays, matrices, and the like, which represent determinations, probabilities, metrics, parameters, values, standards, indexes, and the like, include one or more inputs describing potential mathematical relationships, as described herein. In a non-limiting embodiment, the flight controller 120 may retrieve a maintenance schedule from the schedule database 200 which may be used as an input for the generation of the aircraft performance model output 136 and configured to be viewed and/or modified by a user via a user device 148. For example, a user may use a user device that includes a flight management control 148 which may include a program in which a user can interact with to view a log of maintenance, maintenance schedules, and the like thereof. The user may further interact with the flight management control to schedule, modify, and/or cancel any future maintenance that may be performed on an electric aircraft.

Continuing in reference to FIG. 2, in a non-limiting embodiment, one or more tables of schedule database 200 may include, as a non-limiting example, a flight plan schedule table 208, which may include categorized identifying data, as described above, including a plurality of aircraft performance model outputs 136 including a plurality of flight plans including distinct individual flight plans representing a plurality of alternative flight plans for distinct and separate electric aircraft, and the like. Flight plan table may include flight plan categories according to aircraft destination, type of aircraft, weight of cargo of the aircraft, and the like, categories, and may include linked tables to mathematical expressions that describe the impact of each alternative flight plan. In a non-limiting embodiment, the flight controller 120 may retrieve a flight plan from the schedule database 200 to be confirmed or modified by an ATC. In a non-limiting embodiment, the pilot and/or flight controller 120 may retrieve an alternative flight plan which may represent a new flight plan or new flight plan schedule to be confirmed by the ATC authority. In a non-limiting embodiment, the flight controller 120 may send and receive constant transmissions of radio frequency signals with the central authority to receive a verification of a flight plan without a direct communication between one or more human operators.

With continued reference to FIG. 2, a new flight plan or new flight plan schedule may be generated as a function of a machine-learning model using a training set that may include a plurality of flight plans and flight plan data from the schedule database 200 and the aircraft component state data 108 from the plurality of measured aircraft operation datum. In a non-limiting embodiment, the flight controller 120 may retrieve one or more flight plan schedule from the schedule database 200 which may be used as an input for the generation of the aircraft performance model output 136 and configured to be viewed and/or modified by a user via a user device 148. For example, a user may use a user device that includes a flight management control 148 which may include a program in which a user can interact with to view a plurality of flight plan schedules, and the like thereof. The user may further interact with the flight management control to schedule, modify, and/or cancel any future flights for an electric aircraft.

Continuing in reference to FIG. 2, in a non-limiting embodiment, one or more tables of schedule database 200 may include, as a non-limiting example, a flight simulation table 212, which may include categorized identifying data, as described above, including a plurality of aircraft performance model outputs 136 including a plurality of flight simulations. Flight simulation table may include three dimensional modeling of a flight, a two dimensional modeling of a flight, and the like, and may include linked tables to mathematical expressions that describe the impact of each flight simulation. Flight simulation table may include simulation of flight mimicking a plurality of incidences that may occur during a flight. Incidences may include an electric aircraft malfunction, a pilot or passenger complaint, an issue corresponding to a delivery, shipment, or cargo of an electric aircraft, and the like thereof. In a non-limiting embodiment, the flight controller 120 may retrieve one or more flight simulations from the schedule database 200 which may be used as an input for the generation of the aircraft performance model output 136 and configured to be viewed and/or modified by a user via a user device 148. For example, a user may use a user device that includes a flight management control 148 which may include a program in which a user can interact with to view a plurality flight simulations, and the like thereof. The user may further interact with the flight management control to view the flight simulations, assess and/or analyze a flight as a function of a flight simulation, and the like thereof. For example, if an incident has occurred during a flight, a user may receive and view a flight simulation replicating the flight and incident to better understand the incident that occurred and resolve any issue or complaint from a pilot and/or passenger.

Further referring to FIG. 2, schedule database 200 may include, without limitation, a heuristic table. Determinations by a machine-learning process, machine-learning model, ranking function, and/or classifier, may also be stored and/or retrieved from the schedule database 200. As a non-limiting example, schedule database 200 may organize data according to one or more instruction tables. One or more schedule database 200 tables may be linked to one another by, for instance in a non-limiting example, common column values. For instance, a common column between two tables of schedule database 200 may include an identifier of a submission, such as a form entry, textual submission, accessory device tokens, local access addresses, metrics, and the like, for instance as defined herein; as a result, a search by the flight controller 120 may be able to retrieve all rows from any table pertaining to a given submission or set thereof. Other columns may include any other category usable for organization or subdivision of data, including types of data, names and/or identifiers of individuals submitting the data, times of submission, and the like; persons skilled in the art, upon reviewing the entirety of this disclosure, will be aware of various ways in which data from one or more tables may be linked and/or related to data in one or more other tables. In a non-limiting embodiment, flight plans may be generated manually by a pilot in any moment and the flight plans may be stored in the database 200 or transmitted from a separate entity such as a remote device.

Figure 3:
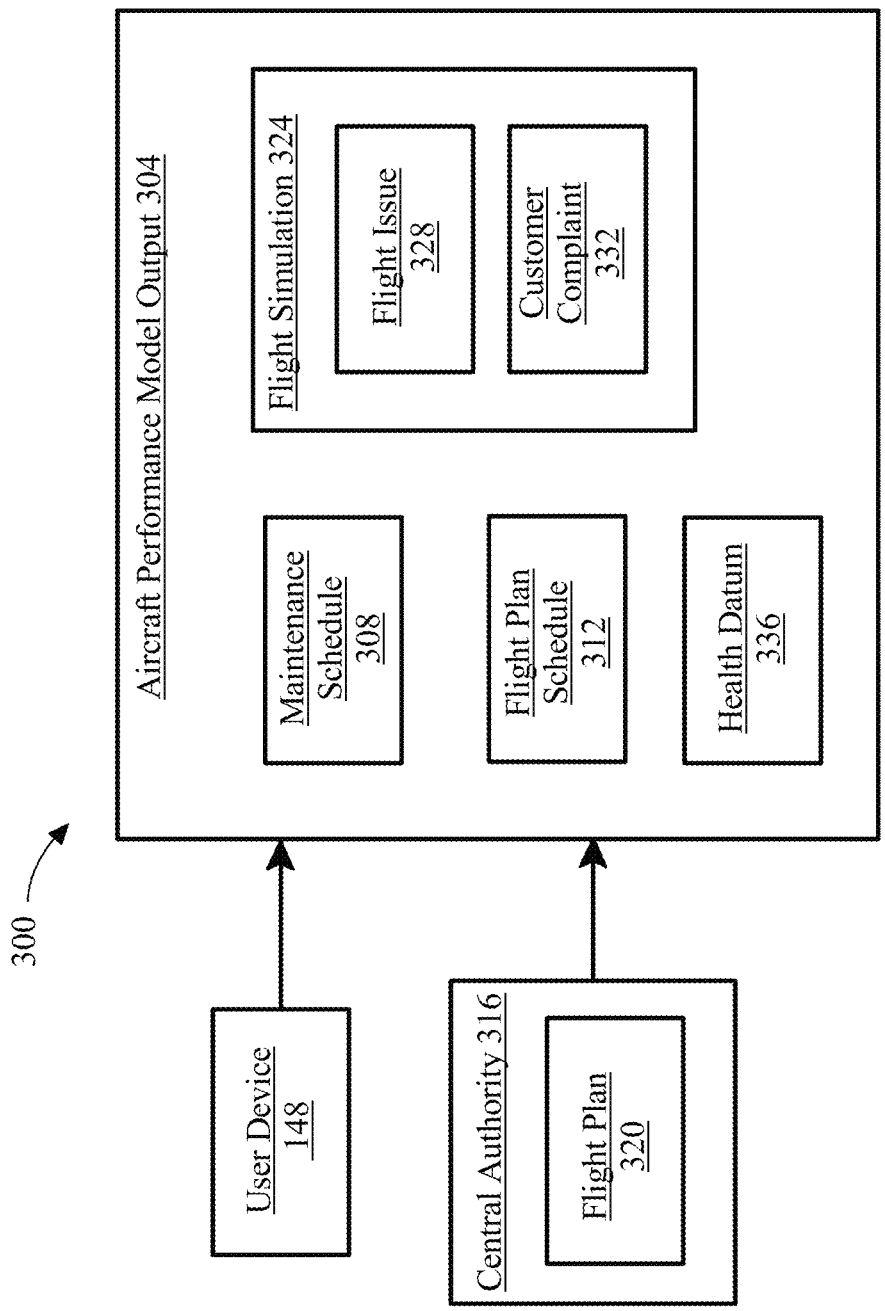
FIG. 3 is a block diagram of an exemplary embodiment of an aircraft performance model output.

Referring now to FIG. 3, a block diagram of an exemplary embodiment of an aircraft performance model output 300 is illustrated. The aircraft performance model output 304 includes a maintenance schedule 308. The maintenance schedule may include any maintenance schedule described herein. The maintenance schedule 308 may include a repair schedule. In a non-limiting embodiment, the aircraft performance model output 304 may include a plurality of records of a plurality of maintenance schedules for a plurality of electric aircraft of a fleet of electric aircraft. In a non-limiting embodiment, the maintenance schedule 308 may be affected by, in part, a user device 148, flight controller 120, and the like thereof. In a non-limiting embodiment, the maintenance schedule including a repair schedule may be generated as a function of a lowered health status of an electric component of an electric aircraft from at least the aircraft health datum.

Still referring to FIG. 3, the aircraft performance model output 304 may include a flight plan schedule 312. The flight plan schedule may be determined by a central authority via a digital communication including, but not limited to, the transmission of a plurality of signals and/or radio frequency signals. A "central authority," for the purposes of this disclosure, refer to an authorizing entity such as an air traffic control (ATC) operator. The central authority may determine a flight plan 320 that an electric aircraft may schedule. In a non-limiting embodiment, the flight plan schedule 312 may be the flight plan 320 that is selected by the central authority 316. In a non-limiting embodiment, the flight plan schedule 312 may include a plurality of flight plan schedules that a flight manager may select one as the designated flight plan schedule for an electric aircraft. A flight manager may communicate with the central authority 316 via a network as a function of the flight controller 120 or the aircraft performance model output 304. In a non-limiting embodiment, a flight manager may communicate directly with the central authority via digital communication. A "digital communication," for the purposes of this disclosure, refer to a mode of transfer and reception of data over a communication channel via digital signals. Digital signals may include, but not limited to, audio signals, electrical signals, video signals, radar signals, radio signals, sonar signals, transmission signals, and the like thereof. In a non-limiting embodiment, the flight controller may include a physical may include a plurality of physical controller area network buses communicatively connected to the aircraft and the sensor 104. A "physical controller area network bus," as used in this disclosure, is vehicle bus unit including a central processing unit (CPU), a CAN controller, and a transceiver designed to allow devices to communicate with each other's applications without the need of a host computer which is located physically at the aircraft. Physical controller area network (CAN) bus unit may include physical circuit elements that may use, for instance and without limitation, twisted pair, digital circuit elements/FGPA, microcontroller, or the like to perform, without limitation, processing and/or signal transmission processes and/or tasks. For instance and without limitation, CAN bus unit may be consistent with disclosure of CAN bus unit in U.S. patent application Ser. No. 17/218, 342 and titled "METHOD AND SYSTEM FOR VIRTUALIZING A PLURALITY OF CONTROLLER AREA NETWORK BUS UNITS COMMUNICATIVELY CONNECTED TO AN AIRCRAFT," which is incorporated herein by reference in its entirety. In a non-limiting embodiment, the flight controller 120 may receive the plurality of measured data from the sensor 104 by a physical CAN bus unit and/or transmit a proposed flight plan to a second physical CAN bus unit of a flight management module 132 which may be configured to send and receive a plurality of signals from an air traffic control operator 152. In a non-limiting embodiment, the sensor 104 may include a physical CAN bus unit to detect the plurality of measured data in tandem with a plurality of individual sensors from a sensor suite. Physical CAN bus unit may include multiplex electrical wiring for transmission of multiplexed signaling. Physical CAN bus unit 104 may include message-based protocol(s), wherein the invoking program sends a message to a process and relies on that process and its supporting infrastructure to then select and run appropriate programing.

With continued reference to FIG. 3, aircraft performance model output 304 may include a health datum 336. A "health datum," for the purpose of this disclosure, is a plurality of elements of data representing past, current, and/or predictive health statuses of a plurality of flight components of an electric aircraft. health datum 336 may include a projection or prediction of the health statuses of flight components after a scheduled or projected flight. Health datum 336 may include a history and/or record of health statuses of the plurality of flight components.

With continued reference to FIG. 3, aircraft performance model output 304 includes a flight simulation 324. A "flight simulation," for the purposes of this disclosure, refer to an artificially created model of a flight of an electric aircraft. In a non-limiting embodiment, a flight simulation may include graphical lines and images representing the electric aircraft and the path and distance an electric aircraft has traversed or is projected to traverse. In a non-limiting embodiment, the flight simulation may include a three-dimensional (3D) and a two-dimensional (2D) graphical representation of the flight of an electric aircraft. For example, the flight simulation 324 may include a plurality of flight simulations that correspond to a flight plan schedule 312 of a plurality of flight plan schedules determined by the central authority 316. Flight simulation 324 may include a flight issue 328. A "flight issue," for the purposes of this disclosure, refer to a moment that represents an incident or occurrence of an issue in the flight of an aircraft. Flight issue 328 may include an aircraft failure, at least a degradation of an aircraft component, and an avionics glitch and the like thereof. Flight issue may include any issue as described in the entirety of this disclosure. In a non-limiting embodiment, the flight simulation 324 may generate a visual model that may include any shape, color, size, and the like thereof, denoting when and where the flight issue may have occurred in the duration of a flight as a function of the flight simulation 324. In a non-limiting embodiment, the flight simulation 324 may be configured to generate a simulation of the parties involved that may have caused the flight issue that may include a simulation of passengers arguing with each other, a passenger arguing with a pilot, and the like thereof. In a non-limiting embodiment, flight simulation 324 may replicate and/or replay the flight of an electric aircraft in a graphical form. The replay of the flight may be generated as a function of the flight plan 320 authorized by the central authority 316.

With continued reference to FIG. 3, flight simulation 324 may include a flight issue 328. Flight issue may include any issue described in the entirety of this disclosure. In a non-limiting embodiment, a sensor 104 may detect a malfunction or abnormality of an aircraft component at any time during the lift-off, flight, and landing of an electric aircraft, pinpoint the time and location of the occurrence of the malfunction or abnormality, and transmit it to the flight simulation 324 in which the flight controller 120 may generate a flight simulation configured to simulate the moment of the malfunction or abnormality. In a non-limiting embodiment, aircraft performance model output 304 may retrieve a flight simulation that closely resembles the detected flight issue 328 from a flight simulation table from the schedule database. The simulation of the flight issue 328 moment may be used by a flight manager to resolve, analyze, view, and the like thereof, the flight issue 328. Flight simulation 324 may include a symbol indicating a flight plan 320 of the electric aircraft as a form of a flight plan schedule 312. The symbol may include any shape, color, size, indicator, and the like thereof. Flight simulation 324 may include a warning sign indicating an issue concerning the flight plan. The warning sign may include any indicator that is configured to capture the attention of any user. A warning sign may be communicatively connected to a designed siren or sound configured to capture the attention of a user.

With continued reference to FIG. 3, flight simulation 324 may include a customer complaint 332. A "customer complaint," for the purposes of this disclosure, refer to an issue related to an unfavorable experience by a customer. In a non-limiting embodiment, a customer complaint 332 may be a flight issue 328 which may further be replicated or simulated as a function of the flight simulation 324. Complaints may include an aircraft personnel complaint which may include issues and/or complaints from the personnel of the aircraft such as the pilot, flight attendants, engineers, and the like. A person of ordinary skill in the art, after viewing the entirety of this application, would appreciate the different types of flight issues and complaints that may affect the quality of a flight.

Figure 4:
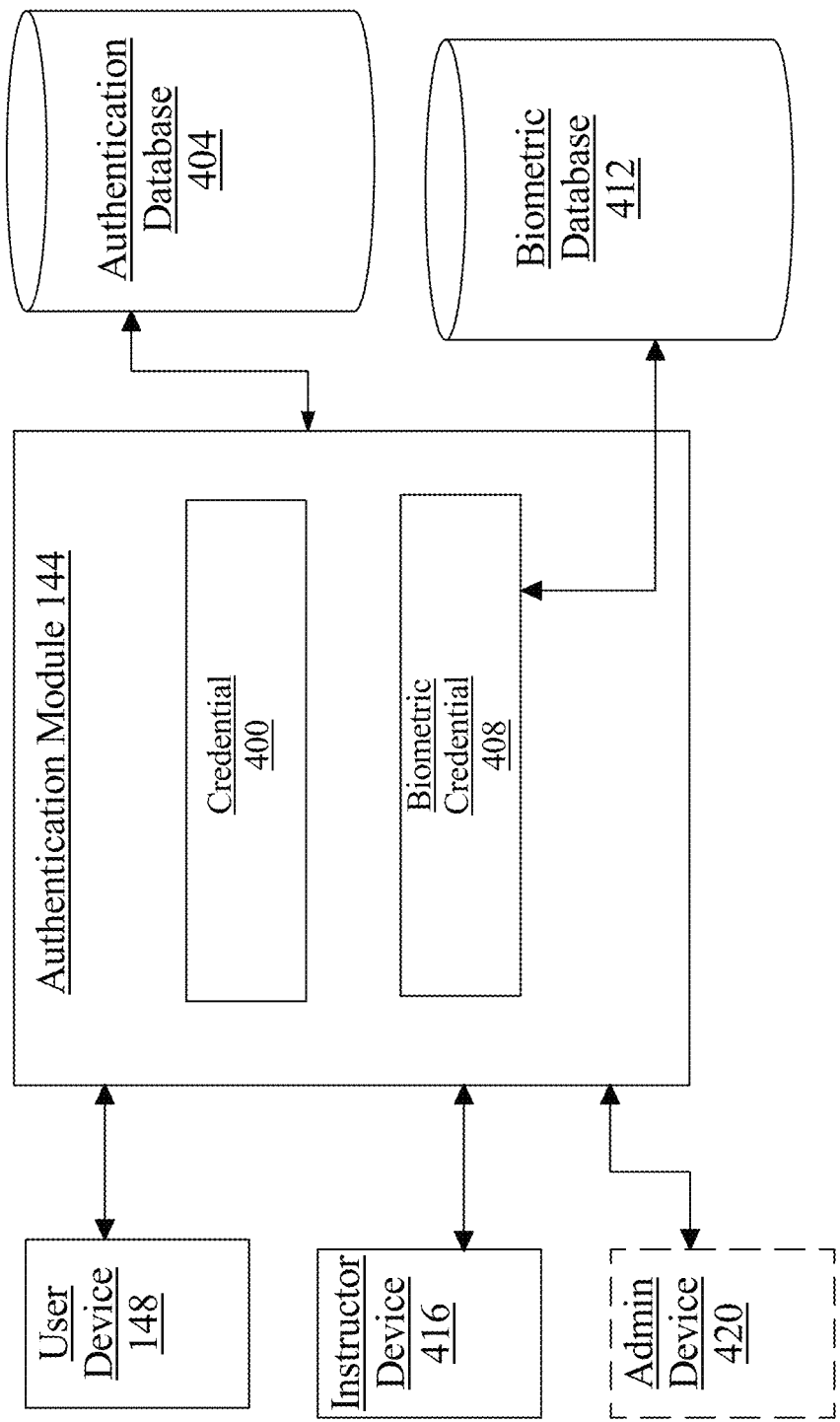
FIG. 4 is a block diagram illustrating an embodiment of an authentication module.

Referring now to FIG. 4, an embodiment of authentication module 144, as pictured in FIG. 1, is illustrated in detail. Authentication module 144 may include any suitable hardware and/or software module. Authentication module 144 and/or flight controller 420 can be configured to authenticate user device 148. Authenticating, for example and without limitation, can include determining a user's ability/authorization to access information included in each module and/or engine of the plurality of modules and/or engines operating on flight controller 420. As a further example and without limitation, authentication may include determining an instructor's authorization/ability of access to the information included in each module and/or engine of the plurality of modules and/or engines operating on flight controller 420. As a further non-limiting example, authentication may include determining an administrator's authorization/ability to access the information included in each module and/or engine of the plurality of modules and/or engines operating on flight controller 420. Authentication may enable access to an individual module and/or engine, a combination of modules and/or engines, and/or all the modules and/or engines operating on flight controller 420. Authenticating user device 148 is configured to receive credential 400 from user device 148. Credential 400 may include any credential as described above in further detail in reference to FIG. 1. For example and without limitation, credential 400 may include a username and password unique to the user and/or user device 148. As a further example and without limitation, credential 400 may include a PKI certificate unique to the user and/or user device 148. As a further embodiment, credential 400 may be received from instructor device 416 and/or admin device 420, such that credential 400 would authenticate each instructor device 416 and admin device 420, respectively.

Continuing to refer to FIG. 4, authentication module 144 and/or flight controller 420 may be further designed and configured to compare credential 400 from user device 148 to an authorized credential stored in authentication database 404. For example, authentication module 144 and/or flight controller 420 may be configured to compare credential 400 from user device 148 to a stored authorized credential to determine if credential 400 matches the stored authorized credential. As a further embodiment, authentication module 144 and/or computing device may compare credential 400 from an instructor device 416 to an authorized credential stored in authentication database 404. Instructor device 416 may include any additional computing device as described above, wherein the additional computing device is utilized by and/or associated with a certified flight instructor. As a further embodiment, authentication module 144 and/or flight controller 120 may be configured to receive a credential from admin device 420. Admin device 420 may include any additional computing device as described above in further detail, wherein the additional computing device is utilized by/associated with an employee of an administrative body, such as an employee of the federal aviation administration. For example, authentication module 144 and/or computing device may be configured to compare credential 400 from instructor device 416 to a stored authorized credential to determine if credential 400 matches the stored authorized credential. As a further non-limiting example, authentication module 144 and/or computing device may match credential 400 from admin device 420 to an authorized credential stored in authentication database 404. For example, authentication module 144 and/or computing device may be configured to compare credential 400 from admin device 420 to a stored authorized credential to determine if credential 400 matches the stored authorized credential. In embodiments, comparing credential 400 to an authorized credential stored in authentication database 404 can include identifying an authorized credential stored in authentication database 404 by matching credential 400 to at least one authorized credential stored in authentication database 404. Authentication module 144 and/or computing device may include or communicate with authentication database 404. Authentication database 404 may be implemented as any database and/or datastore suitable for use as authentication database 404 as described in the entirety of this disclosure. An exemplary embodiment of authentication database 404 is included below in reference to FIG. 3. The "authorized credential" as described in the entirety of this disclosure, is the unique identifier that will successfully authorize each user and/or user device 148 if received. For example and without limitation, the authorized credential is the correct alphanumeric spelling, letter case, and special characters of the username and password for user device 148. Persons skilled in the art, upon reviewing the entirety of this disclosure, will be aware of various examples of authorized credentials that may be stored in the authentication database consistently with this disclosure.

Still referring to FIG. 4, authentication module 144 and/or flight controller 420 is further designed and configured to bypass authentication for user device 148 based on the identification of the authorized credential stored within authentication database 404. Bypassing authentication may include permitting access to user device 148 to access the information included in each module and/or engine of the plurality of modules and/or engines operating on flight controller 420. Bypassing authentication may enable access to an individual module and/or engine, a combination of modules and/or engines, and/or all the modules and/or engines operating on flight controller 420, as described in further detail in the entirety of this disclosure. As a further example and without limitation, bypassing authentication may include bypassing authentication for instructor device 416 based on the comparison of the authorized credential stored in authentication database 404. As a further non-limiting example, bypassing authentication may include bypassing authentication for admin device 420 based on the comparison of the authorized credential stored in authentication database 112.

With continued reference to FIG. 4, authentication module 144 and/or flight controller 420 may be further configured to biometrically authenticate user device 148. Biometric authentication, for example and without limitation, determines a user's ability to access the information included in each module and/or engine of the plurality of modules and/or engines operating on flight controller 420 as a function of a biometric credential 408. Biometric authentication, in the embodiment, includes receiving biometric credential 408 from user device 148, comparing and/or matching biometric credential 408 from user device 148 to an authorized biometric credential stored in a biometric database 412, and bypassing authentication for user device 148 based on the comparison of the authorized biometric credential stored within biometric database 412. Biometric authentication employing authentication module 144 may also include biometrically authenticating instructor device 416 and/or admin device 420. Authentication module 144 and/or flight controller 420 may include or communicate with biometric database 412. Biometric database 412 may be implemented as any database and/or datastore suitable for use as a biometric database entirely with this disclosure. An exemplary embodiment of biometric database 412 is provided below in reference to FIG. 4. The "biometric credential" as used in this disclosure, is any body measurement and/or calculation utilized for identification purposes, such as a physiological characteristic and/or behavioral characteristic. For example and without limitation, biometric credential 408 may include fingerprints, palm veins, face recognition, DNA, palm print, hand geometry, iris recognition, retina, odor/scent, typing rhythm, gait, voice, and the like. The "authorized biometric credential" as described in the entirety of this disclosure, is unique biometric identifier that will successfully authorize each user and/or user device 148, such that the authorized biometric credential is the correct biometric credential which will enable the user and/or user device 148 access to the plurality of modules and/or engines operating on flight controller 120. Persons skilled in the art, upon reviewing the entirety of this disclosure, will be aware of various examples of biometric credentials and authorized biometric credentials that may be utilized by authentication module 144 consistently with this disclosure.

Figure 5:
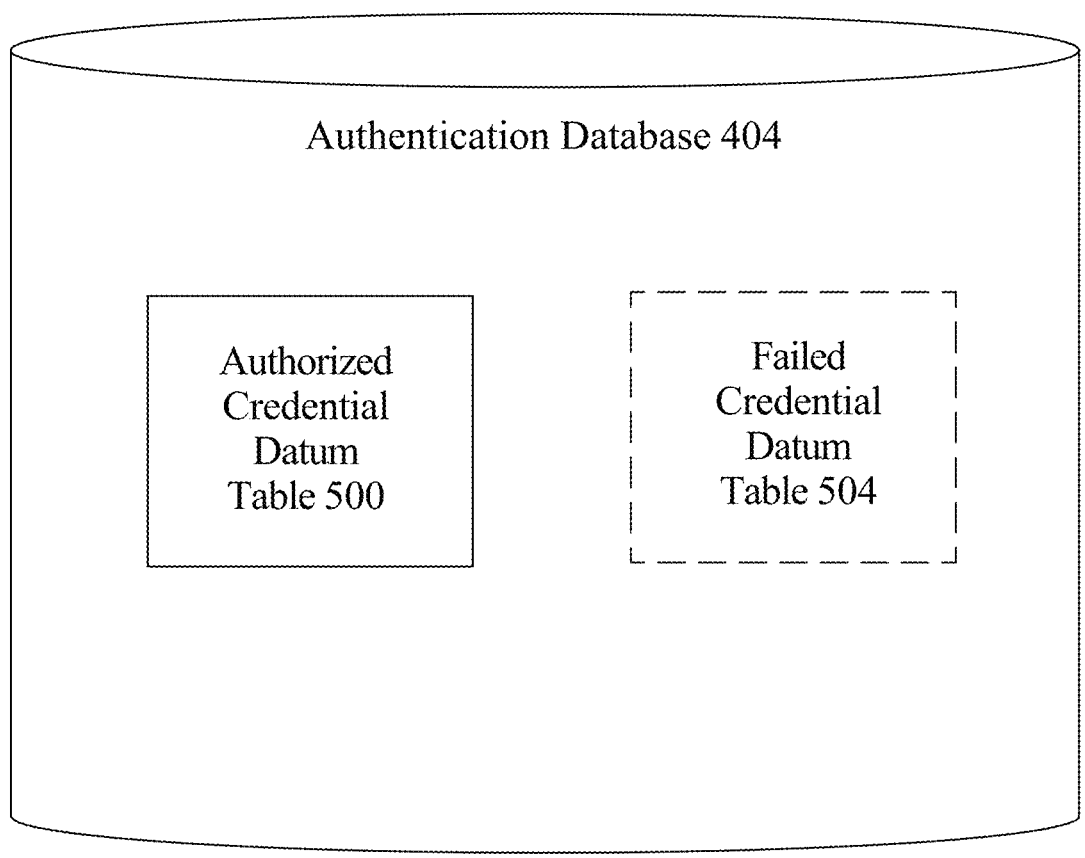
FIG. 5 is a block diagram illustrating an embodiment of an authentication database.

Referring now to FIG. 5, an embodiment of authentication database 404 is illustrated. Authentication database 404 may include any data structure for ordered storage and retrieval of data, which may be implemented as a hardware or software module. Authentication database 404 may be implemented, without limitation, as a relational database, a key-value retrieval datastore such as a NOSQL database, or any other format or structure for use as a datastore that a person skilled in the art would recognize as suitable upon review of the entirety of this disclosure. Authorization database 404 may include a plurality of data entries and/or records corresponding to credentials as described above. Data entries and/or records may describe, without limitation, data concerning authorized credential datum and failed credential datum.

With continued reference to FIG. 5, one or more database tables in authentication database 404 may include as a non-limiting example an authorized credential datum table 500. Authorized credential datum table 500 may be a table storing authorized credentials, wherein the authorized credentials may be for user device 148, instructor device 416 and/or admin device 420, as described in further detail in the entirety of this disclosure. For instance, and without limitation, authentication database 404 may include an authorized credential datum table 500 listing unique identifiers stored for user device 148, wherein the authorized credential is compared/matched to a credential 200 received from user device 148.

Still referring to FIG. 5, one or more database tables in authentication database 404 may include, as a non-limiting example, failed credential datum table 504. A "failed credential," as described in the entirety of this disclosure, is a credential received from a device that did not match an authorized credential stored within authorized credential datum table 500 of authentication database 404. Such credentials can be received from user device 148, instructor device 416 and/or admin device 420. Failed credential datum table 504 may be a table storing and/or matching failed credentials. For instance and without limitation, authentication database 404 may include failed credential datum table 504 listing incorrect unique identifiers received by a device in authentication module 144, wherein authentication of the device did not result. Tables presented above are presented for exemplary purposes only; persons skilled in the art will be aware of various ways in which data may be organized in authentication database 404 consistently with this disclosure.

Figure 6:
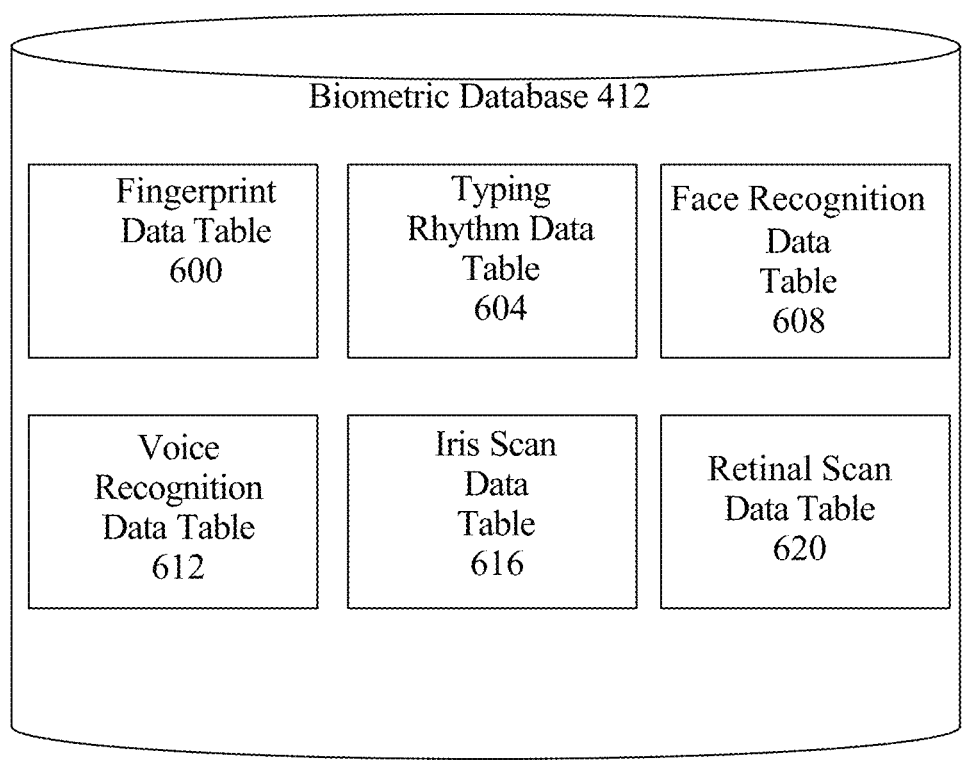
FIG. 6 is a block diagram illustrating an embodiment of a biometric database.

Referring now to FIG. 6, an embodiment of biometric database 412 is illustrated. Biometric database 412 may include any data structure for ordered storage and retrieval of data, which may be implemented as a hardware or software module. Biometric database 412 may be implemented, without limitation, as a relational database, a key-value retrieval datastore such as a NOSQL database, or any other format or structure for use as a datastore that a person skilled in the art would recognize as suitable upon review of the entirety of this disclosure. Biometric database 412 may include a plurality of data entries and/or records corresponding to elements of biometric datum as described above. Data entries and/or records may describe, without limitation, data concerning particular physiological characteristics and/or behavioral characteristics that have been collected. Data entries in a biometric database 412 may be flagged with or linked to one or more additional elements of information, which may be reflected in data entry cells and/or in linked tables such as tables related by one or more indices in a relational database; one or more additional elements of information may include data associating a biometric with one or more cohorts, including demographic groupings such as ethnicity, sex, age, income, geographical region, or the like. Additional elements of information may include one or more categories of biometric datum as described above. Persons skilled in the art, upon reviewing the entirety of this disclosure, will be aware of various ways in which data entries in a biometric database 412 may reflect categories, cohorts, and/or populations of data consistently with this disclosure.

Still referring to FIG. 6, one or more database tables in biometric database 412 may include, as a non-limiting example, fingerprint data table 600. Fingerprint data table 600 may be a table correlating, relating, and/or matching biometric credentials received from a device, such as user device 148, instructor device 416 and admin device 420, as described above, to fingerprint data. For instance, and without limitation, biometric database 412 may include a fingerprint data table 600 listing samples acquired from a user having allowed system 100 to retrieve fingerprint data from user device 148 through a fingerprint scanner, including biometric scanners such as optical scanners or capacitive scanners, one or more rows recording such an entry may be inserted in fingerprint data table 600.

With continued reference to FIG. 6, biometric database 412 may include tables listing one or more samples according to a sample source. For instance, and without limitation, biometric database 412 may include typing rhythm database 604 listing samples acquired from a user by obtaining the user's keystroke dynamics when typing characters on a keyboard and/or keypad, such as the time to get to and depress a key, duration the key is held down, use of caps-lock, pace of typing characters, misspellings, or the like. As another non-limiting example, biometric database 412 may include face recognition data table 608, which may list samples acquired from a user associated with user device 148 that has allowed system 100 to obtain digital images or video frames of the user's facial demographics, such as relative position, size, and/or shape of the eyes, nose, cheekbones, jaw, and/or the like. As a further non-limiting example, biometric database 412 may include a voice recognition data table 612, which may list samples acquired from a user associated with user device 148 that has allowed system 100 to retrieve the user's unique voice patterns though a microphone located on user device 148, such as dictation variants, common phrases, volume level, dialect, pitch, format frequencies, and/or the like. As a further example, also non-limiting, biometric database 412 may include iris scan data table 616, which may list samples acquired from a user associated with user device 148 that has allowed system 100 to retrieve a user's iris scan from a camera located on user device 148, including without limitation images of the detailed structures of the iris which are visible externally. As another non-limiting example, biometric database 412 may include retinal scan data table 620, which may include samples acquired from a user associated with user device 148 that has allowed system 100 to extract a user's retinal scan; retinal scans may include an image of the complex and unique structure of an individual's capillaries in the retina. Tables presented above are presented for exemplary purposes only; persons skilled in the art will be aware of various ways in which data may be organized in biometric database 412 consistently with this disclosure.

Figure 7:
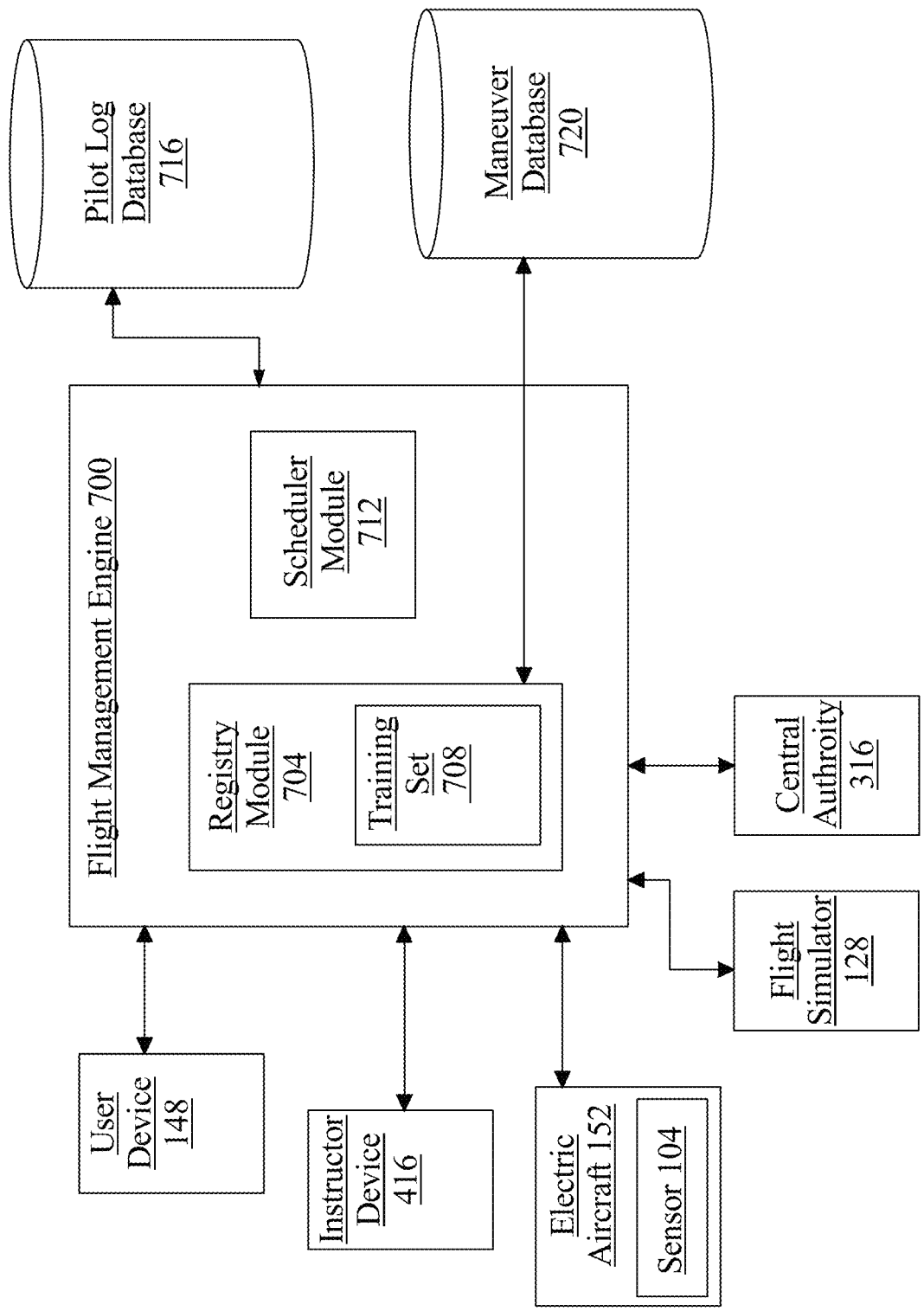
FIG. 7 is a block diagram illustrating an embodiment of a flight management engine.

Referring now to FIG. 7, an embodiment of flight management engine 700 is illustration. Flight management engine 700 may be included in a flight controller 120. Flight management engine 700 can be designed and configured to include registry module 704 and scheduler module 712 operating thereon. Registry module 704 and scheduler module 712 may include any suitable software and/or hardware as described in the entirety of this disclosure. In an embodiment, registry module 704 and/or flight controller 120 can be designed and configured to receive a plurality of maneuver data from instructor device 416 and record each maneuver data of the plurality of maneuver data in a pilot log database. Further, scheduler module 712 and/or flight controller 120 may be configured to generate available flight determinations as a function of an airport metrics datum received from an ATC central authority 316 and pilot restriction received from user device 148 and/or sensor 104. Flight management engine 700 may include any suitable software and/or hardware module as described in the entirety of this disclosure.

In an embodiment, flight management engine 700 can be configured to include registry module 704. Registry module 704 and scheduler module 712 may include any suitable software and/or hardware as described in the entirety of this disclosure. In an embodiment, registry module 704 and/or flight controller 120 can be designed and configured to receive a plurality of maneuver data from instructor device 416 and record each maneuver data of the plurality of maneuver data in a pilot log database. Registry module 704 and/or flight controller 120 may include any suitable hardware and/or software module as described in the entirety of this disclosure. Registry module 704 operating on flight management engine 700 and/or flight controller 120 may be configured to receive a plurality of maneuver data from instructor device 416. The "plurality of maneuver data" as described in the entirety of this disclosure is data describing completion by the pilot of procedures and concepts that control the electric aircraft. The electric aircraft, for example and without limitation, may include flight simulator 128 and/or electric aircraft 152. Flight simulator 128 may include any flight simulator as described in the entirety of this disclosure. Electric aircraft 152 may include any electric aircraft as described in the entirety of this disclosure. For example and without limitation, the plurality of maneuver data may include foundational flight maneuvers, such as straight-and-level turns, climbs and descents, and/or performance maneuvers, such that the application of flight control pressures, attitudes, airspeeds, and orientations are constantly changing throughout the maneuver. For example and without limitation, the plurality of maneuver data may include, ground reference maneuvers, such as turns around a point, s-turns, rectangular ground maneuvering course, eights along A road, eights around pylons, hover taxi, air taxi, surface taxi, and the like. As a further example and without limitation, the plurality of maneuver data may include takeoffs and landings, such as normal takeoff and climb, crosswind takeoff and climb, short field takeoff and climb, normal takeoff from a hover, vertical takeoff to a hover, short field approach and landing, soft field approach and landing, touch and go, power-off 180 approach and landing, normal approach to a hover, crosswind approach to the surface, and the like. The plurality of maneuver data may further include, for example and without limitation, airborne maneuvers, such as trimming the aircraft, slow flight, lazy eights, chandelle, straight and level flight, turns, steep turns, unusual attitudes, spatial disorientation demonstration, hovering, hovering turn, rapid deceleration, reconnaissance procedures, and the like. The plurality of maneuver data, as a further non-limiting example, may include emergency preparedness, such as steep spirals, emergency approach and landing, spins, ditching, autorotation, vortex ring state, retreating blade stall, ground resonance, dynamic rollover, low rotor RPM, systems malfunction, flight diversions, and the like. Further, the plurality of maneuver data may include, as a non-limiting example, instrument procedures, such as aircraft holding procedures, arcing approach, instrument landing system approach, instrument reference climbs and descents, basic attitude instrument flight, and the like. Persons skilled in the art, upon reviewing the entirety of this disclosure, will be aware of various procedures and concepts that may represent the plurality of maneuver data consistently with this disclosure.

Still referring to FIG. 7, registry module 704 operating on flight management engine 700 and/or flight controller 120 may be further configured to record each maneuver data of the plurality of maneuver data in a pilot log database 716. Flight management engine 700, registry module 704 and/or flight controller 120 may include or communicate with pilot log database 716. Pilot log database 716 may be implemented as any database and/or datastore suitable for use as pilot log database 716 as described in the entirety of this disclosure. Each maneuver data of the plurality of maneuver data may be recorded in any suitable data and/or data type. For instance, and without limitation, each maneuver data may include textual data, such as numerical, character, and/or string data. Textual data may include a standardized name and/or requirement for a procedure, technique, maneuver, or the like; requirements may include regulatory requirements to meet certification standards, which may include without limitation certification standards utilized by administrative bodies such as The Federal Aviation Administration (FAA). In general, there is no limitation on forms textual data or non-textual data the plurality of maneuver data may take; persons skilled in the art, upon reviewing the entirety of this disclosure, will be aware of various forms which may be suitable for use as the plurality of maneuver data consistently with this disclosure.

With continued reference to FIG. 7, registry module 704 operating on flight management engine 700 and/or flight controller 120 may be further configured to receive a plurality of tactile movement data from a sensor 704, wherein sensor 704 is disposed on electric aircraft 152, and generate a maneuver model output including each maneuver data of the plurality of maneuver data utilizing a selected training set 708. The "sensor" as described herein is a component capable of detecting the motion of the electric aircraft in multiple dimensions. For example and without limitation, sensor 704 may include a gyroscope, accelerometer, rate sensor, microwave systems, ultrasonic systems. Sensor 704 may be configured to be mechanically and/or electronically coupled to electric aircraft 152 internally and/or externally. Sensor may further include a sensor integrated into any instrumentation of electric aircraft 152, wherein sensor 704 would detect motion of the instrument in multiple dimensions. In a further embodiment, sensor 704 may be configured to be disposed on flight simulator 128. Flight management engine 700, registry module 704 and/or flight controller 120 may be configured to receive the plurality of tactile movement data from flight simulator 128. Persons skilled in the art, upon reviewing the entirety of this disclosure, will be aware of various sensors and motion detectors that may represent sensor 704 consistently with this disclosure.

Still referring to FIG. 7, flight controller 120, flight management engine 700, registry module 704, flight controller 120 and/or one or more modules operating thereon may be designed and/or configured to perform any method, method step, or sequence of method steps in any embodiment described in this disclosure, in any order and with any degree of repetition. For instance, flight controller 120, flight management engine 700 and/or registry module 704 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Flight controller 120, flight management engine 700 and/or registry module 704 may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

Continuing to refer to FIG. 7, flight controller 120, flight management engine 700 and/or registry module 704 may be designed and configured to receive training data. Training data, as used herein, is data containing correlations between two or more sub-sets of data that a machine-learning process may use to model relationships between two or more categories of data elements. For instance, and without limitation, training data may include a plurality of data entries, each entry representing a set of data elements that were recorded, received, and/or generated together; data elements may be correlated by shared existence in a given data entry, by proximity in a given data entry, or the like. Multiple data entries in training data may evince one or more trends in correlations between categories of data elements; for instance, and without limitation, a higher value of a first data element belonging to a first category of data element may tend to correlate to a higher value of a second data element belonging to a second category of data element, indicating a possible proportional or other mathematical relationship linking values belonging to the two categories. Multiple categories of data elements may be related in training data according to various correlations; correlations may indicate causative and/or predictive links between categories of data elements, which may be modeled as relationships such as mathematical relationships by machine-learning processes as described in further detail below. Training data may be formatted and/or organized by categories of data elements, for instance by associating data elements with one or more descriptors corresponding to categories of data elements. As a non-limiting example, training data may include data entered in standardized forms by persons or processes, such that entry of a given data element in a given field in a form may be mapped to one or more descriptors of categories. Elements in training data may be linked to descriptors of categories by tags, tokens, or other data elements; for instance, and without limitation, training data may be provided in fixed-length formats, formats linking positions of data to categories such as comma-separated value (CSV) formats and/or self-describing formats such as extensible markup language (XML), enabling processes or devices to detect categories of data.

Alternatively or additionally, and still referring to FIG. 7, training data may include one or more elements that are not categorized; that is, training data may not be formatted or contain descriptors for some elements of data. Machine-learning algorithms and/or other processes may sort training data according to one or more categorizations using, for instance, natural language processing algorithms, tokenization, detection of correlated values in raw data and the like; categories may be generated using correlation and/or other processing algorithms. As a non-limiting example, in a corpus of text, phrases making up a number "n" of compound words, such as nouns modified by other nouns, may be identified according to a statistically significant prevalence of n-grams containing such words in a particular order; such an n-gram may be categorized as an element of language such as a "word" to be tracked similarly to single words, generating a new category as a result of statistical analysis. Similarly, in a data entry including some textual data, a tactical movement and/or a flight procedure performed by the electric aircraft may be identified by reference to a list, dictionary, or other compendium of terms, permitting ad-hoc categorization by machine-learning algorithms, and/or automated association of data in the data entry with descriptors or into a given format. The ability to categorize data entries automatedly may enable the same training data to be made applicable for two or more distinct machine-learning algorithms as described in further detail below.

With continued reference to FIG. 7, registry module 704 operating on flight management engine 700 and/or flight controller 120 may be configured to select a training set 708 including a plurality of maneuver data and a correlated element of flight movement data, as described in further detail below in reference to FIG. 8. The "plurality of maneuver data" as described in the entirety of this disclosure is data describing completion by the pilot of procedures and concepts that control an electric aircraft. the plurality of maneuver data may include foundational flight maneuvers, such as straight-and-level turns, climbs and descents, and/or performance maneuvers, such that the application of flight control pressures, attitudes, airspeeds, and orientations are constantly changing throughout the maneuver. For example and without limitation, the plurality of maneuver data may include, ground reference maneuvers, such as turns around a point, s-turns, rectangular ground maneuvering course, eights along A road, eights around pylons, hover taxi, air taxi, surface taxi, and the like. As a further example and without limitation, the plurality of maneuver data may include takeoffs and landings, such as normal takeoff and climb, crosswind takeoff and climb, short field takeoff and climb, normal takeoff from a hover, vertical takeoff to a hover, short field approach and landing, soft field approach and landing, touch and go, power-off 180 approach and landing, normal approach to a hover, crosswind approach to the surface, and the like. The plurality of maneuver data may further include, for example and without limitation, airborne maneuvers, such as trimming the aircraft, slow flight, lazy eights, chandelle, straight and level flight, turns, steep turns, unusual attitudes, spatial disorientation demonstration, hovering, hovering turn, rapid deceleration, reconnaissance procedures, and the like. The plurality of maneuver data, as a further non-limiting example, may include emergency preparedness, such as steep spirals, emergency approach and landing, spins, ditching, autorotation, vortex ring state, retreating blade stall, ground resonance, dynamic rollover, low rotor RPM, systems malfunction, flight diversions, and the like. Further, the plurality of maneuver data may include, as a non-limiting example, instrument procedures, such as aircraft holding procedures, arcing approach, instrument landing system approach, instrument reference climbs and descents, basic attitude instrument flight, and the like. Persons skilled in the art, upon reviewing the entirety of this disclosure, will be aware of various procedures and concepts that may represent the plurality of maneuver data consistently with this disclosure. For example and without limitation, the plurality of maneuver data may include, ground reference maneuvers, takeoffs and landings, airborne maneuvers, emergency preparedness, instrument procedures, and the like, and/or any combination thereof, as described in further detail in the entirety of this disclosure. Persons skilled in the art, upon reviewing the entirety of this disclosure, will be aware of various procedures and concepts that may represent the plurality of maneuver data consistently with this disclosure.

Still referring to FIG. 7, the element of flight movement data may include any data indicative of a pilot's maneuver performed and/or attempted to perform; maneuvers may be evaluated with regard to one or more measures of flight control, one or more measures of navigational control, one or more measures of instrumentation, one or more measures of aircraft positioning, one or more measures of maneuver accuracy, and/or any other subdivision of an aircraft useful for training, descriptive, or analytic purposes. The element of flight movement data may include, without limitation, takeoff data, such as runway alignment, threshold of takeoff pitch attitude, wherein there is a proper range of angle formed between the airplane's longitudinal axis during takeoff, threshold of takeoff bank attitude, wherein there is a proper range of angle formed between the airplane's lateral axis, threshold of takeoff heading of the aircraft, wherein there is a proper range of direction the nose of electric aircraft 152 and/or flight simulator 128 is pointed in during takeoff, threshold of takeoff airspeed, wherein there is a proper range of airspeed required to perform a successful takeoff, threshold of rotor speed for vertical takeoff, wherein there is a proper range of speed of rotation of the rotors of electric aircraft 152 and/or flight simulator 128 during takeoff, and the like.

Still referring to FIG. 7, the element of flight movement data may include, without limitation, landing data, such as runway alignment, threshold angle of vertical descent, wherein there is a proper range of degree of the angle formed between the electric aircraft 152 and/or flight simulator 128 and the ground during vertical landing, threshold of angle of landing, wherein there is a proper range of the measurement of the angle formed between electric aircraft 152 and/or flight simulator 128 and the ground during fixed-wing landing, threshold of landing pitch attitude, wherein there is a proper range of angle formed between the airplane's longitudinal axis during landing, threshold of landing bank attitude, wherein there is a proper range of angle formed between the airplane's lateral axis during landing, threshold of heading of the aircraft during landing, wherein there is a proper range of directional movement of the nose of electric aircraft 152 and/or flight simulator 128 during landing, threshold of landing airspeed, wherein there is a proper range of airspeed required to perform a successful landing, threshold of vibrational frequency during landing, threshold of rotor speed for vertical landing, wherein there is a proper speed of rotation of the rotors of electric aircraft 152 and/or flight simulator 128 during landing, and the like.

Continuing to refer to FIG. 7, the element of flight movement data may further include, without limitation, turn data, such as threshold of bank angle for a shallow turn, wherein the bank angle of electric aircraft 152 and/or flight simulator 128 is less than 20 degrees, threshold of bank angle for a medium turn, wherein the bank angle of electric aircraft 152 is between 20 and 45 degrees, threshold of bank angle for steep turns, wherein the bank angle of electric aircraft 152 and/or flight simulator 128 is greater than 45 degrees, threshold of yaw in the direction of the turn, wherein there is a proper range of yaw for each turn of the plurality of turns of an aircraft, threshold of yaw in the direction opposite the turn, wherein there is a proper range of yaw for the opposite direction of each turn of the plurality of turns of the aircraft, threshold of airspeed during turn, wherein there is a range of allowable airspeed for turning, threshold of heading of the aircraft during turns, wherein there is a proper range of directional movement of the nose of electric aircraft 152 and/or flight simulator 128 during turning, and the like.

Still referring to FIG. 7, the element of flight movement data may further include, without limitation, instrumentation data, such as a threshold of vertical speed, wherein there is a proper range of speed to be maintained and/or reached during vertical flight, threshold of attitude, wherein there is a proper range of orientation of the aircraft relative to the earth to be reached and/or maintained during vertical and/or horizontal flight, threshold of altimeter, wherein there is a proper range of altitude electric aircraft 152 and/or flight simulator 128 must meet and/or maintain during vertical flight, horizontal flight, a turn, a stall, a descent, a roll, a loop, and the like, threshold of airspeed of horizontal flight, wherein there is a proper range of speed to be maintained and/or reached during horizontal flight, and the like.

With continued reference to FIG. 7, the element of flight movement data may include, without limitation, emergency protocol data, such as a threshold of time to recovery of a system malfunction and/or failure, such as power failure in a rotor, power failure in a propeller, damage to a wing, damage to the fuselage, dynamic rollover, damage to a rotor, malfunction with the collective, malfunction with the inceptor stick, and the like, threshold attitude during a malfunction, wherein there is a proper range of attitude to reach to recover from the malfunction and/or emergency scenario, such as a dynamic rollover, running takeoff, steep approach to a hover, shallow approach landing, and the like, threshold level of hover, wherein there is a proper range of hover to be maintained and/or reached to recover from an emergency scenario, such as vortex ring state, tailspin, and the like. Persons skilled in the art, upon reviewing the entirety of this disclosure, will be aware of various data indicative of a flight maneuver that may represent the element of flight movement data consistently with this disclosure.

Continuing to refer to FIG. 7, the element of flight movement data may be stored in any suitable data and/or data type. In an embodiment, the element of flight movement data may be stored in maneuver database 720. Flight management engine 700 and/or registry module 704 and/or flight controller 120 may include or communicate with maneuver database 720. Maneuver database 720 may be implemented as any database and/or datastore suitable for use as maneuver database 720 as described in the entirety of this disclosure. For instance, and without limitation, the element of flight movement data may include textual data, such as numerical, character, and/or string data. In general, there is no limitation on forms textual data or non-textual data the element of flight movement data may take; persons skilled in the art, upon reviewing the entirety of this disclosure, will be aware of various forms which may be suitable for use as at least an element of flight movement data consistently with this disclosure.

Still referring to FIG. 7, flight management engine 700 may be further configured to include scheduler module 712. Scheduler module 712 may include any suitable hardware and/or software module as described in the entirety of this disclosure. In an embodiment, scheduler module 712 and/or flight controller 120 may be configured to receive an airport metrics datum from an ATC central authority 316 wherein the central ATC central authority may include any central authority as described herein. The "airport metrics datum" as described herein, is a datum describing the availability of the airport, wherein the availability of the airport may include the availability of an aircraft divided by type of aircraft, time of availability, conditions at the airport, and the like. For example and without limitation, the airport metrics datum may include 2 Cessna 172 aircraft available from 12 pm to 4 pm. As a further example and without limitation, the airport metrics datum may include one Bell 206 JetRanger available from 9 am to 11 am. Further, in an embodiment, scheduler module 712 and/or flight controller 120 may include receiving at least a simulator metrics datum from a flight simulator 128. The "simulator metrics datum" is a datum describing the availability of flight simulator 128, wherein the availability may include the location, timing, and types of flights available. For example and without limitation, the simulator metrics datum may include one flight simulator available at the Burlington International Airport in a specific hangar from 1 pm to 6 pm utilizing a simulated Boeing 737 flight. Persons skilled in the art, upon reviewing the entirety of this disclosure, will be aware of various availability data which may be suitable for use as airport metrics datum and/or simulator metrics datum consistently with this disclosure.

With continued reference to FIG. 7, scheduler module 712 operating on flight management engine 700, and/or flight controller 120 may be further configured to receive a pilot restriction from user device 148. User device 148 may include any user device 148 as described in the entirety of this disclosure. The "pilot restriction" as described in the entirety of this disclosure is a datum detailing the most advanced flying capabilities of the user and/or user device 148, wherein the pilot restriction correlates to the pilot license, endorsement, and/or capabilities of the user and/or user device 148. For example and without limitation, the pilot restriction may include endorsement data individual to the pilot, such as student, solo, rotorcraft solo, light sport, private pilot, instrument, complex, multi-engine, high performance, tail wheel, sea plane, rotorcraft, powered lift, commercial, ATP, VTOL, eVTOL, and the like. As a further example and without limitation, the pilot restriction may include the need for an instructor to be present on each flight performed by the pilot. Further, the pilot restriction may include, as a non-limiting example, aircraft classifications, such as fixed wing, rotary wing, VTOL, and the like. Persons skilled in the art, upon reviewing the entirety of this disclosure, will be aware of various endorsements and/or capabilities restricting flight which may be suitable for use as the pilot restriction consistently with this disclosure.

Figure 8:
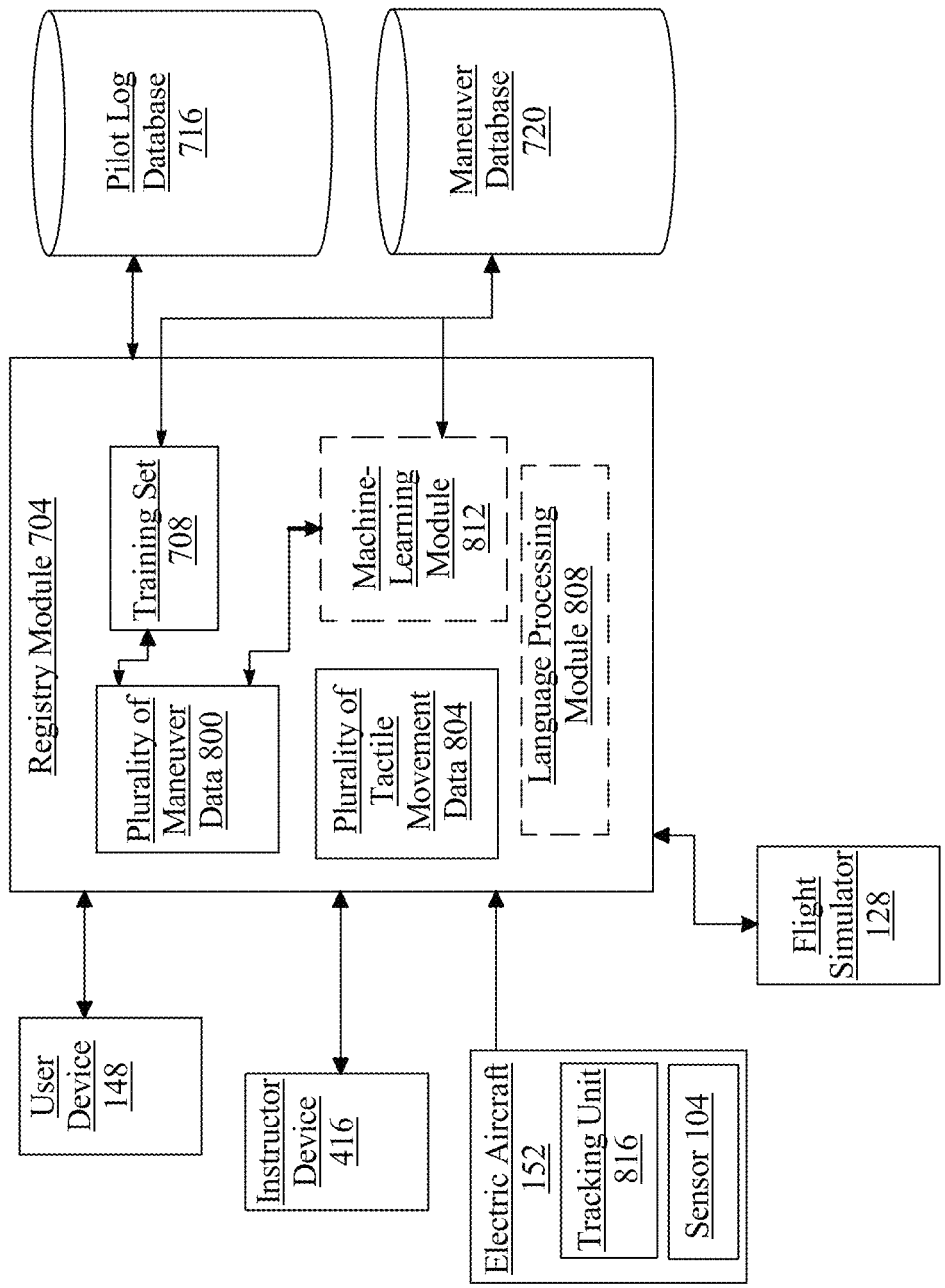
FIG. 8 is a block diagram illustrating an embodiment of a registry module.

Referring now to FIG. 8, an embodiment of registry module 704 operating on flight management engine 700, as described in 7, is illustrated in detail. In an embodiment, registry module 140 and/or flight controller 120 may be configured to receive a plurality of maneuver data 800 from instructor device 416 and record each maneuver data of the plurality of maneuver data 800 in pilot log database 716. Plurality of maneuver data 800 may include any maneuver data as described in the entirety of this disclosure. For example and without limitation, the plurality of maneuver data may include foundational flight maneuvers, such as straight-and-level turns, climbs and descents, and/or performance maneuvers, such that the application of flight control pressures, attitudes, airspeeds, and orientations are constantly changing throughout the maneuver. Registry module 140 and/or flight controller 120 may be further configured to receive a plurality of tactile movement data 804 from sensor 704 disposed on electric aircraft 152, as described in further detail above in reference to FIG. 7. Plurality of tactile movement data 804 may include any tactile movement data as described in the entirety of this disclosure. For example and without limitation, tactile movement data may include a measurement of the heading of electric aircraft 152 and/or flight simulator 128 during a flight, the pitch attitude of electric aircraft 152 and/or flight simulator 128 during a flight, the bank attitude of electric aircraft 152 and/or flight simulator 128 during a flight, the airspeed of electric aircraft 152 and/or flight simulator 128 during a flight, the speed of rotor rotation of electric aircraft 152 and/or flight simulator 128 during a flight, the positioning of electric aircraft 152 and/or flight simulator 128 during a flight, and the like.

With continued reference to FIG. 8, registry module 140 and/or flight controller 120 may be configured to select training set 708 as a function of the plurality of tactile movement data 804, wherein the training set includes plurality of maneuver data 800 correlated to an element of flight movement data, as described above in further detail in reference to FIG. 7. The element of flight movement data may include any element of flight movement data as described in the entirety of this disclosure. For example and without limitation, flight movement data may include any data indicative of a pilot's maneuver performed and/or attempted to perform, such as landing data, takeoff data, turn data, instrumentation data, emergency protocol data, stall data, and the like. Selection of training set 708 as a function of the plurality of tactile movement data 804 may be performed utilizing any means of selection as described in the entirety of this disclosure. For example and without limitation, selecting training set 708 includes correlating the tactile movement data 804 to an element of flight movement data, and selecting the training set 708 as a function of the correlation. In an embodiment, the correlation may be recorded when an element of flight movement data and tactile movement data 804 are simultaneously performed, such that the element of flight movement data and the tactile movement data 804 occur during the same moment of a flight utilizing electric aircraft 152 and/or simulation machine 128; tactile movement data 804 and/or the element of flight movement data may be received by flight controller 120 during a flight, utilizing electric aircraft 152 and/or simulation machine 128, and recorded in data entries, such that the data entries may be correlated and used in training data. For example and without limitation, tactile movement data 804 may include data detailing a turn involving a bank of 32 degrees and may be correlated to an element of flight movement data detailing steep turns, wherein steep turns require a bank angle or more than 30 degrees. As a further example and without limitation, tactile movement data 804 may include data describing a 30 second hover at 6500 feet and may be correlated to an element of flight movement data describing hovering flight, wherein hovering requires a maintained position and altitude for an extended duration of time. Persons skilled in the art, upon reviewing the entirety of this disclosure, will be aware of various means of selection which may be suitable for use with the selection of training set 708 consistently with this disclosure.

Still referring to FIG. 8, in each first data element of training set 708, at least a first maneuver data of the plurality of maneuver data 800 of the data element may be correlated with element of flight movement data of the data element. In an embodiment, an element of flight movement data may be correlated with each maneuver data of the plurality of maneuver data 800 where the element of flight movement data is located in the same data element and/or portion of data element as each maneuver data of the plurality of maneuver data 800; for example, and without limitation, an element of flight movement data may be correlated with each maneuver data of the plurality of maneuver data 800 where both element of flight maneuver data and each maneuver data of the plurality of maneuver data 800 are contained within the same first data element of the training set 708. As a further example, an element of flight movement data may be correlated with each maneuver data of the plurality of maneuver data 800 where both share a category label as described in further detail below, where each is within a certain distance of the other within an ordered collection of data in data element, or the like. Still further, an element of flight movement data may be correlated with each maneuver data of the plurality of maneuver data 800 where the element of flight movement data and each maneuver data of the plurality of maneuver data 800 share an origin, such as being data that was collected with regard to a single person or the like. In an embodiment, a first datum may be more closely correlated with a second datum in the same data element than with a third datum contained in the same data element; for instance, the first element and the second element may be closer to each other in an ordered set of data than either is to the third element, the first element and second element may be contained in the same subdivision and/or section of data while the third element is in a different subdivision and/or section of data, or the like. Persons skilled in the art, upon reviewing the entirety of this disclosure, will be aware of various forms and/or degrees of correlation between flight movement data and maneuver data that may exist in training set 708 and/or first data element consistently with this disclosure.

In an embodiment, and still referring to FIG. 8, registry module 140 operating on flight management engine 700 and/or flight controller 120 may be designed and configured to associate at least an element of flight movement data with at least a category from a list of significant categories of flight movement data. Significant categories of flight movement data may include labels and/or descriptors describing types of flight movement data that are identified as being of high relevance in identifying each maneuver data of the plurality of maneuver data 800. As a non-limiting example, one or more categories may identify significant categories of flight movement data based on degree of relevance to one or more impactful positions and/or within one or more aircraft types. For instance, and without limitation, a particular set of angle of bank, speed, and/or altitude information may be recognized in a given aircraft type as useful for identifying various types of turns within a relevant field. As a non-limiting example, and without limitation, flight movement data describing the movement of a left turn, such as an increase in the angle of aircraft bank to the left, an increase in the stall speed, and an increase in the angle of attack of the aircraft nose may be recognized as useful for identifying various turns such a shallow left turn, a medium left turn, steep left turn, and the like. As an additional example, the deployment of landing gear may be useful for identifying takeoff procedures and/or techniques and/or ground reference maneuvers, such as turns around a point, s-turns, the rectangular course, taxiing and the like. In a further non-limiting example, an attitude of zero degrees may be useful for identifying hovering, straight and level flight, the initiation of vertical landing, initiation of vertical takeoff, or the like. Persons skilled in the art, upon reviewing the entirety of this disclosure, will be aware of various additional categories of flight movement data that may be used consistently with this disclosure.

Still referring to FIG. 8, registry module 704 operating on flight management engine 700 and/or flight controller 120 may receive the list of significant categories according to any suitable process; for instance, and without limitation, registry module 704 may receive the list of significant categories from at least an expert. In an embodiment, registry module 704 and/or a user device connected to registry module 704 may provide a graphical user interface, which may include without limitation a form or other graphical element having data entry fields, wherein one or more experts, including without limitation aviation and/or pilot experts, may enter information describing one or more categories of flight movement that the experts consider to be significant or useful for detection of maneuvers. Fields in graphical user interface may provide options describing previously identified categories, which may include a comprehensive or near-comprehensive list of types of flight movement data detectable using known or recorded methods, for instance in "drop-down" lists, where experts may be able to select one or more entries to indicate their usefulness and/or significance in the opinion of the experts. Fields may include free-form entry fields such as text-entry fields where an expert may be able to type or otherwise enter text, enabling expert to propose or suggest categories not currently recorded. The graphical user interface or the like may include fields corresponding to each maneuver data of the plurality of maneuver data 800, where experts may enter data describing maneuver data 800 and/or categories of maneuver data 800 the experts consider related to entered categories of flight movement data; for instance, such fields may include drop-down lists or other pre-populated data entry fields listing currently recorded each maneuver data of the plurality of maneuver data 800, and which may be comprehensive, permitting each expert to select each maneuver data of the plurality of maneuver data 800 and/or a plurality of maneuver data 800 the expert believes to be predicted and/or associated with each category of flight movement data selected by the expert. Fields for entry of maneuver data and/or categories of plurality of maneuver data 800 may include free-form data entry fields such as text entry fields; as described above, experts may enter data not presented in pre-populated data fields in the free-form data entry fields. Alternatively or additionally, fields for entry of each maneuver data of the plurality of maneuver data 800 may enable an expert to select and/or enter information describing or linked to a category of maneuver data that the expert considers significant, where significance may indicate likely impact on completeness, accuracy, safety, timing, or the like as described in further detail below. The graphical user interface may provide an expert with a field in which to indicate a reference to a document describing significant categories of flight movement data, relationships of such categories to each maneuver data of the plurality of maneuver data 800, and/or significant categories of plurality of maneuver data 800. Any data described above may alternatively or additionally be received from experts similarly organized in paper form, which may be captured and entered into data in a similar way, or in a textual form such as a portable document file (PDF) with examiner entries, or the like.

Continuing to refer to FIG. 8, data information describing significant categories of flight movement data, relationships of such categories to each maneuver data of the plurality of maneuver data 800, and/or significant categories of the plurality of maneuver data 800 may alternatively or additionally be extracted from one or more documents using a language processing module 808. Language processing module 808 may include any hardware and/or software module. Language processing module 808 and/or flight controller 120 may be configured to extract, from the one or more documents, one or more words. One or more words may include, without limitation, strings of one or characters, including without limitation any sequence or sequences of letters, numbers, punctuation, diacritic marks, engineering symbols, geometric dimensioning and tolerancing (GD&T) symbols, chemical symbols and formulas, spaces, whitespace, and other symbols, including any symbols usable as textual data as described above. Textual data may be parsed into tokens, which may include a simple word (sequence of letters separated by whitespace) or more generally a sequence of characters as described previously. The term "token," as used herein, refers to any smaller, individual groupings of text from a larger source of text; tokens may be broken up by word, pair of words, sentence, or other delimitation. These tokens may in turn be parsed in various ways. Textual data may be parsed into words or sequences of words, which may be considered words as well. Textual data may be parsed into "n-grams", where all sequences of n consecutive characters are considered. Any or all possible sequences of tokens or words may be stored as "chains", for example for use as a Markov chain or Hidden Markov Model.

Still referring to FIG. 8, language processing module 808 and/or flight controller 120 may compare extracted words to categories of flight movement data recorded at registry module 704 and/or flight management engine 700, one or more maneuver data of the plurality of maneuver data 800 recorded at registry module 704 and/or flight management engine 700, and/or one or more categories of plurality of maneuver data 800 recorded at registry module 704 and/or flight management engine 700; such data for comparison may be entered on registry module 704 and/or flight management engine 700 as described above using expert data inputs or the like. In an embodiment, one or more categories may be enumerated, to find total count of mentions in such documents. Alternatively or additionally, language processing module 808 and/or flight controller 120 may operate to produce a language processing model. Language processing model may include a program automatically generated by registry module 704, flight management engine 700 and/or language processing module 808 to produce associations between one or more words extracted from at least a document and detect associations, including without limitation mathematical associations, between such words, and/or associations of extracted words with categories of flight movement data, relationships of such categories to each maneuver data of the plurality of maneuver data 800, and/or categories of plurality of maneuver data 800. Associations between language elements, where language elements include for purposes herein extracted words, categories of flight movement data, relationships of such categories to each maneuver data of the plurality of maneuver data 800, and/or categories of plurality of maneuver data 800 may include, without limitation, mathematical associations, including without limitation statistical correlations between any language element and any other language element and/or language elements. Statistical correlations and/or mathematical associations may include probabilistic formulas or relationships indicating, for instance, a likelihood that a given extracted word indicates a given category of flight movement data, a given relationship of such categories to plurality of maneuver data 800, and/or a given category of plurality of maneuver data 800. As a further example, statistical correlations and/or mathematical associations may include probabilistic formulas or relationships indicating a positive and/or negative association between at least an extracted word and/or a given category of flight movement data, a given relationship of such categories to plurality of maneuver data 800, and/or a given category of plurality of maneuver data 800; positive or negative indication may include an indication that a given document is or is not indicating a category of flight movement data, a given relationship of such categories to plurality of maneuver data 800, and/or a given category of plurality of maneuver data 800 is or is not significant. For instance, and without limitation, a negative indication may be determined from a phrase such as "angle of attach of the nose of the aircraft was not found to be an accurate predictor of turn type," whereas a positive indication may be determined from a phrase such as "angle of attack of the nose of the aircraft was found to be a positive indicator of a successful approach to fixed-wing landing," as an illustrative example; whether a phrase, sentence, word, or other textual element in a document or corpus of documents constitutes a positive or negative indicator may be determined, in an embodiment, by mathematical associations between detected words, comparisons to phrases and/or words indicating positive and/or negative indicators that are stored in memory at registry module 704, flight management engine 700, and/or the like.

Still referring to FIG. 8, language processing module 808, registry module 704, flight management engine 700 and/or flight controller 120 may generate the language processing model by any suitable method, including without limitation a natural language processing classification algorithm; language processing model may include a natural language process classification model that enumerates and/or derives statistical relationships between input term and output terms. Algorithm to generate language processing model may include a stochastic gradient descent algorithm, which may include a method that iteratively optimizes an objective function, such as an objective function representing a statistical estimation of relationships between terms, including relationships between input terms and output terms, in the form of a sum of relationships to be estimated. In an alternative or additional approach, sequential tokens may be modeled as chains, serving as the observations in a Hidden Markov Model (HMM). HMIs, as used herein, are statistical models with inference algorithms that that may be applied to the models. In such models, a hidden state to be estimated may include an association between an extracted word category of physiological data, a given relationship of such categories to prognostic labels, and/or a given category of prognostic labels. There may be a finite number of category of physiological data, a given relationship of such categories to prognostic labels, and/or a given category of prognostic labels to which an extracted word may pertain; an HMM inference algorithm, such as the forward-backward algorithm or the Viterbi algorithm, may be used to estimate the most likely discrete state given a word or sequence of words. Language processing module 808 and/or flight controller 120 may combine two or more approaches. For instance, and without limitation, machine-learning program may use a combination of Naive-Bayes (NB), Stochastic Gradient Descent (SGD), and parameter grid-searching classification techniques; the result may include a classification algorithm that returns ranked associations.

Continuing to refer to FIG. 8, generating language processing model 808 may include generating a vector space, which may be a collection of vectors, defined as a set of mathematical objects that can be added together under an operation of addition following properties of associativity, commutativity, existence of an identity element, and existence of an inverse element for each vector, and can be multiplied by scalar values under an operation of scalar multiplication compatible with field multiplication, and that has an identity element is distributive with respect to vector addition, and is distributive with respect to field addition. Each vector in an n-dimensional vector space may be represented by an n-tuple of numerical values. Each unique extracted word and/or language element as described above may be represented by a vector of the vector space. In an embodiment, each unique extracted and/or other language element may be represented by a dimension of vector space; as a non-limiting example, each element of a vector may include a number representing an enumeration of co-occurrences of the word and/or language element represented by the vector with another word and/or language element. Vectors may be normalized, scaled according to relative frequencies of appearance and/or file sizes. In an embodiment associating language elements to one another as described above may include computing a degree of vector similarity between a vector representing each language element and a vector representing another language element; vector similarity may be measured according to any norm for proximity and/or similarity of two vectors, including without limitation cosine similarity, which measures the similarity of two vectors by evaluating the cosine of the angle between the vectors, which can be computed using a dot product of the two vectors divided by the lengths of the two vectors. Degree of similarity may include any other geometric measure of distance between vectors.

Still referring to FIG. 8, language processing module 808 and/or flight controller 120 may use a corpus of documents to generate associations between language elements in a language processing module 808, registry module 704 and/or flight management engine 700 may then use such associations to analyze words extracted from one or more documents and determine that the one or more documents indicate significance of a category of flight movement data, a given relationship of such categories to each maneuver data of the plurality of maneuver data 800, and/or a given category of plurality of maneuver data 800. In an embodiment, registry module 704 and/or flight management engine 700 may perform this analysis using a selected set of significant documents, such as documents identified by one or more experts as representing good science, good aviation analysis, good aviation standard, or the like; experts may identify or enter such documents via graphical user interface as described above, or may communicate identities of significant documents according to any other suitable method of electronic communication, or by providing such identity to other persons who may enter such identifications into registry module 704 and/or flight management engine 700. Documents may be entered into registry module 704 and/or flight management engine 700 by being uploaded by an expert or other persons using, without limitation, file transfer protocol (FTP) or other suitable methods for transmission and/or upload of documents; alternatively or additionally, where a document is identified by a citation, a uniform resource identifier (URI), uniform resource locator (URL) or other datum permitting unambiguous identification of the document, registry module 704 and/or flight management engine 700 may automatically obtain the document using such an identifier, for instance by submitting a request to a database or compendium of documents such as JSTOR as provided by Ithaka Harbors, Inc. of New York.

Continuing to refer to FIG. 8, whether an entry indicating significance of a category of flight movement data, a given relationship of such categories to each maneuver data of the plurality of maneuver data 800, and/or a given category of plurality of maneuver data 800 is entered via graphical user interface, alternative submission means, and/or extracted from a document or body of documents as described above, an entry or entries may be aggregated to indicate an overall degree of significance. For instance, each category of flight movement data, a given relationship of such categories to each maneuver data of the plurality of maneuver data 800, and/or a given category of plurality of maneuver data 800 may be given an overall significance score; overall significance score may, for instance, be incremented each time an expert submission and/or paper indicates significance as described above. Persons skilled in the art, upon reviewing the entirety of this disclosure will be aware of other ways in which scores may be generated using a plurality of entries, including averaging, weighted averaging, normalization, and the like. Significance scores may be ranked; that is, all category of flight movement data, a given relationship of such categories to each maneuver data of the plurality of maneuver data 800, and/or a given category of plurality of maneuver data 800 may be ranked according significance scores, for instance by ranking category of flight movement data, a given relationship of such categories to each maneuver data of the plurality of maneuver data 800, and/or a given category of plurality of maneuver data 800 higher according to higher significance scores and lower according to lower significance scores. Categories of flight movement data, a given relationship of such categories to each maneuver data of the plurality of maneuver data 800, and/or a given category of plurality of maneuver data 800 may be eliminated from current use if they fail a threshold comparison, which may include a comparison of significance score to a threshold number, a requirement that significance score belong to a given portion of ranking such as a threshold percentile, quartile, or number of top-ranked scores. Significance scores may be used to filter outputs as described in further detail below; for instance, where a number of outputs are generated and automated selection of a smaller number of outputs is desired, outputs corresponding to higher significance scores may be identified as more probable and/or selected for presentation while other outputs corresponding to lower significance scores may be eliminated.

With continued reference to FIG. 8, registry module 704 operating on flight management engine 700 and/or flight controller 120 may include machine-learning module 812. Machine-learning module 812 can be designed and configured to generate a maneuver model output based on the plurality of tactile movement data 804 and the selected training set 708. The maneuver model output can be configured to include each maneuver data of the plurality of maneuver data 800 for each tactical movement data of the plurality of tactical movement data 804. Machine-learning module 812 may include any hardware and/or software module. Machine-learning module 812 can be designed and configured to generate outputs using machine learning processes. As discussed above, a machine learning process is a process that automatedly uses a body of data known as "training data" and/or a "training set" to generate an algorithm that will be performed by a computing device/module to produce outputs given data provided as inputs; this is in contrast to a non-machine learning software program where the commands to be executed are determined in advance by a user and written in a programming language.

Still referring to FIG. 8, machine-learning module 812 may be designed and configured to generate a machine-learning model, wherein the machine-learning model is at least a model that determines a mathematical relationship between flight movement data and plurality of movement data 800. The machine-learning model may be configured to receive an element of flight movement data and each maneuver data of the plurality of maneuver data 800 as an input and output a maneuver model output based on the correlations in the selected training set 708. Such models may include without limitation model developed using linear regression models. Linear regression models may include ordinary least squares regression, which aims to minimize the square of the difference between predicted outcomes and actual outcomes according to an appropriate norm for measuring such a difference (e.g. a vector-space distance norm); coefficients of the resulting linear equation may be modified to improve minimization. Linear regression models may include ridge regression methods, where the function to be minimized includes the least-squares function plus term multiplying the square of each coefficient by a scalar amount to penalize large coefficients. Linear regression models may include least absolute shrinkage and selection operator (LASSO) models, in which ridge regression is combined with multiplying the least-squares term by a factor of 1 divided by double the number of samples. Linear regression models may include a multi-task lasso model wherein the norm applied in the least-squares term of the lasso model is the Frobenius norm amounting to the square root of the sum of squares of all terms. Linear regression models may include the elastic net model, a multi-task elastic net model, a least angle regression model, a LARS lasso model, an orthogonal matching pursuit model, a Bayesian regression model, a logistic regression model, a stochastic gradient descent model, a perceptron model, a passive aggressive algorithm, a robustness regression model, a Huber regression model, or any other suitable model that may occur to persons skilled in the art upon reviewing the entirety of this disclosure. Linear regression models may be generalized in an embodiment to polynomial regression models, whereby a polynomial equation (e.g. a quadratic, cubic or higher-order equation) providing a best predicted output/actual output fit is sought; similar methods to those described above may be applied to minimize error functions, as will be apparent to persons skilled in the art upon reviewing the entirety of this disclosure.

Continuing to refer to FIG. 8, a machine-learning algorithm used to generate a machine-learning model may include, without limitation, linear discriminant analysis. Machine-learning algorithm may include quadratic discriminate analysis. Machine-learning algorithms may include kernel ridge regression. Machine-learning algorithms may include support vector machines, including without limitation support vector classification-based regression processes. Machine-learning algorithms may include stochastic gradient descent algorithms, including classification and regression algorithms based on stochastic gradient descent. Machine-learning algorithms may include nearest neighbors algorithms. Machine-learning algorithms may include Gaussian processes such as Gaussian Process Regression. Machine-learning algorithms may include cross-decomposition algorithms, including partial least squares and/or canonical correlation analysis. Machine-learning algorithms may include naïve Bayes methods. Machine-learning algorithms may include algorithms based on decision trees, such as decision tree classification or regression algorithms. Machine-learning algorithms may include ensemble methods such as bagging meta-estimator, forest of randomized tress, AdaBoost, gradient tree boosting, and/or voting classifier methods. Machine-learning algorithms may include neural net algorithms, including convolutional neural net processes.

Still referring to FIG. 8, machine-learning module 812 may generate maneuver model output using alternatively or additional artificial intelligence methods, including without limitation by creating an artificial neural network, such as a convolutional neural network comprising an input layer of nodes, one or more intermediate layers, and an output layer of nodes. Connections between nodes may be created via the process of "training" the network, in which elements from a training dataset are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning. This network may be trained using training set 708; the trained network may then be used to apply detected relationships between elements of flight movement data and each maneuver data of the plurality of maneuver data 800.

With continued reference to 8, machine-learning algorithms used by machine-learning module 812 may include supervised machine-learning algorithms, which may, as a non-limiting example be executed using a registry module 704 executing on flight management engine 700 and/or on another computing device in communication with flight controller 120, which may include any hardware or software module. Supervised machine learning algorithms, as defined herein, include algorithms that receive a training set relating a number of inputs to a number of outputs, and seek to find one or more mathematical relations relating inputs to outputs, where each of the one or more mathematical relations is optimal according to some criterion specified to the algorithm using some scoring function. For instance, a supervised learning algorithm may use elements of flight movement data as inputs, each maneuver data of the plurality of maneuver data 800 as outputs, and a scoring function representing a desired form of relationship to be detected between elements of flight movement data and each maneuver data of the plurality of maneuver data 800; scoring function may, for instance, seek to maximize the probability that a given element of flight movement data and/or combination of elements of flight movement data is associated with a given maneuver data of the plurality of maneuver data 800 and/or combination of plurality of maneuver data 800 to minimize the probability that a given element of flight movement data and/or combination of elements of flight movement data is not associated with a given maneuver data of the plurality of maneuver data 800 and/or combination of plurality of maneuver data 800. A scoring function may be expressed as a risk function representing an "expected loss" of an algorithm relating inputs to outputs, where loss is computed as an error function representing a degree to which a prediction generated by the relation is incorrect when compared to a given input-output pair provided in training set 70S. Persons skilled in the art, upon reviewing the entirety of this disclosure, will be aware of various possible variations of supervised machine learning algorithms that may be used to determine relation between elements of flight movement data and each maneuver data of the plurality of maneuver data 800, In an embodiment, one or more supervised machine-learning algorithms may be restricted to a particular domain for instance, a supervised machine-learning process may be performed with respect to a given set of parameters and/or categories of parameters that have been suspected to be related to a given set of maneuver data of the plurality of maneuver data 800. and/or are specified as linked to an aircraft type and/or aircraft class covering a particular set of plurality of maneuver data 800. As a non-limiting example, a particular pitch attitudes and/or sensor data may be typically used by rotorcraft and/or VTOL pilots to specify a particular landing technique, and a supervised machine-learning process may be performed to relate those particular pitch attitudes and/or sensor data to the various landing techniques; in an embodiment, domain restrictions of supervised machine-learning procedures may improve accuracy of resulting models by ignoring artifacts in training data. Domain restrictions may be suggested by experts and/or deduced from known purposes for particular evaluations and/or known tests used to evaluate each maneuver data of the plurality of maneuver data 800. Additional supervised learning processes may be performed without domain restrictions to detect, for instance, previously unknown and/or unsuspected relationships between flight movement data and each maneuver data of the plurality of maneuver data 800.

Still referring to FIG. 8, machine-learning module 812 may alternatively or additionally be designed and configured to generate the maneuver model output by executing a lazy learning process as a function of the selected training set 708 and the plurality of tactile movement data 804; lazy learning processes may be executed using a registry module 704 executing on flight management engine 700 and/or on another computing device in communication with flight controller 120, which may include any hardware or software module. A lazy-learning process and/or protocol, which may alternatively be referred to as a "lazy loading" or "call-when-needed" process and/or protocol, may be a process whereby machine learning is conducted upon receipt of an input to be converted to an output, by combining the input and training set to derive the algorithm to be used to produce the output on demand. For instance, an initial set of simulations may be performed to cover a "first guess" at a prognostic label associated with biological extraction, using selected training set 708. As a non-limiting example, an initial heuristic may include a ranking of each maneuver data of the plurality of maneuver data 800 according to relation to an aircraft class of the plurality of tactile movement data, one or more categories of flight movement data identified in test type of the plurality of tactile movement data, and/or one or more values detected in the plurality of tactile movement data; ranking may include, without limitation, ranking according to significance scores of associations between elements of flight movement data and each maneuver data of the plurality of maneuver data 800, for instance as calculated as described above. Heuristic may include selecting some number of highest-ranking associations and/or plurality of maneuver data 800. Supervised machine-learning model 812 may alternatively or additionally implement any suitable "lazy learning" algorithm, including without limitation a K-nearest neighbors algorithm, a lazy naïve Bayes algorithm, or the like; persons skilled in the art, upon reviewing the entirety of this disclosure, will be aware of various lazy-learning algorithms that may be applied to generate maneuver model outputs as described in this disclosure, including without limitation lazy learning applications of machine-learning algorithms as described in further detail below. Machine-learning module 812 may be configured to include any machine-learning algorithm and/or machine-learning process as described in further detail in the entirety of this disclosure.

With continued reference to FIG. 8, registry module 704 operating on flight management engine 700 and/or flight controller 120 may be configured to record each maneuver data of the plurality of maneuver data 800 in pilot log database 716. Registry module 704 and/or flight controller 120 may be further configured, in an embodiment, to store maneuver model output in pilot log database 716. Flight management engine 700 and/or registry module 704 may include or communicate with pilot log database 716. Pilot log database 716 may be implemented as any database and/or datastore suitable for use as pilot log database 716 as described in the entirety of this disclosure. Each maneuver data of the plurality of maneuver data may be recorded in any suitable data and/or data type, as described above in reference to FIG. 7.

Continuing to refer to FIG. 8, registry module 704 operating on flight management engine 700 and/or flight controller 120 may be configured to record a flight mapping datum utilizing tracking unit 816 disposed on electric aircraft 152. Tracking unit 816 may be disposed internally and/or externally on electric aircraft 152. The "tracking unit" as described herein, is a satellite navigation device wherein the device is configured to calculate the geographical position of electric aircraft 152. For example and without limitation, tracking unit 816 may include data loggers, data pushers, data pullers, automatic dependent surveillance-broadcast, any combination thereof, and/or the like. Persons skilled in the art, upon reviewing the entirety of this disclosure, will be aware of various satellite navigation devices that may be used as tracking unit 816 consistently with this disclosure. The "flight mapping datum" as described in this disclosure, is a datum containing the geographical positioning of electric aircraft 152. For example and without limitation, the flight mapping datum may include unique identifiers of the precise geographic location of electric aircraft 152 on Earth, such as longitude and latitude. Persons skilled in the art, upon reviewing the entirety of this disclosure, will be aware of various geographical positioning that may be used as the flight mapping datum consistently with this disclosure. Registry module 704 and/or flight controller 120 operating on flight management engine 700 may be configured to store the flight mapping datum in pilot log database 716. Pilot log database 716 may be implemented as any database and/or datastore suitable for use as pilot log database 716 as described in the entirety of this disclosure. The flight mapping datum may be stored and/or recorded in any suitable data and/or data type, as described in the entirety of this disclosure. There is no limitation on forms textual data or non-textual data the flight mapping datum may take; persons skilled in the art, upon reviewing the entirety of this disclosure, will be aware of various forms which may be suitable for use as the flight mapping datum consistently with this disclosure.

Figure 9:
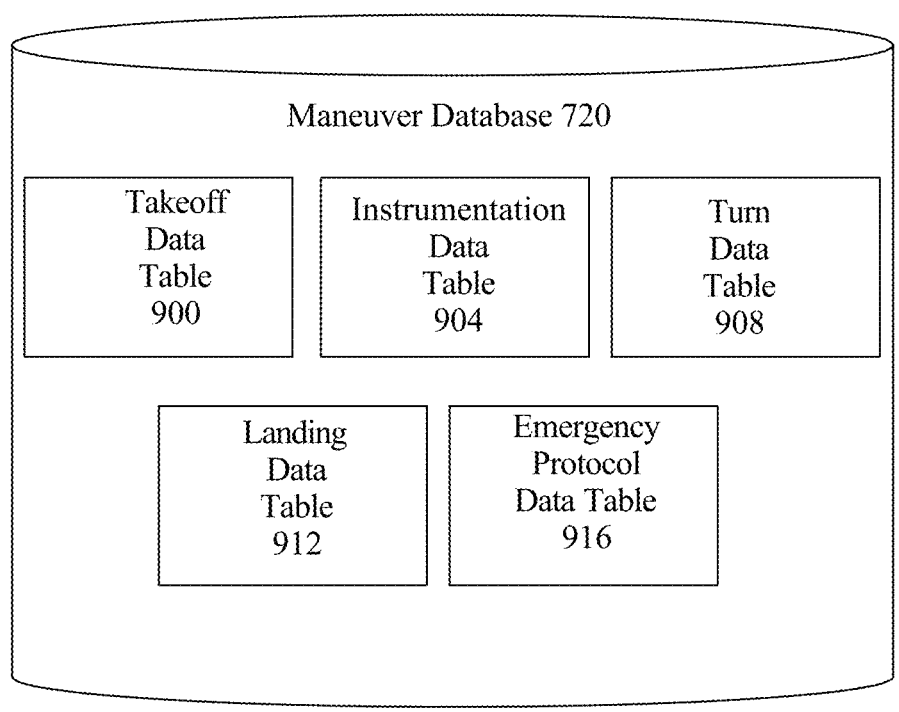
FIG. 9 is a block diagram illustrating an embodiment a maneuver database.

Referring now to FIG. 9, an embodiment of maneuver database 720 is illustrated. Maneuver database 720 may include any data structure for ordered storage and retrieval of data, which may be implemented as a hardware or software module. Maneuver database 720 may be implemented, without limitation, as a relational database, a key-value retrieval datastore such as a NOSQL database, or any other format or structure for use as a datastore that a person skilled in the art would recognize as suitable upon review of the entirety of this disclosure. Maneuver database 720 may include a plurality of data entries and/or records corresponding to elements of flight movement data as described above. Data entries and/or records may describe, without limitation, data concerning particular aircraft procedures, techniques, and skills that have been collected by electric aircraft 152. Data entries in a maneuver database 720 may be flagged with or linked to one or more additional elements of information, which may be reflected in data entry cells and/or in linked tables such as tables related by one or more indices in a relational database; one or more additional elements of information may include data associating a flight procedure with one or more cohorts, including aircraft type groupings, such as fixed conventional, fixed wing complex, light sport, private pilot, instrument, complex, multi-engine, high performance, tail wheel, sea plane, rotorcraft, powered lift, commercial, VTOL, eVTOL, or the like. Additional elements of information may include one or more categories of flight movement data as described above. Persons skilled in the art, upon reviewing the entirety of this disclosure, will be aware of various ways in which data entries in a maneuver database 720 may reflect categories, cohorts, and/or populations of data consistently with this disclosure.

Still referring to FIG. 9, one or more database tables in maneuver database 720 may include, as a non-limiting example, a takeoff data table 900. Takeoff data table 900 may be a table storing takeoff data of flight movement data. Takeoff data table 900 may further include, without limitation, correlating a plurality of tactile movement data 804 received from a device, such as sensor 704 of electric aircraft 152, as described above, to takeoff data of flight movement data. For instance, and without limitation, maneuver database 720 may include a takeoff data table 900 listing takeoff data such as runway alignment, threshold of takeoff pitch attitude, threshold of takeoff bank attitude, threshold of takeoff heading of the aircraft, threshold of takeoff airspeed, threshold of rotor speed for vertical takeoff, and the like, as described above in further detail in reference to FIG. 7.

With continued reference to FIG. 9, maneuver database 720 may include, as a non-limiting example, an instrumentation data table 904. For instance, and without limitation, maneuver database 720 may include an instrumentation data table 904 listing instrumentation data, such as a threshold of vertical speed, threshold of attitude, threshold of altimeter, threshold of airspeed of horizontal flight, and the like, as described above in further detail in reference to FIG. 7. As another non-limiting example, maneuver database 720 may include a turn data table 908, which may list turn data, such as threshold of bank angle for a shallow turn, threshold of bank angle for a medium turn, threshold of bank angle for steep turns, threshold of yaw in the direction of the turn, threshold of yaw in the direction opposite the turn, threshold of airspeed during turn, threshold of heading of the aircraft during turns, and the like, as described above in further detail in reference to FIG. 7. As a further non-limiting example, maneuver database 720 may include a landing data table 912, which may list landing data, such as runway alignment, threshold angle of vertical descent, threshold of angle of landing, threshold of landing pitch attitude, threshold of landing bank attitude, threshold of heading of the aircraft during landing, threshold of landing airspeed, threshold of vibrational frequency during landing, threshold of rotor speed for vertical landing, and the like, as described in further detail above in reference to FIG. 7. As a further example, also non-limiting, maneuver database 720 may include an emergency protocol data table 916, which may list emergency protocol data, such as a threshold of time to recovery of a system malfunction and/or failure, such as power failure in a rotor, power failure in a propeller, damage to a wing, damage to the fuselage, dynamic rollover, damage to a rotor, malfunction with the collective, malfunction with the inceptor stick, and the like, threshold attitude during a malfunction, threshold level of hover, and the like, as described above in further detail in reference to FIG. 7. Tables presented above are presented for exemplary purposes only; persons skilled in the art will be aware of various ways in which data may be organized in maneuver database 720 consistently with this disclosure.

Figure 10:
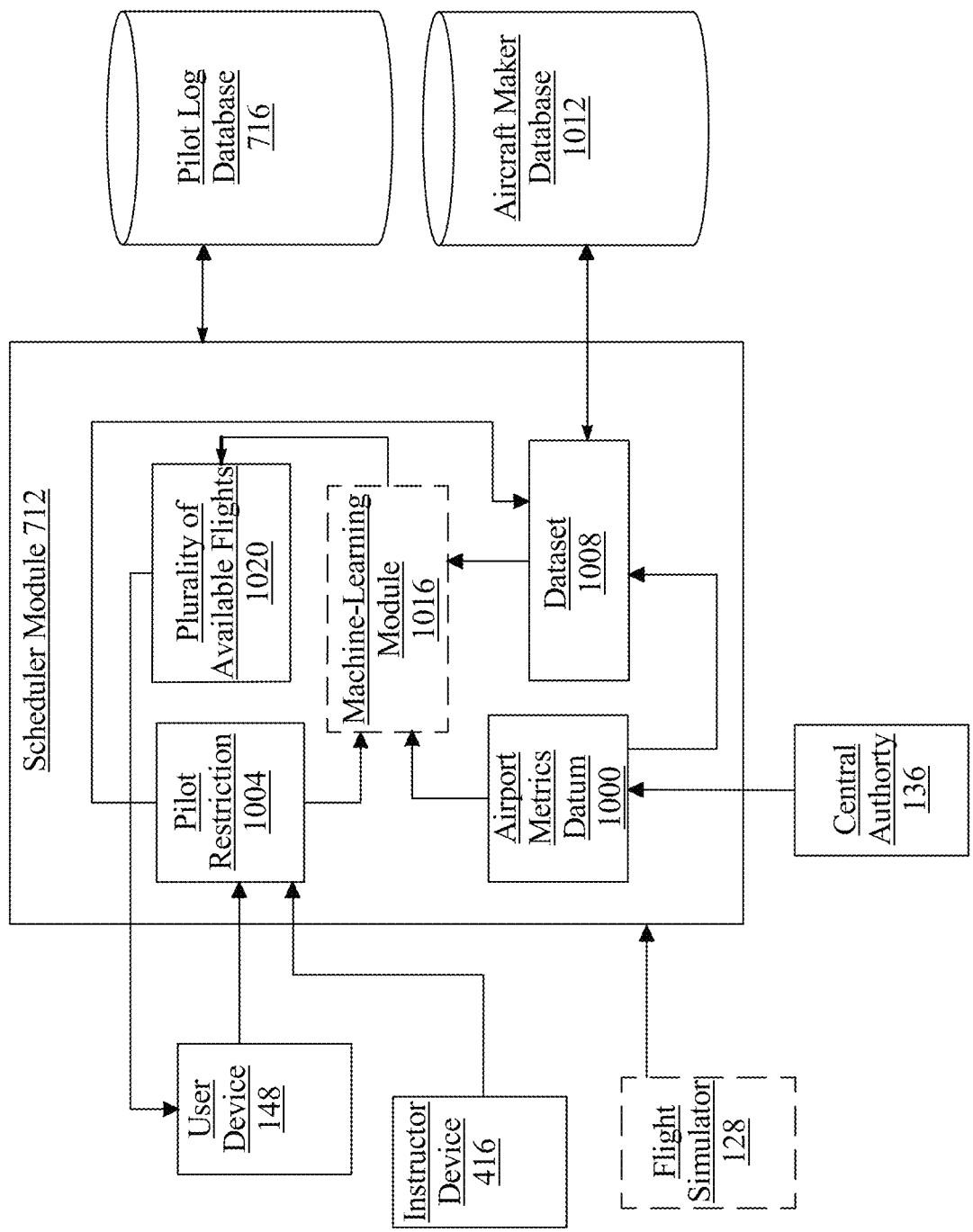
FIG. 10 is a block diagram illustrating an embodiment of a scheduler module.

Referring now to FIG. 10, an embodiment of scheduler module 712 operating on flight management engine 700 is illustrated in detail. In an embodiment, scheduler module 712 and/or flight controller 120 may be configured to receive an airport metrics datum 1000 from central authority 316, as described in further detail above in reference to FIG. 7. Airport metrics datum 1000 may include any airport metrics datum as described in the entirety of this disclosure. For example and without limitation, the airport metrics datum may include 2 Cessna 172 aircraft available from 12 pm to 4 pm. As a further example and without limitation, the airport metrics datum may include one Bell 206 JetRanger available from 9 am to 11 am. Scheduler module 712 and/or flight controller 120 may be further configured to receive a pilot restriction 1004 from user device 148, as described in further detail above in reference to FIG. 7. Pilot restriction 1004 may include any pilot restriction as described in the entirety of this disclosure. For example and without limitation, the pilot restriction may include endorsement data individual to the pilot, such as student, solo, rotorcraft solo, light sport, private pilot, instrument, complex, multi-engine, high performance, tail wheel, sea plane, rotorcraft, powered lift, commercial, ATP, VTOL, eVTOL, and the like. As a further example and without limitation, the pilot restriction may include the need for an instructor to be present on each flight performed by the pilot.

Still referring to FIG. 10, scheduler module 712 operating on flight management engine 700 and/or flight controller 120 may be configured to select a correlated dataset 1008 containing a plurality of data entries wherein each dataset 1008 contains a datum of pilot data and at least a correlated compatible aircraft marker as a function of pilot restriction 1004. In an embodiment, the correlation may occur when the element of airport metrics datum and the correlated compatible aircraft marker are the same, such that the aircraft available at an airport and the aircraft able to be piloted by the user and/or user device 148 are the same. In the embodiment, the airport metrics datum and the pilot restriction may be received by flight controller 120 from central authority 316 and user device 148 respectively, and recorded in data entries, such that the data entries may be correlated. Pilot restriction 1004 may include any pilot restriction as described in the entirety of this disclosure. Datasets may be selected and contained within aircraft marker database 1012. Flight management engine 700 and/or scheduler module 712 and/or flight controller 120 may include or communicate with aircraft marker database 1012. Aircraft marker database 1012 may be implemented as any database and/or datastore suitable for use as aircraft marker database 1012 as described in the entirety of this disclosure. An exemplary embodiment of aircraft marker database 1012 is included below in reference to FIG. 11.

With continued reference to FIG. 10, each dataset contains a datum of pilot data and a correlated compatible aircraft marker. Correlated compatible aircraft marker, as described in the entirety of this disclosure, is any element of data identifying and/or describing the aircraft able to be piloted by the user and/or user device 148 in view of the flying capabilities of the user, as provided by the pilot restriction. For example and without limitation, the aircraft marker correlates the aircraft capable of flight by the user and/or user device 148 given the pilot's licenses, certifications, and endorsements. For example and without limitation, a user with an endorsement data of a light sport pilot may correlate to an aircraft marker detailing only aircraft including a single engine, maximum of two seats, weighing less than 1,320 pounds and having a maximum speed of 138 mph, such as the Cessna 162 Skycatcher, Pipistrel Virus, Remos G3, and the like. As a further example and without limitation, a user with endorsement data of a private pilot may correlate to an aircraft marker including all fixed-wing single engine aircraft operating at less than 180 horsepower. A user with endorsement data of powered lift may correlate, as a non-limiting example, to an aircraft marker detailing heavier-than-air aircraft capable of vertical takeoff, vertical landing, and low speed flight that depends principally on engine-driven lift devices or engine thrust for lift during these flight regimes and on nonrotating airfoil(s) for lift during horizontal flight. Persons skilled in the art, upon reviewing the entirety of this disclosure, will be aware of various types of aircraft which may be suitable for use as the aircraft marker consistently with this disclosure. In an embodiment, correlated dataset 1008 may include any data suitable for use as training data as described in the entirety of this disclosure.

Continuing to refer to FIG. 10, scheduler module 712 operating on flight management engine 700 and/or flight controller 120 may be configured to include a machine-learning module 1016. Machine-learning module 1016 may operate on the flight management engine 700, flight controller 120 and/or another computing device in communication with the flight controller 120, which may include any hardware and/or software module. Machine-learning module 1016 can be designed and configured to generate outputs using machine learning processes. A machine learning process is a process that automatedly uses a body of data known as "dataset" and/or a "correlated dataset" to generate an algorithm that will be performed by a computing device/module to produce outputs given data provided as inputs, as described above in the entirety of this disclosure. In an embodiment and without limitation, machine-learning module 1016 may include any machine-learning process and/or machine-learning algorithm as described in the entirety of this disclosure. In the non-limiting embodiment, machine-learning module 1016 may be implemented in any suitable means of implementation as described in further detail in the entirety of this disclosure.

Still referring to FIG. 10, scheduler module 712 and/or flight controller 120 may be configured to generate, at machine-learning module 1016, a plurality of available flight output 1020 as a function of airport metrics datum 1000 and correlated dataset 1008 utilizing a machine-learning algorithm. The "plurality of available flights" as described herein, is each available flight of the plurality of available flights, wherein each flight correlates to a possible flight option for the pilot, the user, and/or user device 148. The possible flight option may include an airport within close proximity with an aircraft qualified for the pilot at a specific date and time of day. For example and without limitation, a user in the process of achieving a rotorcraft certificate located in Boston, Mass. may require an instructor present for all practice rotorcraft flights, the plurality of available flights output 1020 may include the following available flights; an instructor-led flight out of Norwood Memorial Airport in Norwood, Mass. from 10 am-1 pm on Thursday September $3^{rd}$ utilizing a Robinson R22 helicopter, an instructor-led flight out of Norwood Memorial Airport in Norwood, Mass. from 3 pm-7 pm on Friday September $4^{th}$ utilizing a Robinson R22 helicopter, an instructor-led flight out of Beverly Memorial Airport in Beverly, Mass. from 2 pm-5 pm on Friday September $4^{th}$ utilizing a Robinson R44 helicopter, and an instructor-led flight out of Nashua Airport in Nashua, N.H. from 11 am-4 pm on Friday September $4^{th}$ utilizing a Robinson R22 helicopter. As a further example and without limitation, a user with a private pilot license located in Burlington, Mass. may receive a plurality of available flight output 1020 including the following available flights; a flight out of Beverly Memorial Airport in Beverly, Mass. from 9 am-12 pm on Tuesday November $10^{th}$ utilizing a Beechcraft Bonanza light aircraft, a flight out of Nashua Airport in Nashua, N.H. from 1 pm-5 pm on Tuesday November $10^{th}$ utilizing a Cessna 172 light aircraft, a flight out of Beverly Memorial Airport in Beverly, Mass. from 2 pm-6 pm on Wednesday November $11^{th}$ utilizing a Cessna 172 light aircraft, and a flight out of Norwood Memorial Airport in Norwood, Mass. from 3 pm-7 pm on Wednesday November $11^{th}$ utilizing a Beechcraft Bonanza light aircraft. Persons skilled in the art, upon reviewing the entirety of this disclosure, will be aware of various outputs which may be suitable for use as the plurality of available flights output consistently with this disclosure.

With continued reference to FIG. 10, scheduler module 712 operating on flight management engine 700 and/or flight controller 120 may be configured to display each available flight of the plurality of available flights 1020 to the user and/or user device 148. The plurality of available flights output 1020 may be displayed to the user and/or user device 148 utilizing a graphical user interface. The graphical user interface may include any graphical user interface as described in the entirety of this disclosure. Each available flight of the plurality of available flights 1020 may be displayed to a user and/or user device 148, for example and without limitation, as a textual display detailing each available flight, an image and/or set of images detailing each available flight of the plurality of available flights 1020, and/or any combination thereof. As a further non-limiting example, the plurality of available flights 1020 may be displayed to the user and/or user device 148 utilizing a drop-down display detailing each available flight of the plurality of available flights 1020. Persons skilled in the art, upon reviewing the entirety of this disclosure, will be aware of various means of display which may be suitable for use with the plurality of available flights output consistently with this disclosure.

Continuing to refer to FIG. 10, scheduler module 712 operating on flight management engine 700 and/or flight controller 120 may be configured to receive an available flight selection from the user and/or user device 148 and transmit the available flight selection to ATC central authority 316. The "available flight selection" as used in this disclosure is the user selection of one available flight of the plurality of available flights included in output 1020, wherein the user selection includes the data associated with the available flight. User device 148 may include any user device as described in this disclosure; including for example and without limitation the graphical user interface as described above. Transmitting the available flight selection to ATC central authority 316 may further include confirming the available flight selected by the pilot, user, and/or user device 148 with the airport and/or ATC central authority 316. ATC central authority 316 may include any ATC central authority 316 as described in the entirety of this disclosure. Scheduler module 712 and/or flight controller 120 may be further configured to store the available flight selection in any database operating on flight controller 120, such as pilot log database 716. The available flight selection may be stored in any suitable data and/or data type, as described in the entirety of this disclosure. Flight management engine 700, scheduler module 712 and/or flight controller 120 may include or communicate with pilot log database 716. Pilot log database 716 may be implemented as any database and/or datastore suitable for use as pilot log database 716 as described in the entirety of this disclosure. An exemplary embodiment of pilot log database 716 is included below in reference to FIG. 11.

Figure 11:
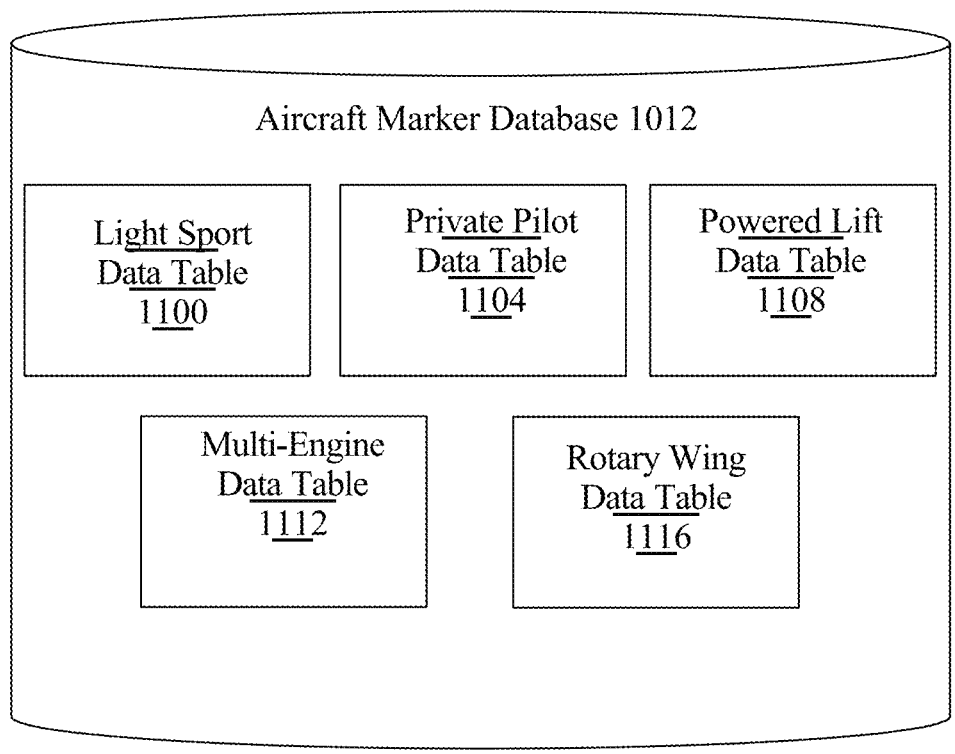
FIG. 11 is a block diagram illustrating an embodiment of an aircraft marker database.

Referring now to FIG. 11, an embodiment of aircraft marker database 1012 is illustrated. Aircraft marker database 1012 may include any data structure for ordered storage and retrieval of data, which may be implemented as a hardware or software module. Aircraft marker database 1012 may be implemented, without limitation, as a relational database, a key-value retrieval datastore such as a NOSQL database, or any other format or structure for use as a datastore that a person skilled in the art would recognize as suitable upon review of the entirety of this disclosure. Aircraft marker database 1012 may include a plurality of data entries and/or records corresponding to aircraft types as described above. Data entries and/or records may describe, without limitation, data concerning light sport data, private pilot data, powered lift data, multi-engine data, high performance data, and rotary wing data. Data entries in an aircraft marker database 1012 may be flagged with or linked to one or more additional elements of information, which may be reflected in data entry cells and/or in linked tables such as tables related by one or more indices in a relational database; one or more additional elements of information may include data associating a flight classification and/or permission with one or more cohorts, including aircraft type groupings, such as fixed conventional, fixed wing complex, light sport, private pilot, instrument, complex, multi-engine, high performance, tail wheel, sea plane, rotorcraft, powered lift, commercial, VTOL, eVTOL, or the like. Additional elements of information may include one or more categories of pilot license data as described above. Persons skilled in the art, upon reviewing the entirety of this disclosure, will be aware of various ways in which data entries in an aircraft marker database 1012 may reflect categories, cohorts, and/or populations of data consistently with this disclosure.

Still referring to FIG. 11, one or more database tables in aircraft marker database 1012 may include, as a non-limiting example, light sport data table 1100. Light sport data table 1100 may be a table matching pilot restriction received from a device, such as user device 148, as described above, to a user with an endorsement data of a light sport pilot of the aircraft marker. For instance, and without limitation, aircraft marker database 1012 may include a light sport data table 1100 listing aircraft able to be piloted by a user with light sport endorsement data, such as Czech Sport Aircraft Sportcruiser, Icon A5, Cessna Skycatcher, Tecnam Turbo P2008, Tecnam Turbo Astore, Rans S-7LS Courier, Colyaer Freedom 5100, 3XTrim 3XLS Navigator 600, Aerospool WT-9 Dynamic, American Legend AL3C-100, BRM Aero Bristell LSA, Cessna 162, Czech Sport Aircraft Pipersport, Ekolot KR030 Topaz, and the like, as described above in further detail in reference to FIG. 10.

With continued reference to FIG. 11, aircraft marker database 1012 may include, as a non-limiting example, a private pilot data table 1104. For instance, and without limitation, aircraft marker database 1012 may include private pilot data table 1104 matching/correlating pilot restriction data received from a device, such as user device 148, as described above, to a user with an endorsement data of a private pilot of the aircraft marker. For instance and without limitation, aircraft marker database 1012 may include private pilot data table 1104 listing aircraft able to be piloted by a user with a private pilot endorsement datum, such as an aircraft having no more than 180 horsepower, such as single-engine airplanes, multi-engine airplanes, rotorcraft, gliders, powered-lift, and the like, as described above in further detail in reference to FIG. 10. As another non-limiting example, aircraft marker database 1012 may include, as a non-limiting example, a powered lift data table 1108. For instance, and without limitation, aircraft marker database 1012 may include powered lift data table 1108 matching pilot restriction received from a device, such as user device 148, as described above, to a user with an endorsement data of powered lift of the aircraft marker. For instance and without limitation, aircraft marker database 1012 may include powered lift data table 1108 listing aircraft able to be piloted by a user with a powered lift endorsement data, such as a heavier-than-air aircraft capable of vertical takeoff, vertical landing, and low speed flight that depends principally on engine-driven lift devices or engine thrust for lift during these flight regimes and on nonrotating airfoil(s) for lift during horizontal flight, such as a convertiplane, tiltrotor aircraft, tiltwing aircraft, tail-sitter aircraft, vectored thrust aircraft, lift jet aircraft, lift fan aircraft, lift via Coandă effect, eVTOL aircraft, and the like, as described above in further detail in reference to FIG. 10.

Still referring to FIG. 11, aircraft marker database 1012 may include, as a non-limiting example, a multi-engine data table 1148. For instance, and without limitation, aircraft marker database 1012 may include multi-engine data table 1148 matching pilot restriction received from a device, such as user device 148, as described above, to a user with an endorsement data of multi-engine of the aircraft marker. For instance and without limitation, aircraft marker database 1012 may include multi-engine data table 1148 listing aircraft able to be piloted by a user with multi-engine endorsement data, such as an aircraft having more than one engine, such as Beechcraft 58 Baron, Vulcanair P-68, Diamond DA-62, Piper Seneca III, Piper Aztec, Cessna 310, Cessna 340, Cessna 412, Beechcraft B60 Duke, Cessna T303 Crusader, Piper Navajo Chieftain, Boeing 747, Airbus A340, and the like, as described above in further detail in reference to FIG. 10. As a further non-limiting example, aircraft marker database 1012 may include a rotary wing data table 1116. For instance, and without limitation, aircraft marker database 1012 may include rotary wing data table 1116 matching pilot restriction received from a device, such as user device 148, as described above, to a user with an endorsement data of rotary wing of the aircraft marker. For instance and without limitation, aircraft marker database 1012 may include rotary wing data table 1116 listing aircraft able to be piloted by a user with rotary wing endorsement data, such as a helicopter, such as Robinson R22, Eurocopter AS350 Ecureuil, Sikorsky UH-60 Black Hawk, Highes OH-6 Cayuse, Robinson R44, MIL MI-2, Bell 47, Bell 406 Jetranger, Bell 222, Augusta Westland 109 Power Grand, Augusta Westland 139, Eurocopter 120 Colibri, McDonnell Douglas MD 900, Sikorsky S-76, and the like, as described above in further detail in reference to FIG. 10. Tables presented above are presented for exemplary purposes only; persons skilled in the art will be aware of various ways in which data may be organized in aircraft marker database 1012 consistently with this disclosure.

Figure 12:
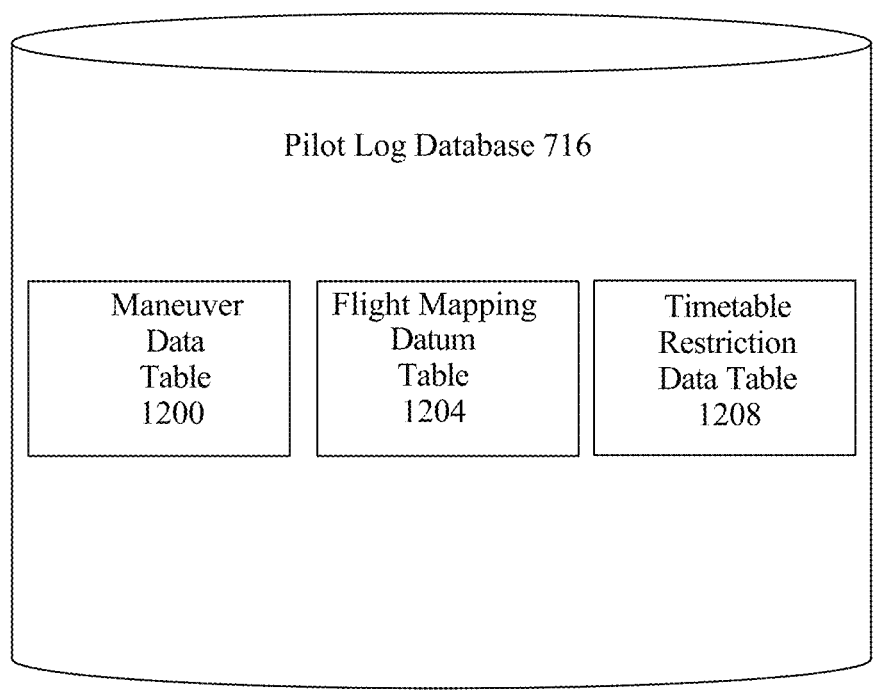
FIG. 12 is a block diagram illustrating an embodiment of a pilot log database.

Referring now to FIG. 12, an embodiment of pilot log database 716 is illustrated. Pilot log database 716 may include any data structure for ordered storage and retrieval of data, which may be implemented as a hardware or software module. Pilot log database 716 may be implemented, without limitation, as a relational database, a key-value retrieval datastore such as a NOSQL database, or any other format or structure for use as a datastore that a person skilled in the art would recognize as suitable upon review of the entirety of this disclosure. Pilot log database 716 may include a plurality of data entries and/or records corresponding to elements as described above. Data entries and/or records may describe, without limitation, data concerning the plurality of maneuver data 800, element of flight mapping datum, and the timetable restriction.

Still referring to FIG. 12, one or more database tables in pilot log database 716 may include, as a non-limiting example, a maneuver data table 1200. Maneuver data table 1200 may be a table storing each maneuver data of the plurality of maneuver data 800 generated by registry module 136. For instance, and without limitation, pilot log database 716 may include maneuver data table 1200 listing each maneuver data of the plurality of maneuver data 800, the associated data of each maneuver data, such as each tactical movement data of the plurality of tactical movement data 804, each correlated element of flight movement data, and the like.

Continuing to refer to FIG. 12, one or more database tables in pilot log database 716 may include, as a non-limiting example, a flight mapping datum table 1204. Flight mapping datum table 1204 may be a table storing the flight mapping datum received by the tracking unit 816 disposed on electric aircraft 152. For instance, and without limitation, pilot log database 716 may include a flight mapping datum table 1204 listing the flight mapping datum received by the tracking unit 816 disposed on electric aircraft 152, such as the latitude and longitude of the electric aircraft continuously measured during the duration of a flight.

With continued reference to FIG. 12, one or more database tables in pilot log database 716 may include, as a non-limiting example, a timetable restriction datum table 1208. Timetable restriction data table 1208 may be a table storing the timetable restriction datum received by the user device 148 and/or instructor device 420. For instance, and without limitation, pilot log database 716 may include a timetable restriction datum table 1208 listing timetable restriction datum received by the user device 148, such as the availability, in time of day, of the pilot to participate in a flight. Tables presented above are presented for exemplary purposes only; persons skilled in the art will be aware of various ways in which data may be organized in pilot log database 716 consistently with this disclosure.

Figure 13:
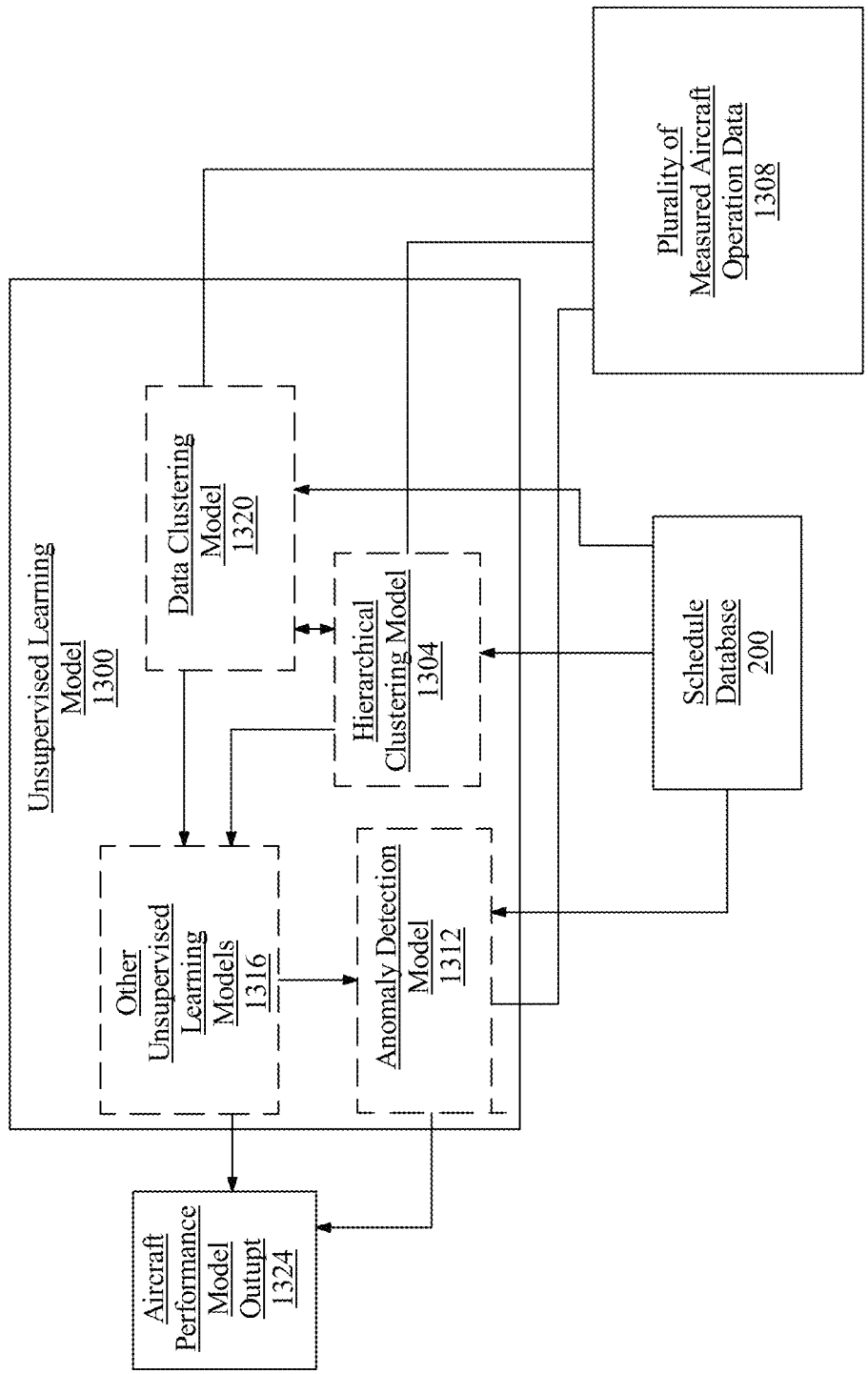
FIG. 13 is a schematic representation illustrating an embodiment of a clustering unsupervised machine-learning model.

Referring now to FIG. 13, an embodiment of unsupervised machine-learning model 1300 is illustrated. Unsupervised learning may include any of the unsupervised learning processes as described herein. Unsupervised machine-learning model 1300 includes any clustering unsupervised machine-learning model as described herein. Unsupervised machine-learning model 1300 generates at least a second correlated aircraft performance model output 1324. The at least a second correlated aircraft performance model output 1324 is generated as a function of the plurality of measured aircraft operation datum and the correlated dataset. Correlated dataset may be selected from a schedule database 200 or any database as described herein. Schedule database 200 may contain data describing different characteristics of the plurality of measured aircraft operation datum 108, wherein the plurality of measured aircraft operation datum is described herein, which may be organized into categories contained within a schedule database 200 as described herein. Unsupervised machine-learning model may further include a hierarchical clustering model 1304. Hierarchical clustering model 1304 may group and/or segment datasets into hierarchy clusters including both agglomerative and divisive clusters. Agglomerative clusters may include a bottom up approach where each observation starts in its own cluster and pairs of clusters are merged as one moves up the hierarchy. Divisive clusters may include a top down approach where all observations may start in one cluster and splits are performed recursively as one moves down the hierarchy. In an embodiment, hierarchical clustering model 1304 may analyze datasets obtained from schedule database 200 to find observations which may each initially form own cluster. Hierarchical clustering model 1304 may then then identify clusters that are closest together and merge the two most similar clusters and continue until all clusters are merged together. Hierarchical clustering model 1304 may output a dendrogram which may describe the hierarchical relationship between the clusters. Distance between clusters that are created may be measured using a suitable metric. Distance may be measured between for example the two most similar parts of a cluster known as single linkage, the two least similar bits of a cluster known as complete-linkage, the center of the clusters known as average-linkage or by some other criterion which may be obtained based on input received from any database as described herein, as an example.

With continued reference to FIG. 13, unsupervised machine-learning model 1300 may perform other unsupervised machine learning models to output at least an aircraft operation model output 1324. Unsupervised machine-learning model 1300 may include a data clustering model 1308. Data clustering model 1308 may group and/or segment datasets with shared attributes to extrapolate algorithmic relationships. Data clustering model 1308 may group data that has been labelled, classified, and/or categorized. Data clustering model 1308 may identify commonalities in data and react based on the presence or absence of such commonalities. For instance and without limitation, data clustering model 1308 may identify other data sets that contain the same or similar characteristics of the measured aircraft operation datum contained within plurality of measured aircraft operation datum 1308 or identify other datasets that contain parts with similar attributes and/or differentiations. In an embodiment, data clustering model 1308 may cluster data and generate labels that may be utilized as training set data. Data clustering model 1308 may utilize other forms of data clustering algorithms including for example, hierarchical clustering, k-means, mixture models, OPTICS algorithm, and DBSCAN.

With continued reference to FIG. 13, unsupervised machine-learning model 1300 may include an anomaly detection model 1312, Anomaly detection model 1312 may include identification of rare items, events or observations that differ significant from the majority of the data. Anomaly detection model 1312 may function to observe and find outliers. For instance and without limitation, anomaly detect may find and examine data outliers such as a that is not compatible with any part elements or that is compatible with very few part elements.

Still referring to FIG. 13, unsupervised machine-learning model 1300 may include other unsupervised machine-learning models 1316. This may include for example, neural networks, autoencoders, deep belief nets, Hebbian learning, adversarial networks, self-organizing maps, expectation-maximization algorithm, method of moments, blind signal separation techniques, principal component analysis, independent component analysis, non-negative matrix factorization, singular value decomposition.

Figure 14:
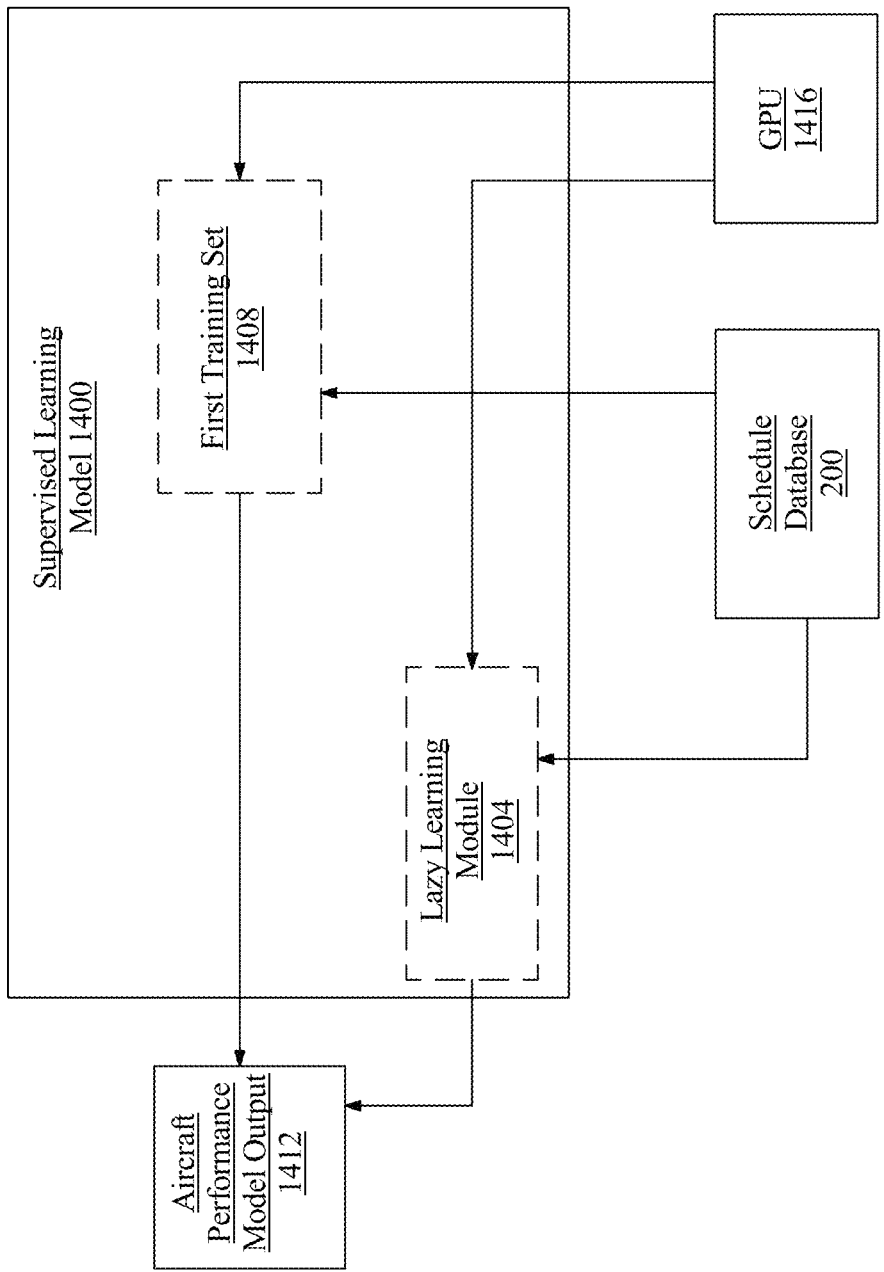
FIG. 14 is a schematic representation illustrating an embodiment of a supervised machine-learning model.

Referring now to FIG. 14, an embodiment of supervised machine learning model 14160 is illustrated. Supervised machine-learning model 14160 is configured to generate an aircraft performance model output 1412. Aircraft performance model output 1412 is generated as a function of relating plurality of measured aircraft operation datum to at least an aircraft performance model output. Supervised machine-learning model 14160 generates the aircraft performance model output 1412 using first training set 14168. Supervised machine-learning model 14160 may be configured to perform any supervised machine-learning algorithm as described above herein. This may include for example, support vector machines, linear regression, logistic regression, naïve Bayes, linear discriminant analysis, decision trees, k-nearest neighbor algorithm, neural networks, and similarity learning. In an embodiment, first training set 14168 may include the at least a correlated dataset. Supervised machine-learning model 14160 may be further configured to calculate the external milling time as a function of relating the plurality of measured aircraft operation datum to the aircraft performance model output 1412.

With continued reference to FIG. 14, supervised learning model 14160 may include a graphic processing unit (GPU) 1416. As described herein, GPU 112 may include a device with a set of specific hardware capabilities that are intended to map well to the way that various 3D engines execute their code, including geometry setup and execution, texture mapping, memory access, and shaders. GPU 1416 may include, without limitation, a specialized electronic circuit designed to rapidly manipulate and alter memory to accelerate the creation of images in a frame buffer. For instance, and without limitation, GPU 1416 may include a computer chip that performs rapid mathematical calculations, primarily for the purpose of rendering images. GPU 1416 may further include, without limitation, full scene anti-aliasing (FSAA) to smooth the edges of 3-D objects and anisotropic filtering (AF) to make images look crisper. GPU 1416 may include, without limitation, dedicated graphics cards, integrated graphics cards, hybrid graphics cards, and/or any combination thereof. GPU 1416 may be configured to calculate the volume removed by each tool of the plurality of tools for the at least a correlated compatible part element as a function of the at least an internal request datum.

Continuing to refer to FIG. 14, supervised machine-learning model 14160 may generate aircraft performance model output 1412 by executing a lazy learning module 14164. Lazy learning module 14164 is executed as a function of manufacturing request datum and the at least a part element. A lazy-learning process and/or protocol, which may alternatively be referred to as a "lazy loading" or "call-when-needed" process and/or protocol, may be a process whereby machine learning is conducted upon receipt of an input to be converted to an output, by combining the input and training set to derive the algorithm to be used to produce the output on demand. For instance, an initial set of simulations may be performed to cover a "first guess" at a data associated with at least a measured aircraft operation datum, using at least a training set. Aircraft performance model output such as a virtual representation or performance alert that may include a plurality of time reliant schedules may be calculated using the following equation:

$$T^{MKT} = \frac{V_1}{MRR_1} + \frac{V_2}{MRR_2} + \frac{V_3}{MRR_3} + \ldots \frac{V_n}{MRR_n} + \frac{S_1}{ARR_1} + \frac{S_2}{ARR_2} + \frac{S_3}{ARR_3} + \ldots \frac{S_n}{ARR_n}$$

where $T^{MKT}$ is the external milling time, $V_n$ is the volume removed by each tool of the plurality of tools, $MRR_n$ is the material removal rate of each tool of the plurality of tools, $S_n$ is the surface area removed by each tool of the plurality of tools, and $ARR_n$ is the area removal rate of each tool of the plurality of tools. Heuristic may include calculating external price output according to associations and/or compatible part elements. External price output may be calculated using the following equation:

$$P^{MKT}=(T^{MKT}\cdot\text{<Mill Rate>}+\text{<Material cost>}+\text{<Labor cost>}+\text{<Overhead cost>}+\text{<Rework cost>}+\text{<Operating costs>})\cdot\text{<Mark up>} \qquad [\text{EQ 02}]$$

where $P^{MKT}$ is the aircraft performance model output, and $T^{MKT}$ is the time reliant schedule as calculated above. Lazy learning module 14164 may alternatively or additionally implement any suitable "lazy learning" algorithm, including without limitation a K-nearest neighbors algorithm, a lazy naïve Bayes algorithm, or the like; persons skilled in the art, upon reviewing the entirety of this disclosure, will be aware of various lazy-learning algorithms that may be applied to generate external price outputs as described in this disclosure, including without limitation lazy learning applications of machine-learning algorithms as described in further detail below.

Figure 15:
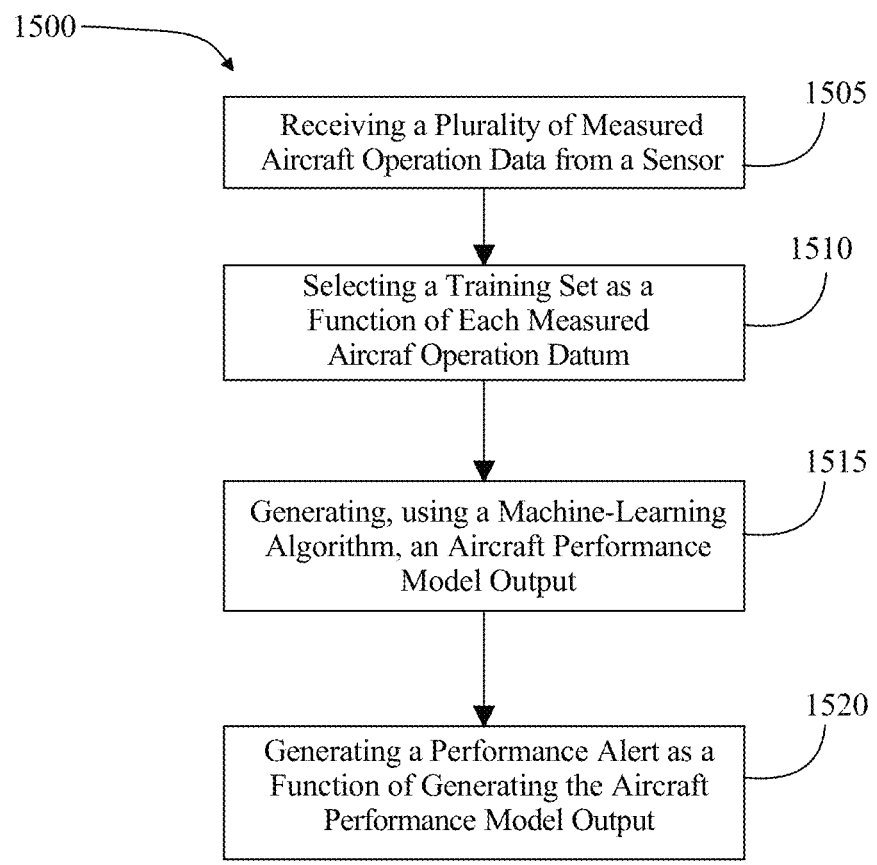
FIG. 15 is a flow diagram illustrating a method for fleet management system.

Referring now to FIG. 15, a flow diagram of a method 1500 for a computing device configured for use for fleet management is presented. Method 1500 includes step 1505 which includes receiving, by a computing device communicatively connected to at least an electric aircraft, a plurality of measured aircraft operation datum from a sensor disposed on the at least an electric aircraft. Receiving the plurality of measured aircraft operation datum may include a sensor configured to detect a plurality of measured aircraft operation datum including aircraft component state data, a payload data, and a pilot data.

With continued reference to FIG. 15, method 1500 includes step 1510 which includes selecting a training set as a function of each measured aircraft operation datum of the plurality of measured aircraft operation datum and the at least an electric aircraft, wherein each measured aircraft operation datum of the plurality of measured aircraft operation datum is correlated to an element of modeled aircraft data. Selecting a training set may be include correlating a plurality of measured aircraft operation datum to an element of modeled aircraft data. The element of modeled aircraft data may include a simulation of a flight. Selecting the training data may be performed utilizing any means of selection as described in the entirety of this disclosure. In a non-limiting embodiment, selecting a training set may include correlating the plurality of measured aircraft operation datum to an aircraft performance model output 136 which may include a health projection for at least a flight component associated.

With continued reference to FIG. 15, method 1500 includes step 1515 which includes generating, using a machine-learning algorithm, an aircraft performance model output based on the plurality of measured aircraft operation datum and the selected training set. Generating the aircraft performance model output may be performed using a supervised machine-learning model. Generating the aircraft performance model output may be performed using an unsupervised machine-learning model. Generating the aircraft performance model output may include generating a plurality of information in various forms. In a non-limiting embodiment, step 1515 may include generating a flight simulation, a health projection, a health history, a plurality of schedules, and the like thereof.

With continued reference to FIG. 15, method 1500 includes step 1420 which includes generating a performance alert. Performance alert may include any performance alert as described in the entirety of this disclosure. In a non-limiting embodiment, a flight controller may be configured to record a plurality of data during an occurrence of an issue or during an occurrence of a predictive issue that may occur. In a non-limiting embodiment, performance alert may include a plurality of performance alerts for each major flight component. For instance, a performance alert may flash and alert a user during an occurrence of a failure or degradation of a flight component during flight, before takeoff, after landing, and the like thereof. In a non-limiting embodiment, performance alert 146 be triggered when an obstructive outside parameter is detected. A person of ordinary skill in the art, after viewing the entirety of this disclosure, would appreciate the function of an alert in the context of detecting, avoiding, and analyzing unexpected and potentially hazardous obstacles and/or issues.

Figure 16:
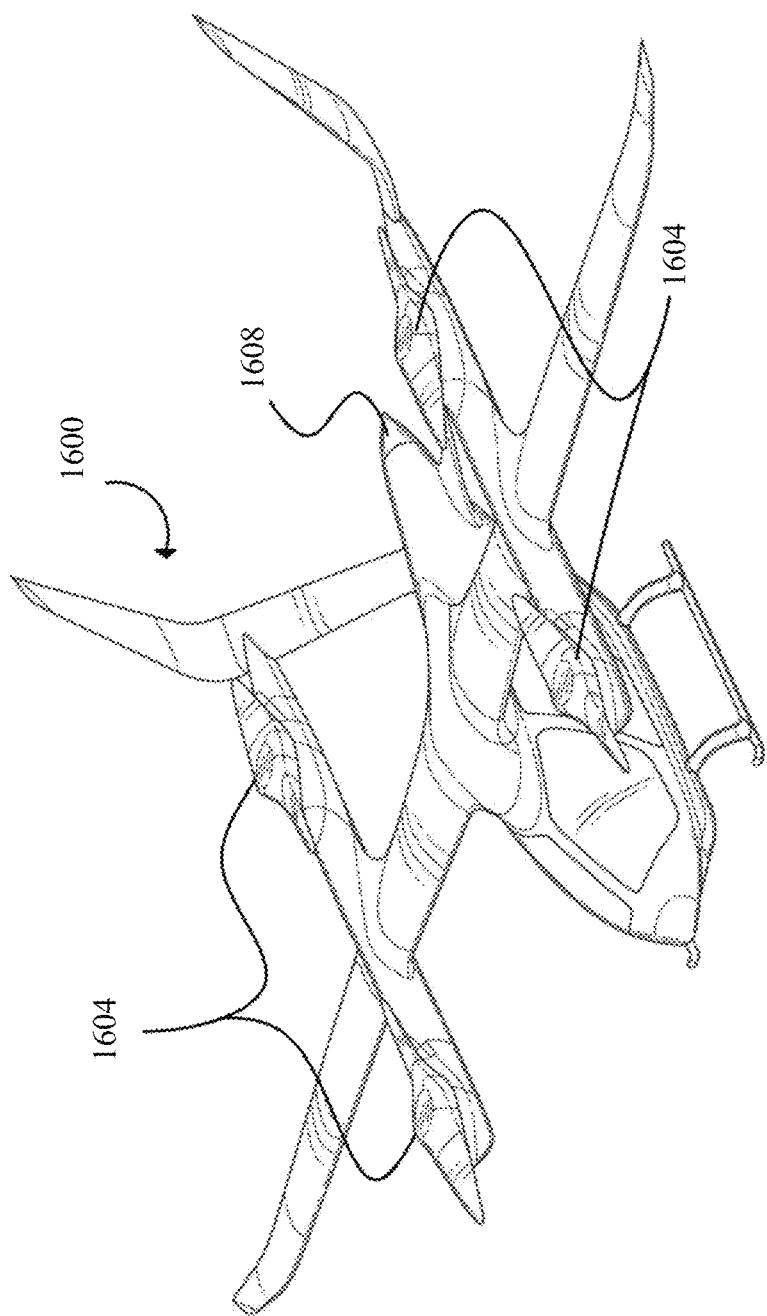
FIG. 16 is a diagrammatic representation of an exemplary embodiment of an electric aircraft.

Referring now to FIG. 16, an exemplary embodiment of an aircraft 1600, which may include, or be incorporated with, a system for optimization of a recharging flight plan is illustrated. As used in this disclosure an "aircraft" is any vehicle that may fly by gaining support from the air. As a non-limiting example, aircraft may include airplanes, helicopters, commercial and/or recreational aircraft, instrument flight aircraft, drones, electric aircraft, airliners, rotorcrafts, vertical takeoff and landing aircraft, jets, airships, blimps, gliders, paramotors, and the like thereof.

Still referring to FIG. 16, aircraft 1600 may include an electrically powered aircraft. In embodiments, electrically powered aircraft may be an electric vertical takeoff and landing (eVTOL) aircraft. Aircraft 1600 may include an unmanned aerial vehicle and/or a drone. Electric aircraft may be capable of rotor-based cruising flight, rotor-based takeoff, rotor-based landing, fixed-wing cruising flight, airplane-style takeoff, airplane-style landing, and/or any combination thereof. Electric aircraft may include one or more manned and/or unmanned aircraft. Electric aircraft may include one or more all-electric short takeoff and landing (eSTOL) aircraft. For example, and without limitation, eSTOL aircraft may accelerate the plane to a flight speed on takeoff and decelerate the plane after landing. In an embodiment, and without limitation, electric aircraft may be configured with an electric propulsion assembly. Electric propulsion assembly may include any electric propulsion assembly as described in U.S. Nonprovisional application Ser. No. 16/703,225, filed on Dec. 4, 2019, and entitled "AN INTEGRATED ELECTRIC PROPULSION ASSEMBLY," the entirety of which is incorporated herein by reference. For purposes of description herein, the terms "upper," "lower," "left," "rear," "right," "front," "vertical," "horizontal," "upward," "downward," "forward," "backward" and derivatives thereof shall relate to the invention as oriented in FIG. 16.

Still referring to FIG. 16, aircraft 1600 includes a fuselage 1604. As used in this disclosure a "fuselage" is the main body of an aircraft, or in other words, the entirety of the aircraft except for the cockpit, nose, wings, empennage, nacelles, any and all control surfaces, and generally contains an aircraft's payload. Fuselage 1604 may include structural elements that physically support a shape and structure of an aircraft. Structural elements may take a plurality of forms, alone or in combination with other types. Structural elements may vary depending on a construction type of aircraft such as without limitation a fuselage 1604. Fuselage 1604 may comprise a truss structure. A truss structure may be used with a lightweight aircraft and comprises welded steel tube trusses. A "truss," as used in this disclosure, is an assembly of beams that create a rigid structure, often in combinations of triangles to create three-dimensional shapes. A truss structure may alternatively comprise wood construction in place of steel tubes, or a combination thereof. In embodiments, structural elements may comprise steel tubes and/or wood beams. In an embodiment, and without limitation, structural elements may include an aircraft skin. Aircraft skin may be layered over the body shape constructed by trusses. Aircraft skin may comprise a plurality of materials such as plywood sheets, aluminum, fiberglass, and/or carbon fiber, the latter of which will be addressed in greater detail later herein.

In embodiments, and with continued reference to FIG. 16, aircraft fuselage 1604 may include and/or be constructed using geodesic construction. Geodesic structural elements may include stringers wound about formers (which may be alternatively called station frames) in opposing spiral directions. A "stringer," as used in this disclosure, is a general structural element that includes a long, thin, and rigid strip of metal or wood that is mechanically coupled to and spans a distance from, station frame to station frame to create an internal skeleton on which to mechanically couple aircraft skin. A former (or station frame) may include a rigid structural element that is disposed along a length of an interior of aircraft fuselage 1604 orthogonal to a longitudinal (nose to tail) axis of the aircraft and may form a general shape of fuselage 1604. A former may include differing cross-sectional shapes at differing locations along fuselage 1604, as the former is the structural element that informs the overall shape of a fuselage 1604 curvature. In embodiments, aircraft skin may be anchored to formers and strings such that the outer mold line of a volume encapsulated by formers and stringers comprises the same shape as aircraft 1600 when installed. In other words, former(s) may form a fuselage's ribs, and the stringers may form the interstitials between such ribs. The spiral orientation of stringers about formers may provide uniform robustness at any point on an aircraft fuselage such that if a portion sustains damage, another portion may remain largely unaffected. Aircraft skin may be mechanically coupled to underlying stringers and formers and may interact with a fluid, such as air, to generate lift and perform maneuvers.

In an embodiment, and still referring to FIG. 16, fuselage 1604 may include and/or be constructed using monocoque construction. Monocoque construction may include a primary structure that forms a shell (or skin in an aircraft's case) and supports physical loads. Monocoque fuselages are fuselages in which the aircraft skin or shell is also the primary structure. In monocoque construction aircraft skin would support tensile and compressive loads within itself and true monocoque aircraft can be further characterized by the absence of internal structural elements. Aircraft skin in this construction method is rigid and can sustain its shape with no structural assistance form underlying skeleton-like elements. Monocoque fuselage may comprise aircraft skin made from plywood layered in varying grain directions, epoxy-impregnated fiberglass, carbon fiber, or any combination thereof.

According to embodiments, and further referring to FIG. 16, fuselage 1604 may include a semi-monocoque construction. Semi-monocoque construction, as used herein, is a partial monocoque construction, wherein a monocoque construction is describe above detail. In semi-monocoque construction, aircraft fuselage 1604 may derive some structural support from stressed aircraft skin and some structural support from underlying frame structure made of structural elements. Formers or station frames can be seen running transverse to the long axis of fuselage 1604 with circular cutouts which are generally used in real-world manufacturing for weight savings and for the routing of electrical harnesses and other modern on-board systems. In a semi-monocoque construction, stringers are thin, long strips of material that run parallel to fuselage's long axis. Stringers may be mechanically coupled to formers permanently, such as with rivets. Aircraft skin may be mechanically coupled to stringers and formers permanently, such as by rivets as well. A person of ordinary skill in the art will appreciate, upon reviewing the entirety of this disclosure, that there are numerous methods for mechanical fastening of the aforementioned components like screws, nails, dowels, pins, anchors, adhesives like glue or epoxy, or bolts and nuts, to name a few. A subset of fuselage under the umbrella of semi-monocoque construction includes unibody vehicles. Unibody, which is short for "unitized body" or alternatively "unitary construction," vehicles are characterized by a construction in which the body, floor plan, and chassis form a single structure. In the aircraft world, unibody may be characterized by internal structural elements like formers and stringers being constructed in one piece, integral to the aircraft skin as well as any floor construction like a deck.

Still referring to FIG. 16, stringers and formers, which may account for the bulk of an aircraft structure excluding monocoque construction, may be arranged in a plurality of orientations depending on aircraft operation and materials. Stringers may be arranged to carry axial (tensile or compressive), shear, bending or torsion forces throughout their overall structure. Due to their coupling to aircraft skin, aerodynamic forces exerted on aircraft skin will be transferred to stringers. A location of said stringers greatly informs the type of forces and loads applied to each and every stringer, all of which may be handled by material selection, cross-sectional area, and mechanical coupling methods of each member. A similar assessment may be made for formers. In general, formers may be significantly larger in cross-sectional area and thickness, depending on location, than stringers. Both stringers and formers may comprise aluminum, aluminum alloys, graphite epoxy composite, steel alloys, titanium, or an undisclosed material alone or in combination.

In an embodiment, and still referring to FIG. 16, stressed skin, when used in semi-monocoque construction is the concept where the skin of an aircraft bears partial, yet significant, load in an overall structural hierarchy. In other words, an internal structure, whether it be a frame of welded tubes, formers and stringers, or some combination, may not be sufficiently strong enough by design to bear all loads. The concept of stressed skin may be applied in monocoque and semi-monocoque construction methods of fuselage 1604. Monocoque comprises only structural skin, and in that sense, aircraft skin undergoes stress by applied aerodynamic fluids imparted by the fluid. Stress as used in continuum mechanics may be described in pound-force per square inch (lbf/in$^2$) or Pascals (Pa). In semi-monocoque construction stressed skin may bear part of aerodynamic loads and additionally may impart force on an underlying structure of stringers and formers.

Still referring to FIG. 16, it should be noted that an illustrative embodiment is presented only, and this disclosure in no way limits the form or construction method of a system and method for loading payload into an eVTOL aircraft. In embodiments, fuselage 1604 may be configurable based on the needs of the eVTOL per specific mission or objective. The general arrangement of components, structural elements, and hardware associated with storing and/or moving a payload may be added or removed from fuselage 1604 as needed, whether it is stowed manually, automatedly, or removed by personnel altogether. Fuselage 1604 may be configurable for a plurality of storage options. Bulkheads and dividers may be installed and uninstalled as needed, as well as longitudinal dividers where necessary. Bulkheads and dividers may be installed using integrated slots and hooks, tabs, boss and channel, or hardware like bolts, nuts, screws, nails, clips, pins, and/or dowels, to name a few. Fuselage 1604 may also be configurable to accept certain specific cargo containers, or a receptable that can, in turn, accept certain cargo containers.

Still referring to FIG. 16, aircraft 1600 may include a plurality of laterally extending elements attached to fuselage 1604. As used in this disclosure a "laterally extending element" is an element that projects essentially horizontally from fuselage, including an outrigger, a spar, and/or a fixed wing that extends from fuselage. Wings may be structures which include airfoils configured to create a pressure differential resulting in lift. Wings may generally dispose on the left and right sides of the aircraft symmetrically, at a point between nose and empennage. Wings may comprise a plurality of geometries in planform view, swept swing, tapered, variable wing, triangular, oblong, elliptical, square, among others. A wing's cross section geometry may comprise an airfoil. An "airfoil" as used in this disclosure is a shape specifically designed such that a fluid flowing above and below it exert differing levels of pressure against the top and bottom surface. In embodiments, the bottom surface of an aircraft can be configured to generate a greater pressure than does the top, resulting in lift. Laterally extending element may comprise differing and/or similar cross-sectional geometries over its cord length or the length from wing tip to where wing meets the aircraft's body. One or more wings may be symmetrical about the aircraft's longitudinal plane, which comprises the longitudinal or roll axis reaching down the center of the aircraft through the nose and empennage, and the plane's yaw axis. Laterally extending element may comprise controls surfaces configured to be commanded by a pilot or pilots to change a wing's geometry and therefore its interaction with a fluid medium, like air. Control surfaces may comprise flaps, ailerons, tabs, spoilers, and slats, among others. The control surfaces may dispose on the wings in a plurality of locations and arrangements and in embodiments may be disposed at the leading and trailing edges of the wings, and may be configured to deflect up, down, forward, aft, or a combination thereof. An aircraft, including a dual-mode aircraft may comprise a combination of control surfaces to perform maneuvers while flying or on ground.

Still referring to FIG. 16, aircraft 1600 includes a plurality of flight components 1608. As used in this disclosure a "flight component" is a component that promotes flight and guidance of an aircraft. In an embodiment, flight component 1608 may be mechanically coupled to an aircraft. As used herein, a person of ordinary skill in the art would understand "mechanically coupled" to mean that at least a portion of a device, component, or circuit is connected to at least a portion of the aircraft via a mechanical coupling. Said mechanical coupling can include, for example, rigid coupling, such as beam coupling, bellows coupling, bushed pin coupling, constant velocity, split-muff coupling, diaphragm coupling, disc coupling, donut coupling, elastic coupling, flexible coupling, fluid coupling, gear coupling, grid coupling, hirth joints, hydrodynamic coupling, jaw coupling, magnetic coupling, Oldham coupling, sleeve coupling, tapered shaft lock, twin spring coupling, rag joint coupling, universal joints, or any combination thereof. In an embodiment, mechanical coupling may be used to connect the ends of adjacent parts and/or objects of an electric aircraft. Further, in an embodiment, mechanical coupling may be used to join two pieces of rotating electric aircraft components.

Still referring to FIG. 16, plurality of flight components 1608 may include at least a lift propulsor component 1612. As used in this disclosure a "lift propulsor component" is a component and/or device used to propel a craft upward by exerting downward force on a fluid medium, which may include a gaseous medium such as air or a liquid medium such as water. Lift propulsor component 1612 may include any device or component that consumes electrical power on demand to propel an electric aircraft in a direction or other vehicle while on ground or in-flight. For example, and without limitation, lift propulsor component 1612 may include a rotor, propeller, paddle wheel and the like thereof, wherein a rotor is a component that produces torque along the longitudinal axis, and a propeller produces torquer along the vertical axis. In an embodiment, lift propulsor component 1612 includes a plurality of blades. As used in this disclosure a "blade" is a propeller that converts rotary motion from an engine or other power source into a swirling slipstream. In an embodiment, blade may convert rotary motion to push the propeller forwards or backwards. In an embodiment lift propulsor component 1612 may include a rotating power-driven hub, to which are attached several radial airfoil-section blades such that the whole assembly rotates about a longitudinal axis. Blades may be configured at an angle of attack, wherein an angle of attack is described in detail below. In an embodiment, and without limitation, angle of attack may include a fixed angle of attack. As used in this disclosure a "fixed angle of attack" is fixed angle between a chord line of a blade and relative wind. As used in this disclosure a "fixed angle" is an angle that is secured and/or unmovable from the attachment point. For example, and without limitation fixed angle of attack may be 3.2° as a function of a pitch angle of 19.7° and a relative wind angle 16.5°. In another embodiment, and without limitation, angle of attack may include a variable angle of attack. As used in this disclosure a "variable angle of attack" is a variable and/or moveable angle between a chord line of a blade and relative wind. As used in this disclosure a "variable angle" is an angle that is moveable from an attachment point. For example, and without limitation variable angle of attack may be a first angle of 4.7° as a function of a pitch angle of 17.1° and a relative wind angle 16.4°, wherein the angle adjusts and/or shifts to a second angle of 16.7° as a function of a pitch angle of 16.1° and a relative wind angle 16.4°. In an embodiment, angle of attack be configured to produce a fixed pitch angle. As used in this disclosure a "fixed pitch angle" is a fixed angle between a cord line of a blade and the rotational velocity direction. For example, and without limitation, fixed pitch angle may include 18°. In another embodiment fixed angle of attack may be manually variable to a few set positions to adjust one or more lifts of the aircraft prior to flight. In an embodiment, blades for an aircraft are designed to be fixed to their hub at an angle similar to the thread on a screw makes an angle to the shaft; this angle may be referred to as a pitch or pitch angle which will determine a speed of forward movement as the blade rotates.

In an embodiment, and still referring to FIG. 16, lift propulsor component 1612 may be configured to produce a lift. As used in this disclosure a "lift" is a perpendicular force to the oncoming flow direction of fluid surrounding the surface. For example, and without limitation relative air speed may be horizontal to aircraft 1600, wherein lift force may be a force exerted in a vertical direction, directing aircraft 1600 upwards. In an embodiment, and without limitation, lift propulsor component 1612 may produce lift as a function of applying a torque to lift propulsor component. As used in this disclosure a "torque" is a measure of force that causes an object to rotate about an axis in a direction. For example, and without limitation, torque may rotate an aileron and/or rudder to generate a force that may adjust and/or affect altitude, airspeed velocity, groundspeed velocity, direction during flight, and/or thrust. For example, one or more flight components such as a power sources may apply a torque on lift propulsor component 1612 to produce lift. As used in this disclosure a "power source" is a source that that drives and/or controls any other flight component. For example, and without limitation power source may include a motor that operates to move one or more lift propulsor components, to drive one or more blades, or the like thereof. A motor may be driven by direct current (DC) electric power and may include, without limitation, brushless DC electric motors, switched reluctance motors, induction motors, or any combination thereof. A motor may also include electronic speed controllers or other components for regulating motor speed, rotation direction, and/or dynamic braking.

Still referring to FIG. 16, power source may include an energy source. An energy source may include, for example, an electrical energy source a generator, a photovoltaic device, a fuel cell such as a hydrogen fuel cell, direct methanol fuel cell, and/or solid oxide fuel cell, an electric energy storage device (e.g., a capacitor, an inductor, and/or a battery). An electrical energy source may also include a battery cell, or a plurality of battery cells connected in series into a module and each module connected in series or in parallel with other modules. Configuration of an energy source containing connected modules may be designed to meet an energy or power requirement and may be designed to fit within a designated footprint in an electric aircraft in which aircraft 1600 may be incorporated.

In an embodiment, and still referring to FIG. 16, an energy source may be used to provide a steady supply of electrical power to a load over the course of a flight by a vehicle or other electric aircraft. For example, an energy source may be capable of providing sufficient power for "cruising" and other relatively low-energy phases of flight. An energy source may also be capable of providing electrical power for some higher-power phases of flight as well, particularly when the energy source is at a high SOC, as may be the case for instance during takeoff. In an embodiment, an energy source may be capable of providing sufficient electrical power for auxiliary loads including without limitation, lighting, navigation, communications, de-icing, steering or other systems requiring power or energy. Further, an energy source may be capable of providing sufficient power for controlled descent and landing protocols, including, without limitation, hovering descent or runway landing. As used herein an energy source may have high power density where electrical power an energy source can usefully produce per unit of volume and/or mass is relatively high. "Electrical power," as used in this disclosure, is defined as a rate of electrical energy per unit time. An energy source may include a device for which power that may be produced per unit of volume and/or mass has been optimized, at the expense of the maximal total specific energy density or power capacity, during design. Non-limiting examples of items that may be used as at least an energy source may include batteries used for starting applications including Li ion batteries which may include NCA, NMC, Lithium iron phosphate (LiFePO4) and Lithium Manganese Oxide (LMO) batteries, which may be mixed with another cathode chemistry to provide more specific power if the application requires Li metal batteries, which have a lithium metal anode that provides high power on demand, Li ion batteries that have a silicon or titanite anode, energy source may be used, in an embodiment, to provide electrical power to an electric aircraft or drone, such as an electric aircraft vehicle, during moments requiring high rates of power output, including without limitation takeoff, landing, thermal de-icing and situations requiring greater power output for reasons of stability, such as high turbulence situations, as described in further detail below. A battery may include, without limitation a battery using nickel based chemistries such as nickel cadmium or nickel metal hydride, a battery using lithium ion battery chemistries such as a nickel cobalt aluminum (NCA), nickel manganese cobalt (NMC), lithium iron phosphate (LiFePO4), lithium cobalt oxide (LCO), and/or lithium manganese oxide (LMO), a battery using lithium polymer technology, lead-based batteries such as without limitation lead acid batteries, metal-air batteries, or any other suitable battery. Persons skilled in the art, upon reviewing the entirety of this disclosure, will be aware of various devices of components that may be used as an energy source.

Still referring to FIG. 16, an energy source may include a plurality of energy sources, referred to herein as a module of energy sources. A module may include batteries connected in parallel or in series or a plurality of modules connected either in series or in parallel designed to deliver both the power and energy requirements of the application. Connecting batteries in series may increase the voltage of at least an energy source which may provide more power on demand. High voltage batteries may require cell matching when high peak load is needed. As more cells are connected in strings, there may exist the possibility of one cell failing which may increase resistance in the module and reduce an overall power output as a voltage of the module may decrease as a result of that failing cell. Connecting batteries in parallel may increase total current capacity by decreasing total resistance, and it also may increase overall amp-hour capacity. Overall energy and power outputs of at least an energy source may be based on individual battery cell performance or an extrapolation based on measurement of at least an electrical parameter. In an embodiment where an energy source includes a plurality of battery cells, overall power output capacity may be dependent on electrical parameters of each individual cell. If one cell experiences high self-discharge during demand, power drawn from at least an energy source may be decreased to avoid damage to the weakest cell. An energy source may further include, without limitation, wiring, conduit, housing, cooling system and battery management system. Persons skilled in the art will be aware, after reviewing the entirety of this disclosure, of many different components of an energy source.

In an embodiment and still referring to FIG. 16, plurality of flight components 1608 may be arranged in a quad copter orientation. As used in this disclosure a "quad copter orientation" is at least a lift propulsor component oriented in a geometric shape and/or pattern, wherein each of the lift propulsor components are located along a vertex of the geometric shape. For example, and without limitation, a square quad copter orientation may have four lift propulsor components oriented in the geometric shape of a square, wherein each of the four lift propulsor components are located along the four vertices of the square shape. As a further non-limiting example, a hexagonal quad copter orientation may have six lift propulsor components oriented in the geometric shape of a hexagon, wherein each of the six lift propulsor components are located along the six vertices of the hexagon shape. In an embodiment, and without limitation, quad copter orientation may include a first set of lift propulsor components and a second set of lift propulsor components, wherein the first set of lift propulsor components and the second set of lift propulsor components may include two lift propulsor components each, wherein the first set of lift propulsor components and a second set of lift propulsor components are distinct from one another. For example, and without limitation, the first set of lift propulsor components may include two lift propulsor components that rotate in a clockwise direction, wherein the second set of lift propulsor components may include two lift propulsor components that rotate in a counterclockwise direction. In an embodiment, and without limitation, the first set of propulsor lift components may be oriented along a line oriented 45° from the longitudinal axis of aircraft 1600. In another embodiment, and without limitation, the second set of propulsor lift components may be oriented along a line oriented 135° from the longitudinal axis, wherein the first set of lift propulsor components line and the second set of lift propulsor components are perpendicular to each other.

Still referring to FIG. 16, plurality of flight components 1608 may include a pusher component 1616. As used in this disclosure a "pusher component" is a component that pushes and/or thrusts an aircraft through a medium. As a non-limiting example, pusher component 1616 may include a pusher propeller, a paddle wheel, a pusher motor, a pusher propulsor, and the like. Additionally, or alternatively, pusher flight component may include a plurality of pusher flight components. Pusher component 1616 is configured to produce a forward thrust. As used in this disclosure a "forward thrust" is a thrust that forces aircraft through a medium in a horizontal direction, wherein a horizontal direction is a direction parallel to the longitudinal axis. As a non-limiting example, forward thrust may include a force of 1145 N to force aircraft to in a horizontal direction along the longitudinal axis. As a further non-limiting example, forward thrust may include a force of, as a non-limiting example, 300 N to force aircraft 1600 in a horizontal direction along a longitudinal axis. As a further non-limiting example, pusher component 1616 may twist and/or rotate to pull air behind it and, at the same time, push aircraft 1600 forward with an equal amount of force. In an embodiment, and without limitation, the more air forced behind aircraft, the greater the thrust force with which the aircraft is pushed horizontally will be. In another embodiment, and without limitation, forward thrust may force aircraft 1600 through the medium of relative air. Additionally or alternatively, plurality of flight components 1608 may include one or more puller components. As used in this disclosure a "puller component" is a component that pulls and/or tows an aircraft through a medium. As a non-limiting example, puller component may include a flight component such as a puller propeller, a puller motor, a tractor propeller, a puller propulsor, and the like. Additionally, or alternatively, puller component may include a plurality of puller flight components.

In an embodiment and still referring to FIG. 16, aircraft 1600 may include a flight controller located within fuselage 1604, wherein a flight controller is described in detail below, in reference to FIG. 16. In an embodiment, and without limitation, flight controller may be configured to operate a fixed-wing flight capability. As used in this disclosure a "fixed-wing flight capability" is a method of flight wherein the plurality of laterally extending elements generate lift. For example, and without limitation, fixed-wing flight capability may generate lift as a function of an airspeed of aircraft 100 and one or more airfoil shapes of the laterally extending elements, wherein an airfoil is described above in detail. As a further non-limiting example, flight controller may operate the fixed-wing flight capability as a function of reducing applied torque on lift propulsor component 1612. For example, and without limitation, flight controller may reduce a torque of 19 Nm applied to a first set of lift propulsor components to a torque of 16 Nm. As a further non-limiting example, flight controller may reduce a torque of 12 Nm applied to a first set of lift propulsor components to a torque of 0 Nm. In an embodiment, and without limitation, flight controller may produce fixed-wing flight capability as a function of increasing forward thrust exerted by pusher component 1616. For example, and without limitation, flight controller may increase a forward thrust of 1600 kN produced by pusher component 1616 to a forward thrust of 1669 kN. In an embodiment, and without limitation, an amount of lift generation may be related to an amount of forward thrust generated to increase airspeed velocity, wherein the amount of lift generation may be directly proportional to the amount of forward thrust produced. Additionally or alternatively, flight controller may include an inertia compensator. As used in this disclosure an "inertia compensator" is one or more computing devices, electrical components, logic circuits, processors, and the like there of that are configured to compensate for inertia in one or more lift propulsor components present in aircraft 1600. Inertia compensator may alternatively or additionally include any computing device used as an inertia compensator as described in U.S. Nonprovisional application Ser. No. 17/106,557, filed on Nov. 30, 2020, and entitled "SYSTEM AND METHOD FOR FLIGHT CONTROL IN ELECTRIC AIRCRAFT," the entirety of which is incorporated herein by reference.

In an embodiment, and still referring to FIG. 16, flight controller may be configured to perform a reverse thrust command. As used in this disclosure a "reverse thrust command" is a command to perform a thrust that forces a medium towards the relative air opposing aircraft 190. For example, reverse thrust command may include a thrust of 180 N directed towards the nose of aircraft to at least repel and/or oppose the relative air. Reverse thrust command may alternatively or additionally include any reverse thrust command as described in U.S. Nonprovisional application Ser. No. 17/319,155, filed on May 13, 2021, and entitled "AIRCRAFT HAVING REVERSE THRUST CAPABILITIES," the entirety of which is incorporated herein by reference. In another embodiment, flight controller may be configured to perform a regenerative drag operation. As used in this disclosure a "regenerative drag operation" is an operating condition of an aircraft, wherein the aircraft has a negative thrust and/or is reducing in airspeed velocity. For example, and without limitation, regenerative drag operation may include a positive propeller speed and a negative propeller thrust. Regenerative drag operation may alternatively or additionally include any regenerative drag operation as described in U.S. Nonprovisional application Ser. No. 17/319,155.

In an embodiment, and still referring to FIG. 16, flight controller may be configured to perform a corrective action as a function of a failure event. As used in this disclosure a" corrective action" is an action conducted by the plurality of flight components to correct and/or alter a movement of an aircraft. For example, and without limitation, a corrective action may include an action to reduce a yaw torque generated by a failure event. Additionally or alternatively, corrective action may include any corrective action as described in U.S. Nonprovisional application Ser. No. 17/222,539, filed on Apr. 7, 2021, and entitled "AIRCRAFT FOR SELF-NEUTRALIZING FLIGHT," the entirety of which is incorporated herein by reference. As used in this disclosure a "failure event" is a failure of a lift propulsor component of the plurality of lift propulsor components. For example, and without limitation, a failure event may denote a rotation degradation of a rotor, a reduced torque of a rotor, and the like thereof.

Figure 17:
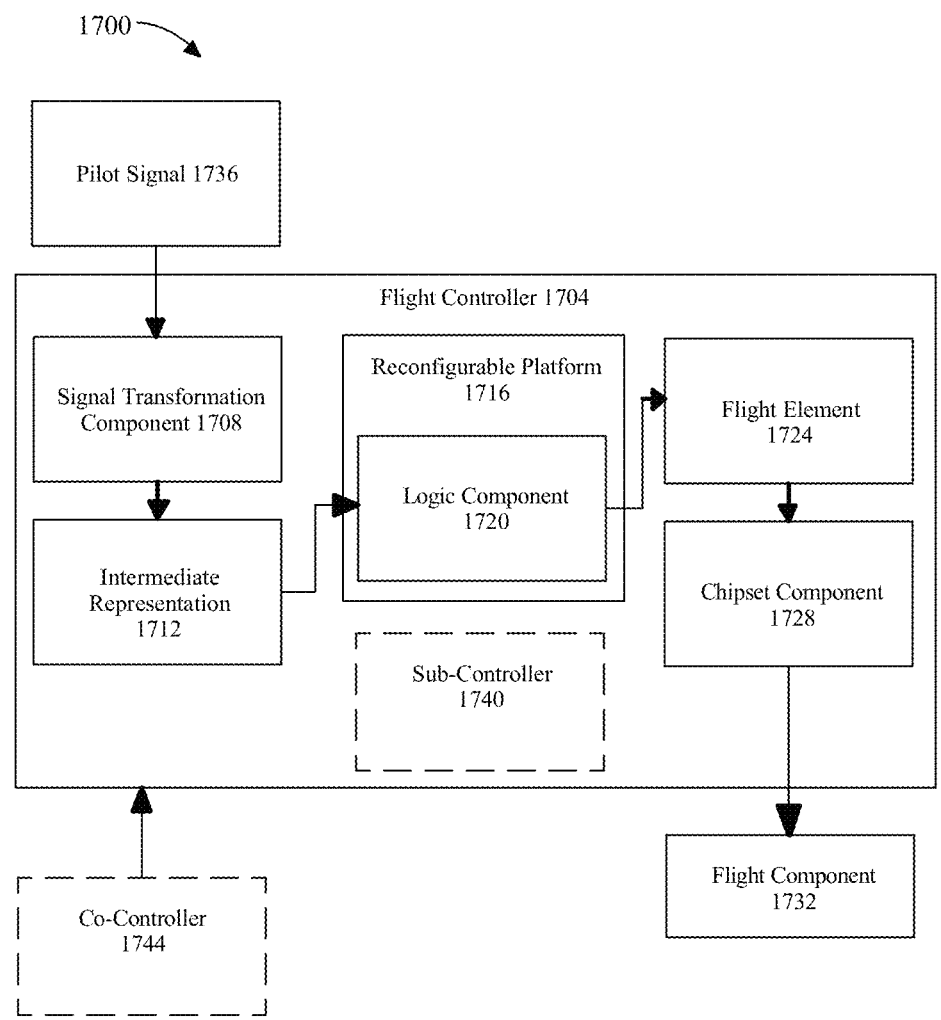
FIG. 17 is a block diagram of an exemplary embodiment of a flight controller.

Now referring to FIG. 17, an exemplary embodiment 1700 of a flight controller 1704 is illustrated. As used in this disclosure a "flight controller" is a computing device of a plurality of computing devices dedicated to data storage, security, distribution of traffic for load balancing, and flight instruction. Flight controller 1704 may include and/or communicate with any computing device as described in this disclosure, including without limitation a microcontroller, microprocessor, digital signal processor (DSP) and/or system on a chip (SoC) as described in this disclosure. Further, flight controller 1704 may include a single computing device operating independently, or may include two or more computing device operating in concert, in parallel, sequentially or the like; two or more computing devices may be included together in a single computing device or in two or more computing devices. In embodiments, flight controller 1704 may be installed in an aircraft, may control the aircraft remotely, and/or may include an element installed in the aircraft and a remote element in communication therewith.

In an embodiment, and still referring to FIG. 17, flight controller 1704 may include a signal transformation component 1708. As used in this disclosure a "signal transformation component" is a component that transforms and/or converts a first signal to a second signal, wherein a signal may include one or more digital and/or analog signals. For example, and without limitation, signal transformation component 1708 may be configured to perform one or more operations such as preprocessing, lexical analysis, parsing, semantic analysis, and the like thereof. In an embodiment, and without limitation, signal transformation component 1708 may include one or more analog-to-digital convertors that transform a first signal of an analog signal to a second signal of a digital signal. For example, and without limitation, an analog-to-digital converter may convert an analog input signal to a 19-bit binary digital representation of that signal. In another embodiment, signal transformation component 1708 may include transforming one or more low-level languages such as, but not limited to, machine languages and/or assembly languages. For example, and without limitation, signal transformation component 1708 may include transforming a binary language signal to an assembly language signal. In an embodiment, and without limitation, signal transformation component 1708 may include transforming one or more high-level languages and/or formal languages such as but not limited to alphabets, strings, and/or languages. For example, and without limitation, high-level languages may include one or more system languages, scripting languages, domain-specific languages, visual languages, esoteric languages, and the like thereof. As a further non-limiting example, high-level languages may include one or more algebraic formula languages, business data languages, string and list languages, object-oriented languages, and the like thereof.

Still referring to FIG. 17, signal transformation component 1708 may be configured to optimize an intermediate representation 1712. As used in this disclosure an "intermediate representation" is a data structure and/or code that represents the input signal. Signal transformation component 1708 may optimize intermediate representation as a function of a data-flow analysis, dependence analysis, alias analysis, pointer analysis, escape analysis, and the like thereof. In an embodiment, and without limitation, signal transformation component 1708 may optimize intermediate representation 1712 as a function of one or more inline expansions, dead code eliminations, constant propagation, loop transformations, and/or automatic parallelization functions. In another embodiment, signal transformation component 1708 may optimize intermediate representation as a function of a machine dependent optimization such as a peephole optimization, wherein a peephole optimization may rewrite short sequences of code into more efficient sequences of code. Signal transformation component 1708 may optimize intermediate representation to generate an output language, wherein an "output language," as used herein, is the native machine language of flight controller 1704. For example, and without limitation, native machine language may include one or more binary and/or numerical languages.

In an embodiment, and without limitation, signal transformation component 1708 may include transform one or more inputs and outputs as a function of an error correction code. An error correction code, also known as error correcting code (ECC), is an encoding of a message or lot of data using redundant information, permitting recovery of corrupted data. An ECC may include a block code, in which information is encoded on fixed-size packets and/or blocks of data elements such as symbols of predetermined size, bits, or the like. Reed-Solomon coding, in which message symbols within a symbol set having q symbols are encoded as coefficients of a polynomial of degree less than or equal to a natural number k, over a finite field F with q elements; strings so encoded have a minimum hamming distance of k+1, and permit correction of (q–k–1)/2 erroneous symbols. Block code may alternatively or additionally be implemented using Golay coding, also known as binary Golay coding, Bose-Chaudhuri, Hocquenghuem (BCH) coding, multidimensional parity-check coding, and/or Hamming codes. An ECC may alternatively or additionally be based on a convolutional code.

In an embodiment, and still referring to FIG. 17, flight controller 1704 may include a reconfigurable hardware platform 1716. A "reconfigurable hardware platform," as used herein, is a component and/or unit of hardware that may be reprogrammed, such that, for instance, a data path between elements such as logic gates or other digital circuit elements may be modified to change an algorithm, state, logical sequence, or the like of the component and/or unit. This may be accomplished with such flexible high-speed computing fabrics as field-programmable gate arrays (FPGAs), which may include a grid of interconnected logic gates, connections between which may be severed and/or restored to program in modified logic. Reconfigurable hardware platform 1716 may be reconfigured to enact any algorithm and/or algorithm selection process received from another computing device and/or created using machine-learning processes.

Still referring to FIG. 17, reconfigurable hardware platform 1716 may include a logic component 1720. As used in this disclosure a "logic component" is a component that executes instructions on output language. For example, and without limitation, logic component may perform basic arithmetic, logic, controlling, input/output operations, and the like thereof. Logic component 1720 may include any suitable processor, such as without limitation a component incorporating logical circuitry for performing arithmetic and logical operations, such as an arithmetic and logic unit (ALU), which may be regulated with a state machine and directed by operational inputs from memory and/or sensors; logic component 1720 may be organized according to Von Neumann and/or Harvard architecture as a non-limiting example. Logic component 1720 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating point unit (FPU), and/or system on a chip (SoC). In an embodiment, logic component 1720 may include one or more integrated circuit microprocessors, which may contain one or more central processing units, central processors, and/or main processors, on a single metal-oxide-semiconductor chip. Logic component 1720 may be configured to execute a sequence of stored instructions to be performed on the output language and/or intermediate representation 1712. Logic component 1720 may be configured to fetch and/or retrieve the instruction from a memory cache, wherein a "memory cache," as used in this disclosure, is a stored instruction set on flight controller 1704. Logic component 1720 may be configured to decode the instruction retrieved from the memory cache to opcodes and/or operands. Logic component 1720 may be configured to execute the instruction on intermediate representation 1712 and/or output language. For example, and without limitation, logic component 1720 may be configured to execute an addition operation on intermediate representation 1712 and/or output language.

In an embodiment, and without limitation, logic component 1720 may be configured to calculate a flight element 1724. As used in this disclosure a "flight element" is an element of datum denoting a relative status of aircraft. For example, and without limitation, flight element 1724 may denote one or more torques, thrusts, airspeed velocities, forces, altitudes, groundspeed velocities, directions during flight, directions facing, forces, orientations, and the like thereof. For example, and without limitation, flight element 1724 may denote that aircraft is cruising at an altitude and/or with a sufficient magnitude of forward thrust. As a further non-limiting example, flight status may denote that is building thrust and/or groundspeed velocity in preparation for a takeoff. As a further non-limiting example, flight element 1724 may denote that aircraft is following a flight path accurately and/or sufficiently.

Still referring to FIG. 17, flight controller 1704 may include a chipset component 1728. As used in this disclosure a "chipset component" is a component that manages data flow. In an embodiment, and without limitation, chipset component 1728 may include a northbridge data flow path, wherein the northbridge dataflow path may manage data flow from logic component 1720 to a high-speed device and/or component, such as a RAM, graphics controller, and the like thereof. In another embodiment, and without limitation, chipset component 1728 may include a southbridge data flow path, wherein the southbridge dataflow path may manage data flow from logic component 1720 to lower-speed peripheral buses, such as a peripheral component interconnect (PCI), industry standard architecture (ICA), and the like thereof. In an embodiment, and without limitation, southbridge data flow path may include managing data flow between peripheral connections such as ethernet, USB, audio devices, and the like thereof. Additionally or alternatively, chipset component 1728 may manage data flow between logic component 1720, memory cache, and a flight component. As used in this disclosure a "flight component" is a portion of an aircraft that can be moved or adjusted to affect one or more flight elements. For example, flight component may include a component used to affect the aircraft's roll and pitch which may comprise one or more ailerons. As a further example, flight component may include a rudder to control yaw of an aircraft. In an embodiment, chipset component 1728 may be configured to communicate with a plurality of flight components as a function of flight element 1724. For example, and without limitation, chipset component 1728 may transmit to an aircraft rotor to reduce torque of a first lift propulsor and increase the forward thrust produced by a pusher component to perform a flight maneuver.

In an embodiment, and still referring to FIG. 17, flight controller 1704 may be configured generate an autonomous function. As used in this disclosure an "autonomous function" is a mode and/or function of flight controller 1704 that controls aircraft automatically. For example, and without limitation, autonomous function may perform one or more aircraft maneuvers, take offs, landings, altitude adjustments, flight leveling adjustments, turns, climbs, and/or descents. As a further non-limiting example, autonomous function may adjust one or more airspeed velocities, thrusts, torques, and/or groundspeed velocities. As a further non-limiting example, autonomous function may perform one or more flight path corrections and/or flight path modifications as a function of flight element 1724. In an embodiment, autonomous function may include one or more modes of autonomy such as, but not limited to, autonomous mode, semi-autonomous mode, and/or non-autonomous mode. As used in this disclosure "autonomous mode" is a mode that automatically adjusts and/or controls aircraft and/or the maneuvers of aircraft in its entirety. For example, autonomous mode may denote that flight controller 1704 will adjust the aircraft. As used in this disclosure a "semi-autonomous mode" is a mode that automatically adjusts and/or controls a portion and/or section of aircraft. For example, and without limitation, semi-autonomous mode may denote that a pilot will control the propulsors, wherein flight controller 1704 will control the ailerons and/or rudders. As used in this disclosure "non-autonomous mode" is a mode that denotes a pilot will control aircraft and/or maneuvers of aircraft in its entirety.

In an embodiment, and still referring to FIG. 17, flight controller 1704 may generate autonomous function as a function of an autonomous machine-learning model. As used in this disclosure an "autonomous machine-learning model" is a machine-learning model to produce an autonomous function output given flight element 1724 and a pilot signal 1736 as inputs; this is in contrast to a non-machine learning software program where the commands to be executed are determined in advance by a user and written in a programming language. As used in this disclosure a "pilot signal" is an element of datum representing one or more functions a pilot is controlling and/or adjusting. For example, pilot signal 1736 may denote that a pilot is controlling and/or maneuvering ailerons, wherein the pilot is not in control of the rudders and/or propulsors. In an embodiment, pilot signal 1736 may include an implicit signal and/or an explicit signal. For example, and without limitation, pilot signal 1736 may include an explicit signal, wherein the pilot explicitly states there is a lack of control and/or desire for autonomous function. As a further non-limiting example, pilot signal 1736 may include an explicit signal directing flight controller 1704 to control and/or maintain a portion of aircraft, a portion of the flight plan, the entire aircraft, and/or the entire flight plan. As a further non-limiting example, pilot signal 1736 may include an implicit signal, wherein flight controller 1704 detects a lack of control such as by a malfunction, torque alteration, flight path deviation, and the like thereof. In an embodiment, and without limitation, pilot signal 1736 may include one or more explicit signals to reduce torque, and/or one or more implicit signals that torque may be reduced due to reduction of airspeed velocity. In an embodiment, and without limitation, pilot signal 1736 may include one or more local and/or global signals. For example, and without limitation, pilot signal 1736 may include a local signal that is transmitted by a pilot and/or crew member. As a further non-limiting example, pilot signal 1736 may include a global signal that is transmitted by air traffic control and/or one or more remote users that are in communication with the pilot of aircraft. In an embodiment, pilot signal 1736 may be received as a function of a tri-state bus and/or multiplexor that denotes an explicit pilot signal should be transmitted prior to any implicit or global pilot signal.

Still referring to FIG. 17, autonomous machine-learning model may include one or more autonomous machine-learning processes such as supervised, unsupervised, or reinforcement machine-learning processes that flight controller 1704 and/or a remote device may or may not use in the generation of autonomous function. As used in this disclosure "remote device" is an external device to flight controller 1704. Additionally or alternatively, autonomous machine-learning model may include one or more autonomous machine-learning processes that a field-programmable gate array (FPGA) may or may not use in the generation of autonomous function. Autonomous machine-learning process may include, without limitation machine learning processes such as simple linear regression, multiple linear regression, polynomial regression, support vector regression, ridge regression, lasso regression, elasticnet regression, decision tree regression, random forest regression, logistic regression, logistic classification, K-nearest neighbors, support vector machines, kernel support vector machines, naïve bayes, decision tree classification, random forest classification, K-means clustering, hierarchical clustering, dimensionality reduction, principal component analysis, linear discriminant analysis, kernel principal component analysis, Q-learning, State Action Reward State Action (SARSA), Deep-Q network, Markov decision processes, Deep Deterministic Policy Gradient (DDPG), or the like thereof.

In an embodiment, and still referring to FIG. 17, autonomous machine learning model may be trained as a function of autonomous training data, wherein autonomous training data may correlate a flight element, pilot signal, and/or simulation data to an autonomous function. For example, and without limitation, a flight element of an airspeed velocity, a pilot signal of limited and/or no control of propulsors, and a simulation data of required airspeed velocity to reach the destination may result in an autonomous function that includes a semi-autonomous mode to increase thrust of the propulsors. Autonomous training data may be received as a function of user-entered valuations of flight elements, pilot signals, simulation data, and/or autonomous functions. Flight controller 1704 may receive autonomous training data by receiving correlations of flight element, pilot signal, and/or simulation data to an autonomous function that were previously received and/or determined during a previous iteration of generation of autonomous function. Autonomous training data may be received by one or more remote devices and/or FPGAs that at least correlate a flight element, pilot signal, and/or simulation data to an autonomous function. Autonomous training data may be received in the form of one or more user-entered correlations of a flight element, pilot signal, and/or simulation data to an autonomous function.

Still referring to FIG. 17, flight controller 1704 may receive autonomous machine-learning model from a remote device and/or FPGA that utilizes one or more autonomous machine learning processes, wherein a remote device and an FPGA is described above in detail. For example, and without limitation, a remote device may include a computing device, external device, processor, FPGA, microprocessor and the like thereof. Remote device and/or FPGA may perform the autonomous machine-learning process using autonomous training data to generate autonomous function and transmit the output to flight controller 1704. Remote device and/or FPGA may transmit a signal, bit, datum, or parameter to flight controller 1704 that at least relates to autonomous function. Additionally or alternatively, the remote device and/or FPGA may provide an updated machine-learning model. For example, and without limitation, an updated machine-learning model may be comprised of a firmware update, a software update, an autonomous machine-learning process correction, and the like thereof. As a non-limiting example a software update may incorporate a new simulation data that relates to a modified flight element. Additionally or alternatively, the updated machine learning model may be transmitted to the remote device and/or FPGA, wherein the remote device and/or FPGA may replace the autonomous machine-learning model with the updated machine-learning model and generate the autonomous function as a function of the flight element, pilot signal, and/or simulation data using the updated machine-learning model. The updated machine-learning model may be transmitted by the remote device and/or FPGA and received by flight controller 1704 as a software update, firmware update, or corrected autonomous machine-learning model. For example, and without limitation autonomous machine learning model may utilize a neural net machine-learning process, wherein the updated machine-learning model may incorporate a gradient boosting machine-learning process.

Still referring to FIG. 17, flight controller 1704 may include, be included in, and/or communicate with a mobile device such as a mobile telephone or smartphone. Further, flight controller may communicate with one or more additional devices as described below in further detail via a network interface device. The network interface device may be utilized for commutatively connecting a flight controller to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. The network may include any network topology and can may employ a wired and/or a wireless mode of communication.

In an embodiment, and still referring to FIG. 17, flight controller 1704 may include, but is not limited to, for example, a cluster of flight controllers in a first location and a second flight controller or cluster of flight controllers in a second location. Flight controller 1704 may include one or more flight controllers dedicated to data storage, security, distribution of traffic for load balancing, and the like. Flight controller 1704 may be configured to distribute one or more computing tasks as described below across a plurality of flight controllers, which may operate in parallel, in series, redundantly, or in any other manner used for distribution of tasks or memory between computing devices. For example, and without limitation, flight controller 1704 may implement a control algorithm to distribute and/or command the plurality of flight controllers. As used in this disclosure a "control algorithm" is a finite sequence of well-defined computer implementable instructions that may determine the flight component of the plurality of flight components to be adjusted. For example, and without limitation, control algorithm may include one or more algorithms that reduce and/or prevent aviation asymmetry. As a further non-limiting example, control algorithms may include one or more models generated as a function of a software including, but not limited to Simulink by MathWorks, Natick, Mass., USA. In an embodiment, and without limitation, control algorithm may be configured to generate an auto-code, wherein an "auto-code," is used herein, is a code and/or algorithm that is generated as a function of the one or more models and/or software's. In another embodiment, control algorithm may be configured to produce a segmented control algorithm. As used in this disclosure a "segmented control algorithm" is control algorithm that has been separated and/or parsed into discrete sections. For example, and without limitation, segmented control algorithm may parse control algorithm into two or more segments, wherein each segment of control algorithm may be performed by one or more flight controllers operating on distinct flight components.

In an embodiment, and still referring to FIG. 17, control algorithm may be configured to determine a segmentation boundary as a function of segmented control algorithm. As used in this disclosure a "segmentation boundary" is a limit and/or delineation associated with the segments of the segmented control algorithm. For example, and without limitation, segmentation boundary may denote that a segment in the control algorithm has a first starting section and/or a first ending section. As a further non-limiting example, segmentation boundary may include one or more boundaries associated with an ability of flight component. In an embodiment, control algorithm may be configured to create an optimized signal communication as a function of segmentation boundary. For example, and without limitation, optimized signal communication may include identifying the discrete timing required to transmit and/or receive the one or more segmentation boundaries. In an embodiment, and without limitation, creating optimized signal communication further comprises separating a plurality of signal codes across the plurality of flight controllers. For example, and without limitation the plurality of flight controllers may include one or more formal networks, wherein formal networks transmit data along an authority chain and/or are limited to task-related communications. As a further non-limiting example, communication network may include informal networks, wherein informal networks transmit data in any direction. In an embodiment, and without limitation, the plurality of flight controllers may include a chain path, wherein a "chain path," as used herein, is a linear communication path comprising a hierarchy that data may flow through. In an embodiment, and without limitation, the plurality of flight controllers may include an all-channel path, wherein an "all-channel path," as used herein, is a communication path that is not restricted to a particular direction. For example, and without limitation, data may be transmitted upward, downward, laterally, and the like thereof. In an embodiment, and without limitation, the plurality of flight controllers may include one or more neural networks that assign a weighted value to a transmitted datum. For example, and without limitation, a weighted value may be assigned as a function of one or more signals denoting that a flight component is malfunctioning and/or in a failure state.

Still referring to FIG. 17, the plurality of flight controllers may include a master bus controller. As used in this disclosure a "master bus controller" is one or more devices and/or components that are connected to a bus to initiate a direct memory access transaction, wherein a bus is one or more terminals in a bus architecture. Master bus controller may communicate using synchronous and/or asynchronous bus control protocols. In an embodiment, master bus controller may include flight controller 1704. In another embodiment, master bus controller may include one or more universal asynchronous receiver-transmitters (UART). For example, and without limitation, master bus controller may include one or more bus architectures that allow a bus to initiate a direct memory access transaction from one or more buses in the bus architectures. As a further non-limiting example, master bus controller may include one or more peripheral devices and/or components to communicate with another peripheral device and/or component and/or the master bus controller. In an embodiment, master bus controller may be configured to perform bus arbitration. As used in this disclosure "bus arbitration" is method and/or scheme to prevent multiple buses from attempting to communicate with and/or connect to master bus controller. For example and without limitation, bus arbitration may include one or more schemes such as a small computer interface system, wherein a small computer interface system is a set of standards for physical connecting and transferring data between peripheral devices and master bus controller by defining commands, protocols, electrical, optical, and/or logical interfaces. In an embodiment, master bus controller may receive intermediate representation 1712 and/or output language from logic component 1720, wherein output language may include one or more analog-to-digital conversions, low bit rate transmissions, message encryptions, digital signals, binary signals, logic signals, analog signals, and the like thereof described above in detail.

Still referring to FIG. 17, master bus controller may communicate with a slave bus. As used in this disclosure a "slave bus" is one or more peripheral devices and/or components that initiate a bus transfer. For example, and without limitation, slave bus may receive one or more controls and/or asymmetric communications from master bus controller, wherein slave bus transfers data stored to master bus controller. In an embodiment, and without limitation, slave bus may include one or more internal buses, such as but not limited to a/an internal data bus, memory bus, system bus, front-side bus, and the like thereof. In another embodiment, and without limitation, slave bus may include one or more external buses such as external flight controllers, external computers, remote devices, printers, aircraft computer systems, flight control systems, and the like thereof.

In an embodiment, and still referring to FIG. 17, control algorithm may optimize signal communication as a function of determining one or more discrete timings. For example, and without limitation master bus controller may synchronize timing of the segmented control algorithm by injecting high priority timing signals on a bus of the master bus control. As used in this disclosure a "high priority timing signal" is information denoting that the information is important. For example, and without limitation, high priority timing signal may denote that a section of control algorithm is of high priority and should be analyzed and/or transmitted prior to any other sections being analyzed and/or transmitted. In an embodiment, high priority timing signal may include one or more priority packets. As used in this disclosure a "priority packet" is a formatted unit of data that is communicated between the plurality of flight controllers. For example, and without limitation, priority packet may denote that a section of control algorithm should be used and/or is of greater priority than other sections.

Still referring to FIG. 17, flight controller 1704 may also be implemented using a "shared nothing" architecture in which data is cached at the worker, in an embodiment, this may enable scalability of aircraft and/or computing device. Flight controller 1704 may include a distributer flight controller. As used in this disclosure a "distributer flight controller" is a component that adjusts and/or controls a plurality of flight components as a function of a plurality of flight controllers. For example, distributer flight controller may include a flight controller that communicates with a plurality of additional flight controllers and/or clusters of flight controllers. In an embodiment, distributed flight control may include one or more neural networks. For example, neural network also known as an artificial neural network, is a network of "nodes," or data structures having one or more inputs, one or more outputs, and a function determining outputs based on inputs. Such nodes may be organized in a network, such as without limitation a convolutional neural network, including an input layer of nodes, one or more intermediate layers, and an output layer of nodes. Connections between nodes may be created via the process of "training" the network, in which elements from a training dataset are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning.

Still referring to FIG. 17, a node may include, without limitation a plurality of inputs $x_i$ that may receive numerical values from inputs to a neural network containing the node and/or from other nodes. Node may perform a weighted sum of inputs using weights $w_i$ that are multiplied by respective inputs $x_i$. Additionally or alternatively, a bias b may be added to the weighted sum of the inputs such that an offset is added to each unit in the neural network layer that is independent of the input to the layer. The weighted sum may then be input into a function $\varphi$, which may generate one or more outputs y. Weight $w_i$ applied to an input $x_i$ may indicate whether the input is "excitatory," indicating that it has strong influence on the one or more outputs y, for instance by the corresponding weight having a large numerical value, and/or a "inhibitory," indicating it has a weak effect influence on the one more inputs y, for instance by the corresponding weight having a small numerical value. The values of weights $w_i$ may be determined by training a neural network using training data, which may be performed using any suitable process as described above. In an embodiment, and without limitation, a neural network may receive semantic units as inputs and output vectors representing such semantic units according to weights $w_i$ that are derived using machine-learning processes as described in this disclosure.

Still referring to FIG. 17, flight controller may include a sub-controller 1740. As used in this disclosure a "sub-controller" is a controller and/or component that is part of a distributed controller as described above; for instance, flight controller 1704 may be and/or include a distributed flight controller made up of one or more sub-controllers. For example, and without limitation, sub-controller 1740 may include any controllers and/or components thereof that are similar to distributed flight controller and/or flight controller as described above. Sub-controller 1740 may include any component of any flight controller as described above. Sub-controller 1740 may be implemented in any manner suitable for implementation of a flight controller as described above. As a further non-limiting example, sub-controller 1740 may include one or more processors, logic components and/or computing devices capable of receiving, processing, and/or transmitting data across the distributed flight controller as described above. As a further non-limiting example, sub-controller 1740 may include a controller that receives a signal from a first flight controller and/or first distributed flight controller component and transmits the signal to a plurality of additional sub-controllers and/or flight components.

Still referring to FIG. 17, flight controller may include a co-controller 1744. As used in this disclosure a "co-controller" is a controller and/or component that joins flight controller 1704 as components and/or nodes of a distributer flight controller as described above. For example, and without limitation, co-controller 1744 may include one or more controllers and/or components that are similar to flight controller 1704. As a further non-limiting example, co-controller 1744 may include any controller and/or component that joins flight controller 1704 to distributer flight controller. As a further non-limiting example, co-controller 1744 may include one or more processors, logic components and/or computing devices capable of receiving, processing, and/or transmitting data to and/or from flight controller 1704 to distributed flight control system. Co-controller 1744 may include any component of any flight controller as described above. Co-controller 1744 may be implemented in any manner suitable for implementation of a flight controller as described above.

In an embodiment, and with continued reference to FIG. 17, flight controller 1704 may be designed and/or configured to perform any method, method step, or sequence of method steps in any embodiment described in this disclosure, in any order and with any degree of repetition. For instance, flight controller 1704 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Flight controller may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

Figure 18:
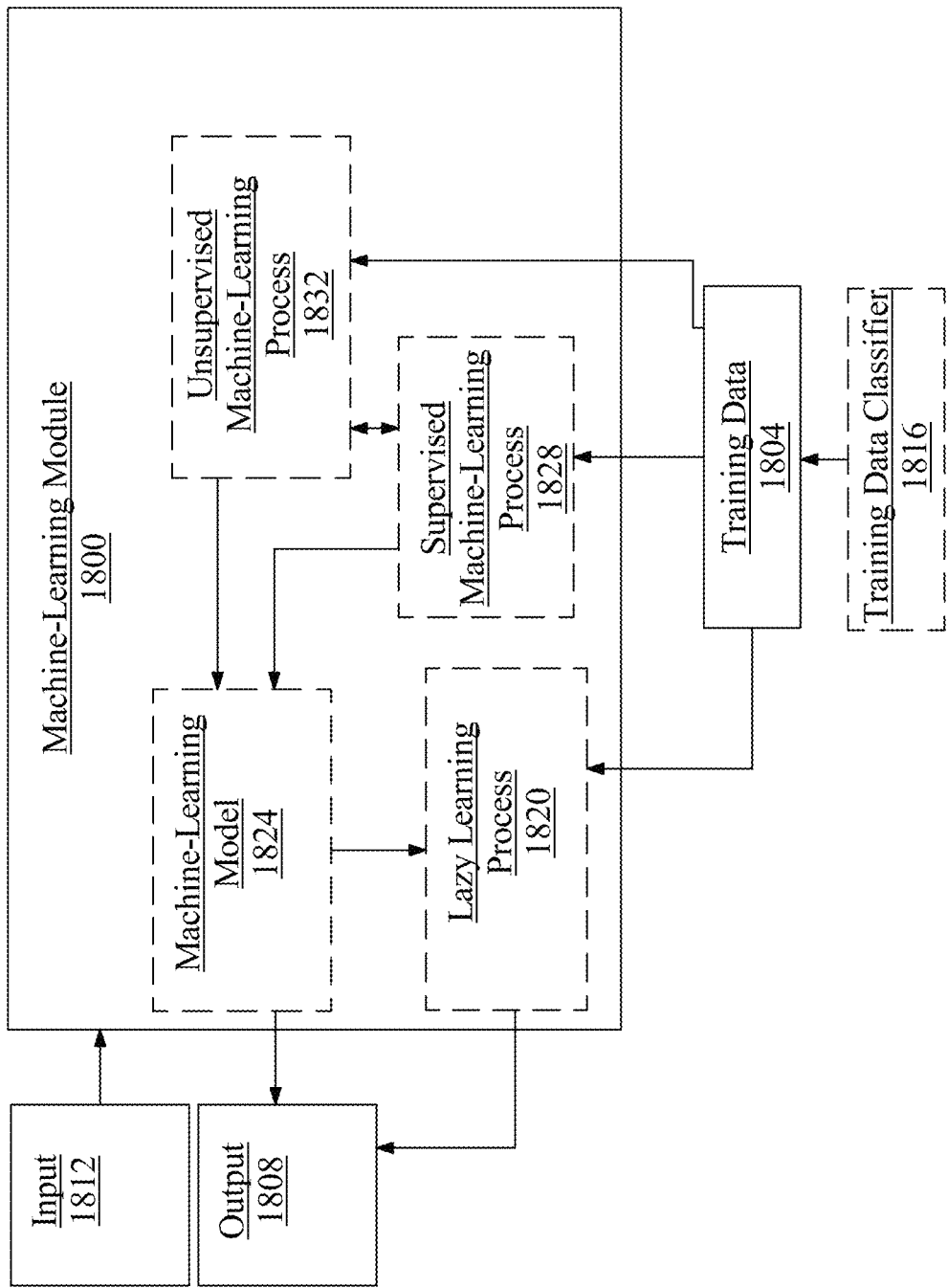
FIG. 18 is a block diagram of an exemplary embodiment of a machine-learning module.

Referring now to FIG. 18, an exemplary embodiment of a machine-learning module 1800 that may perform one or more machine-learning processes as described in this disclosure is illustrated. Machine-learning module may perform determinations, classification, and/or analysis steps, methods, processes, or the like as described in this disclosure using machine learning processes. A "machine learning process," as used in this disclosure, is a process that automatedly uses training data 1804 to generate an algorithm that will be performed by a computing device/module to produce outputs 1808 given data provided as inputs 1812; this is in contrast to a non-machine learning software program where the commands to be executed are determined in advance by a user and written in a programming language.

Still referring to FIG. 18, "training data," as used herein, is data containing correlations that a machine-learning process may use to model relationships between two or more categories of data elements. For instance, and without limitation, training data 1804 may include a plurality of data entries, each entry representing a set of data elements that were recorded, received, and/or generated together; data elements may be correlated by shared existence in a given data entry, by proximity in a given data entry, or the like. Multiple data entries in training data 1804 may evince one or more trends in correlations between categories of data elements; for instance, and without limitation, a higher value of a first data element belonging to a first category of data element may tend to correlate to a higher value of a second data element belonging to a second category of data element, indicating a possible proportional or other mathematical relationship linking values belonging to the two categories. Multiple categories of data elements may be related in training data 1804 according to various correlations; correlations may indicate causative and/or predictive links between categories of data elements, which may be modeled as relationships such as mathematical relationships by machine-learning processes as described in further detail below. Training data 1804 may be formatted and/or organized by categories of data elements, for instance by associating data elements with one or more descriptors corresponding to categories of data elements. As a non-limiting example, training data 1804 may include data entered in standardized forms by persons or processes, such that entry of a given data element in a given field in a form may be mapped to one or more descriptors of categories. Elements in training data 1804 may be linked to descriptors of categories by tags, tokens, or other data elements; for instance, and without limitation, training data 1804 may be provided in fixed-length formats, formats linking positions of data to categories such as comma-separated value (CSV) formats and/or self-describing formats such as extensible markup language (XML), JavaScript Object Notation (JSON), or the like, enabling processes or devices to detect categories of data.

Alternatively or additionally, and continuing to refer to FIG. 18, training data 1804 may include one or more elements that are not categorized; that is, training data 1804 may not be formatted or contain descriptors for some elements of data. Machine-learning algorithms and/or other processes may sort training data 1804 according to one or more categorizations using, for instance, natural language processing algorithms, tokenization, detection of correlated values in raw data and the like; categories may be generated using correlation and/or other processing algorithms. As a non-limiting example, in a corpus of text, phrases making up a number "n" of compound words, such as nouns modified by other nouns, may be identified according to a statistically significant prevalence of n-grams containing such words in a particular order; such an n-gram may be categorized as an element of language such as a "word" to be tracked similarly to single words, generating a new category as a result of statistical analysis. Similarly, in a data entry including some textual data, a person's name may be identified by reference to a list, dictionary, or other compendium of terms, permitting ad-hoc categorization by machine-learning algorithms, and/or automated association of data in the data entry with descriptors or into a given format. The ability to categorize data entries automatedly may enable the same training data 1804 to be made applicable for two or more distinct machine-learning algorithms as described in further detail below. Training data 1804 used by machine-learning module 1800 may correlate any input data as described in this disclosure to any output data as described in this disclosure. As a non-limiting illustrative example, aircraft component state data 108, payload data 112, pilot data 116, and consumer tool may be inputs and an aircraft performance model output 136 may be an output. In another non-limiting embodiment, schedule database 200 may send an element of data used as an input and output an aircraft performance model output 136 via the machine-learning model].

Further referring to FIG. 18, training data may be filtered, sorted, and/or selected using one or more supervised and/or unsupervised machine-learning processes and/or models as described in further detail below; such models may include without limitation a training data classifier 1816. Training data classifier 1816 may include a "classifier," which as used in this disclosure is a machine-learning model as defined below, such as a mathematical model, neural net, or program generated by a machine learning algorithm known as a "classification algorithm," as described in further detail below, that sorts inputs into categories or bins of data, outputting the categories or bins of data and/or labels associated therewith. A classifier may be configured to output at least a datum that labels or otherwise identifies a set of data that are clustered together, found to be close under a distance metric as described below, or the like. Machine-learning module 1800 may generate a classifier using a classification algorithm, defined as a processes whereby a computing device and/or any module and/or component operating thereon derives a classifier from training data 1804. Classification may be performed using, without limitation, linear classifiers such as without limitation logistic regression and/or naive Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers. As a non-limiting example, training data classifier 1816 may classify elements of training data to [such as a cohort of user, flight manager, owners, and the like thereof. Training data classifier 1816 may classify elements of training data such as type of flight issue, complaint, user experience, and/or other analyzed items and/or phenomena for which a subset of training data may be selected].

Still referring to FIG. 18, machine-learning module 1800 may be configured to perform a lazy-learning process 1820 and/or protocol, which may alternatively be referred to as a "lazy loading" or "call-when-needed" process and/or protocol, may be a process whereby machine learning is conducted upon receipt of an input to be converted to an output, by combining the input and training set to derive the algorithm to be used to produce the output on demand. For instance, an initial set of simulations may be performed to cover an initial heuristic and/or "first guess" at an output and/or relationship. As a non-limiting example, an initial heuristic may include a ranking of associations between inputs and elements of training data 1804. Heuristic may include selecting some number of highest-ranking associations and/or training data 1804 elements. Lazy learning may implement any suitable lazy learning algorithm, including without limitation a K-nearest neighbors algorithm, a lazy naïve Bayes algorithm, or the like; persons skilled in the art, upon reviewing the entirety of this disclosure, will be aware of various lazy-learning algorithms that may be applied to generate outputs as described in this disclosure, including without limitation lazy learning applications of machine-learning algorithms as described in further detail below.

Alternatively or additionally, and with continued reference to FIG. 18, machine-learning processes as described in this disclosure may be used to generate machine-learning models 1824. A "machine-learning model," as used in this disclosure, is a mathematical and/or algorithmic representation of a relationship between inputs and outputs, as generated using any machine-learning process including without limitation any process as described above, and stored in memory; an input is submitted to a machine-learning model 1824 once created, which generates an output based on the relationship that was derived. For instance, and without limitation, a linear regression model, generated using a linear regression algorithm, may compute a linear combination of input data using coefficients derived during machine-learning processes to calculate an output datum. As a further non-limiting example, a machine-learning model 1824 may be generated by creating an artificial neural network, such as a convolutional neural network comprising an input layer of nodes, one or more intermediate layers, and an output layer of nodes. Connections between nodes may be created via the process of "training" the network, in which elements from a training data 1804 set are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning.

Still referring to FIG. 18, machine-learning algorithms may include at least a supervised machine-learning process 1828. At least a supervised machine-learning process 1828, as defined herein, include algorithms that receive a training set relating a number of inputs to a number of outputs, and seek to find one or more mathematical relations relating inputs to outputs, where each of the one or more mathematical relations is optimal according to some criterion specified to the algorithm using some scoring function. For instance, a supervised learning algorithm may include inputs as described in this disclosure and outputs as described in this disclosure, and a scoring function representing a desired form of relationship to be detected between inputs and outputs; scoring function may, for instance, seek to maximize the probability that a given input and/or combination of elements inputs is associated with a given output to minimize the probability that a given input is not associated with a given output. Scoring function may be expressed as a risk function representing an "expected loss" of an algorithm relating inputs to outputs, where loss is computed as an error function representing a degree to which a prediction generated by the relation is incorrect when compared to a given input-output pair provided in training data 1804. Persons skilled in the art, upon reviewing the entirety of this disclosure, will be aware of various possible variations of at least a supervised machine-learning process 1828 that may be used to determine relation between inputs and outputs. Supervised machine-learning processes may include classification algorithms as defined above.

Further referring to FIG. 18, machine learning processes may include at least an unsupervised machine-learning processes 1832. An unsupervised machine-learning process, as used herein, is a process that derives inferences in datasets without regard to labels; as a result, an unsupervised machine-learning process may be free to discover any structure, relationship, and/or correlation provided in the data. Unsupervised processes may not require a response variable; unsupervised processes may be used to find interesting patterns and/or inferences between variables, to determine a degree of correlation between two or more variables, or the like.

Still referring to FIG. 18, machine-learning module 1800 may be designed and configured to create a machine-learning model 1824 using techniques for development of linear regression models. Linear regression models may include ordinary least squares regression, which aims to minimize the square of the difference between predicted outcomes and actual outcomes according to an appropriate norm for measuring such a difference (e.g. a vector-space distance norm); coefficients of the resulting linear equation may be modified to improve minimization. Linear regression models may include ridge regression methods, where the function to be minimized includes the least-squares function plus term multiplying the square of each coefficient by a scalar amount to penalize large coefficients. Linear regression models may include least absolute shrinkage and selection operator (LASSO) models, in which ridge regression is combined with multiplying the least-squares term by a factor of 1 divided by double the number of samples. Linear regression models may include a multi-task lasso model wherein the norm applied in the least-squares term of the lasso model is the Frobenius norm amounting to the square root of the sum of squares of all terms. Linear regression models may include the elastic net model, a multi-task elastic net model, a least angle regression model, a LARS lasso model, an orthogonal matching pursuit model, a Bayesian regression model, a logistic regression model, a stochastic gradient descent model, a perceptron model, a passive aggressive algorithm, a robustness regression model, a Huber regression model, or any other suitable model that may occur to persons skilled in the art upon reviewing the entirety of this disclosure. Linear regression models may be generalized in an embodiment to polynomial regression models, whereby a polynomial equation (e.g. a quadratic, cubic or higher-order equation) providing a best predicted output/actual output fit is sought; similar methods to those described above may be applied to minimize error functions, as will be apparent to persons skilled in the art upon reviewing the entirety of this disclosure.

Continuing to refer to FIG. 18, machine-learning algorithms may include, without limitation, linear discriminant analysis. Machine-learning algorithm may include quadratic discriminate analysis. Machine-learning algorithms may include kernel ridge regression. Machine-learning algorithms may include support vector machines, including without limitation support vector classification-based regression processes. Machine-learning algorithms may include stochastic gradient descent algorithms, including classification and regression algorithms based on stochastic gradient descent. Machine-learning algorithms may include nearest neighbors algorithms. Machine-learning algorithms may include various forms of latent space regularization such as variational regularization. Machine-learning algorithms may include Gaussian processes such as Gaussian Process Regression. Machine-learning algorithms may include cross-decomposition algorithms, including partial least squares and/or canonical correlation analysis. Machine-learning algorithms may include naïve Bayes methods. Machine-learning algorithms may include algorithms based on decision trees, such as decision tree classification or regression algorithms. Machine-learning algorithms may include ensemble methods such as bagging meta-estimator, forest of randomized tress, AdaBoost, gradient tree boosting, and/or voting classifier methods. Machine-learning algorithms may include neural net algorithms, including convolutional neural net processes.

Figure 19:
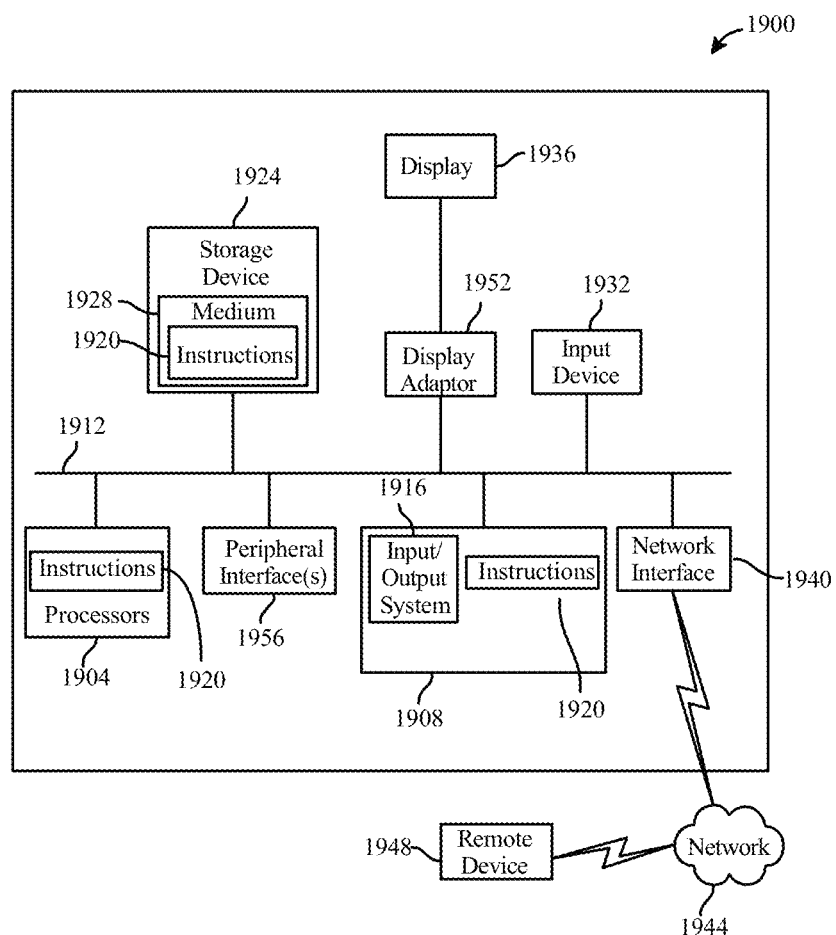
FIG. 19 is a block diagram of a computing system that can be used to implement any one or more of the methodologies disclosed herein and any one or more portions thereof.

Referring now to FIG. 19, an exemplary embodiment of a system 1900 for electric aircraft fleet management is illustrated. System includes a computing device. Computing device may include any computing device as described in this disclosure, including without limitation a microcontroller, microprocessor, digital signal processor (DSP) and/or system on a chip (SoC) as described in this disclosure. Computing device may include, be included in, and/or communicate with a mobile device such as a mobile telephone or smartphone. Computing device may include a single computing device operating independently, or may include two or more computing device operating in concert, in parallel, sequentially or the like; two or more computing devices may be included together in a single computing device or in two or more computing devices. Computing device may interface or communicate with one or more additional devices as described below in further detail via a network interface device. Network interface device may be utilized for connecting computing device to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network may employ a wired and/or a wireless mode of communication. In general, any network topology may be used. Information (e.g., data, software etc.) may be communicated to and/or from a computer and/or a computing device. Computing device may include but is not limited to, for example, a computing device or cluster of computing devices in a first location and a second computing device or cluster of computing devices in a second location. Computing device may include one or more computing devices dedicated to data storage, security, distribution of traffic for load balancing, and the like. Computing device may distribute one or more computing tasks as described below across a plurality of computing devices of computing device, which may operate in parallel, in series, redundantly, or in any other manner used for distribution of tasks or memory between computing devices. Computing device may be implemented using a "shared nothing" architecture in which data is cached at the worker, in an embodiment, this may enable scalability of system 100 and/or computing device.

With continued reference to FIG. 1, a flight controller 120 include a computing device may be designed and/or configured to perform any method, method step, or sequence of method steps in any embodiment described in this disclosure, in any order and with any degree of repetition. For instance, [computing device] may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Computing device may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

FIG. 19 shows a diagrammatic representation of one embodiment of a computing device in the exemplary form of a computer system 1900 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 1900 includes a processor 1904 and a memory 1908 that communicate with each other, and with other components, via a bus 1912. Bus 1912 may include any of several types of bus structures including, but not limited to, a memory bus, a memory controller, a peripheral bus, a local bus, and any combinations thereof, using any of a variety of bus architectures.

Processor 1904 may include any suitable processor, such as without limitation a processor incorporating logical circuitry for performing arithmetic and logical operations, such as an arithmetic and logic unit (ALU), which may be regulated with a state machine and directed by operational inputs from memory and/or sensors; processor 1904 may be organized according to Von Neumann and/or Harvard architecture as a non-limiting example. Processor 1904 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating point unit (FPU), and/or system on a chip (SoC).

Memory 1908 may include various components (e.g., machine-readable media) including, but not limited to, a random-access memory component, a read only component, and any combinations thereof. In one example, a basic input/output system 1916 (BIOS), including basic routines that help to transfer information between elements within computer system 1900, such as during start-up, may be stored in memory 1908. Memory 1908 may also include (e.g., stored on one or more machine-readable media) instructions (e.g., software) 1920 embodying any one or more of the aspects and/or methodologies of the present disclosure. In another example, memory 1908 may further include any number of program modules including, but not limited to, an operating system, one or more application programs, other program modules, program data, and any combinations thereof.

Computer system 1900 may also include a storage device 1924. Examples of a storage device (e.g., storage device 1924) include, but are not limited to, a hard disk drive, a magnetic disk drive, an optical disc drive in combination with an optical medium, a solid-state memory device, and any combinations thereof. Storage device 1924 may be connected to bus 1912 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 1924 (or one or more components thereof) may be removably interfaced with computer system 1900 (e.g., via an external port connector (not shown)). Particularly, storage device 1924 and an associated machine-readable medium 1928 may provide nonvolatile and/or volatile storage of machine-readable instructions, data structures, program modules, and/or other data for computer system 1900. In one example, software 1920 may reside, completely or partially, within machine-readable medium 1928. In another example, software 1920 may reside, completely or partially, within processor 1904.

Computer system 1900 may also include an input device 1932. In one example, a user of computer system 1900 may enter commands and/or other information into computer system 1900 via input device 1932. Examples of an input device 1932 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 1932 may be interfaced to bus 1912 via any of a variety of interfaces (not shown) including, but not limited to, a serial interface, a parallel interface, a game port, a USB interface, a FIREWIRE interface, a direct interface to bus 1912, and any combinations thereof. Input device 1932 may include a touch screen interface that may be a part of or separate from display 1936, discussed further below. Input device 1932 may be utilized as a user selection device for selecting one or more graphical representations in a graphical interface as described above.

A user may also input commands and/or other information to computer system 1900 via storage device 1924 (e.g., a removable disk drive, a flash drive, etc.) and/or network interface device 1040. A network interface device, such as network interface device 1040, may be utilized for connecting computer system 1900 to one or more of a variety of networks, such as network 1044, and one or more remote devices 1048 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 1044, may employ a wired and/or a wireless mode of communication. In general, any network topology may be used. Information (e.g., data, software 1920, etc.) may be communicated to and/or from computer system 1900 via network interface device 1040.

Computer system 1900 may further include a video display adapter 1952 for communicating a displayable image to a display device, such as display device 1936. Examples of a display device include, but are not limited to, a liquid crystal display (LCD), a cathode ray tube (CRT), a plasma display, a light emitting diode (LED) display, and any combinations thereof. Display adapter 1952 and display device 1936 may be utilized in combination with processor 1904 to provide graphical representations of aspects of the present disclosure. In addition to a display device, computer system 1900 may include one or more other peripheral output devices including, but not limited to, an audio speaker, a printer, and any combinations thereof. Such peripheral output devices may be connected to bus 1912 via a peripheral interface 1956. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve the systems according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. A system for electric aircraft fleet management, the system comprising:
   a computing device communicatively connected to at least an electric aircraft, wherein the computing device is remote to the at least the electric aircraft and configured to:
      authenticate the at least an aircraft using a credential received from the at least an electric aircraft;
      receive a plurality of measured aircraft operation datum from a sensor disposed on the at least an electric aircraft;
      select a training set as a function of each measured aircraft operation datum of the plurality of measured aircraft operation datum and the at least an electric aircraft, wherein each measured aircraft operation datum of the plurality of measured aircraft operation datum is correlated to a health history of at least a flight component, wherein the health history comprises the health of the at least a flight component since previous authentication; and
      generate, using a machine-learning algorithm, an aircraft performance model output based on the plurality of measured aircraft operation datum and the selected training set, wherein generating the aircraft performance model output comprises generating a performance alert.

2. The system of claim 1, wherein the sensor is disposed on the at least a flight component of the at least an electric aircraft.

3. The system of claim 1, wherein generating the aircraft performance model output comprises deriving individual functions describing unique correlations between aircraft performance model output training data for each aircraft component state data.

4. The system of claim 1, wherein the computing device is further configured to generate the aircraft performance model output using a supervised machine-learning algorithm based on the plurality of measured aircraft operation datum and the selected training set.

5. The system of claim 1, wherein the performance model output comprises a virtual representation.

6. The system of claim 5, wherein the virtual representation comprises a video simulation.

7. The system of claim 1, wherein generating the performance alert comprises generating the performance alert as a function of a flight plan.

8. The system of claim 1, wherein the authenticating the at least an electric aircraft comprises: receiving a credential from the at least an electric aircraft;
comparing the credential to an authorized credential stored within an authentication database; and
bypassing authentication for the at least an electric aircraft based on the comparison of the received credential from the at least an aircraft to the authorized credential stored within the authentication database.

9. The system of claim 1, wherein the plurality of measured aircraft operation datum further comprises a plurality of component state data.

10. The system of claim 1, wherein the computing device is further configured to transmit the performance alert to a user device.

11. The system of claim 10, wherein the performance alert comprises a warning sign displayed on the user device.

12. A method for electric aircraft fleet management, the method comprising:
authenticating, at a computing device remote to at least electric aircraft and communicatively connected to the at least an electric aircraft, the at least an aircraft using a credential received from the at least an electric aircraft;
receiving, at the computing device, a plurality of measured aircraft operation datum from a sensor;
selecting, at the computing device, a training set as a function of each measured aircraft operation datum of the plurality of measured aircraft operation datum and the at least an electric aircraft, wherein each measured aircraft operation datum of the plurality of measured aircraft operation datum is correlated a health history of at least a flight component, wherein the health history comprises the health of the at least a flight component since previous authentication; and
generating, using a machine-learning algorithm at the computing device, an aircraft performance model output based on the plurality of measured aircraft operation datum and the selected training set, wherein generating the aircraft performance model comprises generating a performance alert.

13. The method of claim 12, wherein the sensor is disposed on the at least a flight component of the at least an electric aircraft.

14. The method of claim 12, wherein generating the aircraft performance model output comprises deriving individual functions describing unique correlations between aircraft performance model output training data for each aircraft component state data.

15. The method of claim 12, further comprising generating, at the computing device, the aircraft performance model output using a supervised machine-learning algorithm based on the plurality of measured aircraft operation datum and the selected training set.

16. The method of claim 12, wherein the performance model output comprises a virtual representation.

17. The method of claim 15, wherein the virtual representation comprises a video simulation.

18. The method of claim 12, wherein authenticating the at least an electric aircraft comprises: receiving a credential from the at least an electric aircraft;
comparing the credential to an authorized credential stored within an authentication database; and
bypassing authentication for the at least an electric aircraft based on the comparison of the received credential from the at least an aircraft to the authorized credential stored within the authentication database.

19. The method of claim 12, wherein the plurality of measured aircraft operation datum further comprises a plurality of component state data.

20. The method of claim 12, further comprising transmitting, at the computing device, the performance alert to a user device.

* * * * *